(12) United States Patent
Shikii et al.

(10) Patent No.: US 9,285,588 B2
(45) Date of Patent: Mar. 15, 2016

(54) SEE-THROUGH DISPLAY DEVICE AND VEHICLE HAVING SEE-THROUGH DISPLAY DEVICE MOUNTED THEREON

(75) Inventors: Shinichi Shikii, Nara (JP); Kenichi Kasazumi, Osaka (JP); Keiji Sugiyama, Kyoto (JP); Kakuya Yamamoto, Hyogo (JP); Akira Kurozuka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 140 days.

(21) Appl. No.: 13/876,650

(22) PCT Filed: Sep. 21, 2011

(86) PCT No.: PCT/JP2011/005304
§ 371 (c)(1),
(2), (4) Date: Mar. 28, 2013

(87) PCT Pub. No.: WO2012/042793
PCT Pub. Date: Apr. 5, 2012

(65) Prior Publication Data
US 2013/0182302 A1    Jul. 18, 2013

(30) Foreign Application Priority Data

Oct. 1, 2010 (JP) .................................. 2010-223748
Oct. 12, 2010 (JP) .................................. 2010-229432

(51) Int. Cl.
*G03H 1/00* (2006.01)
*G02B 5/32* (2006.01)
(Continued)

(52) U.S. Cl.
CPC ............ *G02B 27/0103* (2013.01); *B60K 35/00* (2013.01); *G02B 5/30* (2013.01); *G02B 5/32* (2013.01); *H04N 9/3161* (2013.01); *H04N 9/3167* (2013.01); *G02B 2027/0118* (2013.01)

(58) Field of Classification Search
CPC ........... G02B 27/0103; G02B 27/0172; G02B 2027/0174; G02B 2027/0112; G02B 2027/014; G02B 5/1861; G02B 27/01; G02B 27/10; G02B 27/1086; G02B 27/14; G03H 1/0005
USPC .................. 359/13, 15, 19, 20, 456, 457, 458
See application file for complete search history.

(56) References Cited

U.S. PATENT DOCUMENTS 6,327,084 B1 * 12/2001 Nishikawa et al. ...... 359/485.02
2002/0021461 A1    2/2002 Ono et al.
2005/0140929 A1    6/2005 Nambudiri et al.

FOREIGN PATENT DOCUMENTS

JP    4-240686    8/1992
JP    4-345537    12/1992
(Continued)

OTHER PUBLICATIONS

International Search Report issued Dec. 27, 2011 in International (PCT) Application No. PCT/JP2011/005304.
(Continued)

*Primary Examiner* — Jade R Chwasz
(74) *Attorney, Agent, or Firm* — Wenderoth, Lind & Ponack, L.L.P.

(57) ABSTRACT

The present application discloses a see-through display device a light source configured to emit light, a projection optical system configured to project image light generated from the light; a transmissive hologram including a first surface which the image light enters from the projection optical system; and an interface configured to cause Fresnel reflection of the image light deflected by the hologram. The hologram includes a first interference fringe recorded by object light and reference light which are incident on the first surface by means of two-light flux interference. The image light incident on the first surface is deflected by the first interference fringe toward the interface. The interface reflects the image light toward the first surface.

17 Claims, 38 Drawing Sheets

(51) Int. Cl.
  *G02B 27/01* (2006.01)
  *B60K 35/00* (2006.01)
  *G02B 5/30* (2006.01)
  *H04N 9/31* (2006.01)

(56) References Cited

FOREIGN PATENT DOCUMENTS

| | | |
|---|---|---|
| JP | 6-273691 | 9/1994 |
| JP | 7-96772 | 4/1995 |
| JP | 9-185313 | 7/1997 |
| JP | 9-329759 | 12/1997 |
| JP | 10-278630 | 10/1998 |
| JP | 2001-242411 | 9/2001 |
| JP | 2001-331084 | 11/2001 |
| JP | 2007-526498 | 9/2007 |

OTHER PUBLICATIONS

Herwig Kogelnik, "Coupled Wave Theory for Thick Hologram Gratings", The Bell System Technical Journal, vol. 48, No. 9, Nov. 1969, pp. 2909-2947.

* cited by examiner

FIRST INTERFERENCE FRINGE
20 μ mt, MODULATION 0.015, 532 nm,
INCIDENCE ANGLE IS 30 DEGREES,
EMISSION ANGLE IS 50 DEGREES,
NO CONTRACTION

SECOND INTERFERENCE FRINGE
20 μ mt, MODULATION 0.015, 532 nm,
INCIDENCE ANGLE IS 30 DEGREES,
EMISSION ANGLE IS 85 DEGREES,
NO CONTRACTION

FIRST INTERFERENCE FRINGE
20 μ mt, MODULATION 0.015, 532 nm,
INCIDENCE ANGLE IS 30 DEGREES,
EMISSION ANGLE IS 50 DEGREES,
3% CONTRACTION

SECOND INTERFERENCE FRINGE
20 μ mt, MODULATION 0.015, 532 nm,
INCIDENCE ANGLE IS 30 DEGREES,
EMISSION ANGLE IS 85 DEGREES,
3% CONTRACTION

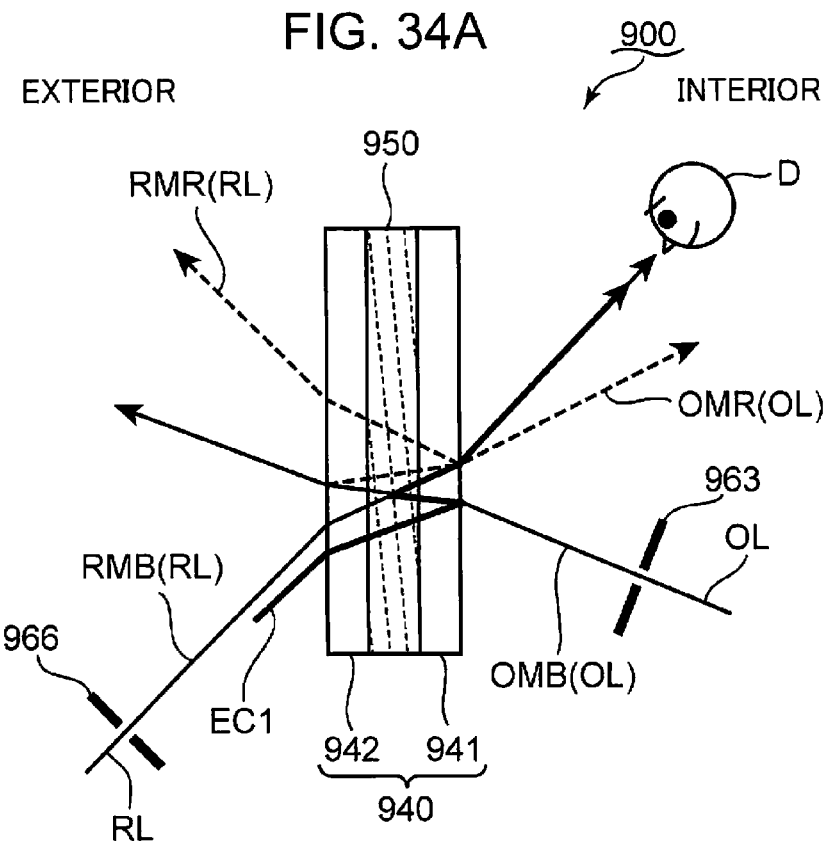
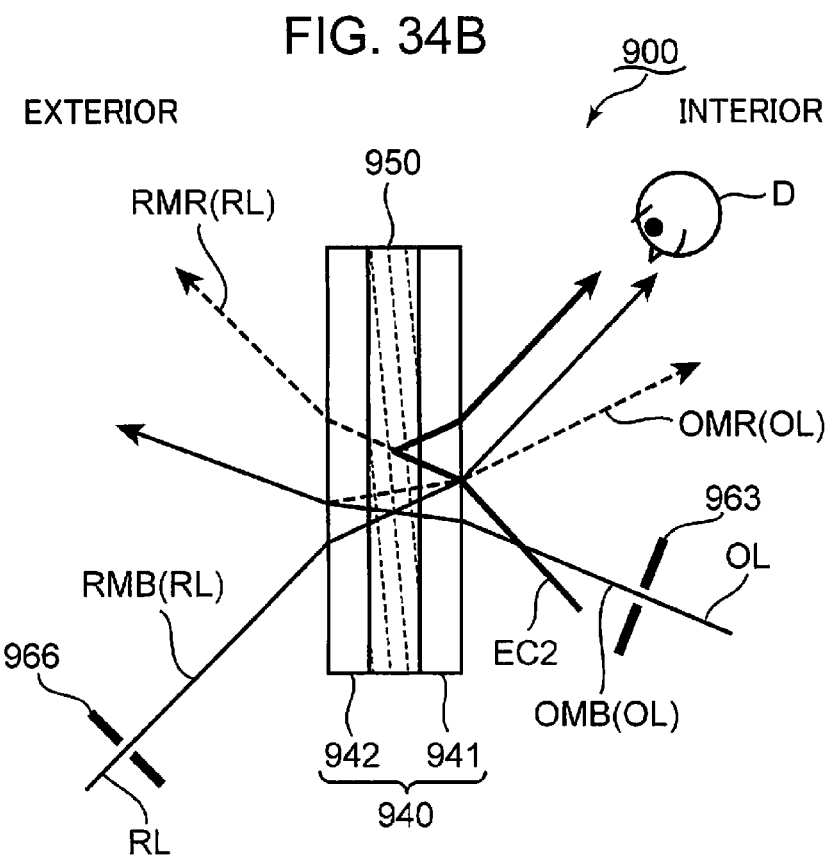

SEE-THROUGH DISPLAY DEVICE AND VEHICLE HAVING SEE-THROUGH DISPLAY DEVICE MOUNTED THEREON

TECHNICAL FIELD

The present invention relates to a see-through display device which is mainly used as an image display device such as a head-up display (HUD) or a head-mounted display (HMD).

BACKGROUND ART

An image display device called a head-up display (HUD) displays information which is required for operation and control in a cockpit of an aircraft or an automobile (e.g. speed information or altitude information). The automobile driver or aircraft pilot may perceive the information displayed by the HUD like the information displayed in front of the windshield.

An image display device called a head-mounted display (HMD) is worn like ordinary eyeglasses for vision correction. A user wearing the HMD may perceive images displayed by the HMD like the image situated in a space in front of lens portions.

Both of the HUD and the HMD allows a user to perceive the image through substantially transparent members such as a windshield or lens portions. Therefore, those image display devices are called "see-through display devices". Such image display devices have been well developed in recent years.

For example, a driver of an automobile on which an HUD is mounted may visibly recognize necessary information for a drive under slight movements of the line of vision while the driver looks forward during the drive. Therefore, the HUD ensures high safety and convenience.

The HMD may provide a user with a large image at a very low level of power consumption. The user may view images at any location and obtain necessary information anywhere and anytime.

The see-through display has to mix external light (natural light) incident from the outside such as a perspective with images to be displayed. For example, an HUD for an automobile uses a combiner nearby the windshield to mix images to be displayed with external light incident from the outside. It is preferred to decrease optical loss in the external light incident from the outside and desired images to be displayed while the images to be displayed are mixed with the external light incident from the outside.

A conventional see-through display device uses a volume hologram as a combiner (c.f. Patent Document 1). If a hologram is used as a combiner, the image displayed by the HUD spreads as a result of lens effect of the hologram. Consequently, a user may view a large image even when the see-through display device is small.

Volume holograms have high diffraction efficiency specifically only for a predetermined wavelength. For example, if a laser source is used as a light source and if a volume hologram is designed so as to have high diffraction efficiency for a wavelength range corresponding to wavelength of a laser beam from the laser source, the HUD may achieve high light utilization efficiency with decreased loss of the natural light.

A volume hologram is exposed in order to form interference fringes in the volume hologram used for the HUD. During the exposure process for the volume hologram, interference fringes are also formed by reflected light from an interface of the volume hologram. It is known that the interference fringes formed by the reflected light at the interface of the volume hologram cause stray light.

Generation principles of stray light in a conventional HUD are described with reference to FIGS. 32 to 35. FIG. 32 is a schematic view of the HUD into which a conventional reflective volume hologram is incorporated. FIG. 33A is a schematic view of an exposure optical system of the HUD shown in FIG. 32. FIG. 33B is a schematic view showing a positional relationship among a main light beam in the exposure optical system shown in FIG. 33A, the volume hologram and the observer. FIGS. 34A and 35 are schematic views of an optical path of stray light in the HUD shown in FIG. 32.

The conventional HUD is described with reference to FIG. 32.

The conventional HUD 900 includes a laser source 910, which emits a laser beam LB, and a projection optical system 920, which generates image light IL from the laser beam LB. The projection optical system 920 includes a lens 921, which receives the laser beam LB from the laser source 910, a return mirror 922, which changes a propagation direction of the laser beam LB from the lens 921, a liquid crystal panel 923, which receives the laser beam LB from the return mirror 922 and generates the image light IL, a projection lens 924, which receives the image light IL from the liquid crystal panel 923, and a screen, 925 which receives the image light IL projected by the projection lens 924.

The HUD 900 further includes a controller 930. The controller 930 controls the laser source 910 and the liquid crystal panel 923 to generate the image light IL for displaying desired images.

For example, the HUD 900 is mounted on a vehicle. FIG. 32 shows a windshield 940 of the vehicle. The windshield 940 is used as a part of the HUD 900. The windshield 940 includes an inner glass 941 defining a space (interior space), in which a driver D exists, and an outer glass 942 forming a boundary with a space (exterior space) outside the vehicle. The driver D is an observer observing images displayed by the HUD 900.

The HUD 900 further includes a volume hologram 950 situated between the inner and outer glasses 941, 942. The volume hologram 950 deflects the image light IL projected from the projection optical system 920 toward the driver D.

The laser source 910 of the HUD 900 emits the laser beam LB. The lens 921 of the projection optical system 920 spreads the laser beam LB. The spread laser beam LB is returned by the return mirror 922 toward the liquid crystal panel 923. Consequently, the laser beam LB enters the liquid crystal panel 923.

The liquid crystal panel 923 forms a desired pattern two-dimensionally under the control performed by the controller 930. The laser beam LB passing through the liquid crystal panel 923 is spatially modulated and becomes the image light IL. The image light IL is projected on the screen 925 from the projection lens 924.

The image light IL emitted from the screen 925 is incident on the volume hologram 950 sandwiched between the inner and outer glasses 941, 942. The volume hologram 950 diffracts the incident image light IL toward the driver D. Consequently, the driver D may view a virtual image VI of the image projected on the screen 925 through the windshield 940.

Paths of the image light IL emitted from the screen 925 and the external light (sunlight, light from tail lamps of vehicles in front of the host vehicle, and headlights of vehicles behind the host vehicle) from the outside of the vehicle are sufficiently taken into account in a design of the HUD 900 shown in FIG. 32. However, as a result of diffraction by the volume hologram 950, unintended light in the design may enter a view of field of the driver D (observer) because of diffraction by the volume hologram 950. The unintended light is referred to as "stray light" hereinafter.

FIG. 33A is a schematic view of the exposure optical system of the volume hologram 950. The optical system for recording interference fringes in the volume hologram 950 of the HUD 900 is described with reference to FIGS. 32 and 33A. The volume hologram 950 functions as a reflective hologram.

The exposure optical system 960 includes a half mirror 961 configured to receive a laser beam RLB which has the same wavelength as the laser beam LB emitted by the laser source 910 described with reference to FIG. 32. The half mirror 961 divides the laser beam RLB into an object light OL and a reference light RL.

The exposure optical system 960 further includes a lens 962, which receives the object light OL, and a pinhole plate 963 situated between the lens 962 and the volume hologram 950. A small hole is formed in the pinhole plate 963.

The object light OL is directed from the half mirror 961 to the lens 962. The lens 962 concentrates the light on the small hole of the pinhole plate 963. Consequently, the object light OL passing through the pinhole plate 963 becomes spherical waves. The object light OL then enters the volume hologram 950.

The exposure optical system 960 further includes a return mirror 964, which deflects the reference light RL toward the volume hologram 950, a lens 965, which receives the reference light RL from the return mirror 964, and a pinhole plate 966 situated between the lens 965 and the volume hologram 950. A small hole is formed in the pinhole plate 966 for the object light OL, like the pinhole plate 963.

The reference light RL propagates from the half mirror 961 toward the return mirror 964. The return mirror 964 returns the reference light RL toward the lens 965. The lens 965 concentrates the light on the small hole of the pinhole plate 966. Consequently, the reference light RL passing through the pinhole plate 966 becomes spherical waves.

The volume hologram 950 includes a surface 951, which the object light OL enters, and a surface 952 opposite to the surface 951. The reference light RL is incident on the surface 952.

The pinhole plate 963 is positioned and angularly set with respect to the volume hologram 950 so that a position of the small hole of the pinhole plate 963, through which the object light OL passes, corresponds to a central region of the screen 925 of the HUD 900 described with reference to FIG. 32. In FIG. 32, the distance from the volume hologram 950 to the central region of the screen 925 is shown by the symbol "L2". Likewise, as shown in FIG. 33A, the distance from the small hole of the pinhole plate 963 to the volume hologram 950 is "L2".

The pinhole plate 966 is positioned and angularly set with respect to the volume hologram 950 so that a position of the small hole of the pinhole plate 966, through which the reference light RL passes, corresponds to a central region of the virtual image VI created by the HUD 900 described with reference to FIG. 32. In FIG. 32, the distance from the volume hologram 950 to the central region of the virtual image VI is shown by the symbol "L1". Likewise, as shown in FIG. 33A, the distance from the small hole of the pinhole plate 966 to the volume hologram 950 is "L1".

If the volume hologram 950 is irradiated for a predetermined time with the object and reference lights OL, RL under the aforementioned optical settings of the exposure optical system 960, interference fringes are recorded in the volume hologram 950. Accordingly, the volume hologram 950 functions as a transmissive hologram as described above.

FIG. 33B schematically shows a path of the main beam in the exposure optical system 960. FIG. 33B shows an optical system after the pinhole plates 963, 966. Only the main beams OMB, RMB of the object and reference lights OL, RL are shown in FIG. 33B to make the generation principles of stray light easily understood.

The generation principles of stray light are described by using the main beams OMB, RMB. However, the same generation principles of stray light are applicable not only to interference between the main beams OMB, RMB but also to other interference generated by two light fluxes.

If light is incident on a transparent object, which is different from the surrounding space (air) in a refractive index, the light is partially subjected to Fresnel reflection at the boundary between the surrounding space and the transparent object.

In FIG. 33B, a space forming the boundary with the surface 951 of the volume hologram 950 is called "interior space". A space forming the boundary with the surface 952 of the volume hologram 950 is called "exterior space".

The main beam OMB of the object light OL enters the surface 951 of the volume hologram 950, and then reaches the surface 952. The main beam OMB is partially subjected to Fresnel reflection according to the aforementioned principle. Consequently, the reflected light OMR of the main beam OMB is generated.

The main beam RMB of the reference light RL enters the surface 952 of the volume hologram 950, and then reaches the surface 951. The main beam RMB is partially subjected to Fresnel reflection according to the aforementioned principle. Consequently, the reflected light RMR of the main beam RMB is generated.

As a result of the aforementioned Fresnel reflection, four light beams pass through the volume hologram 950. Consequently, interference fringes generated by interference among the four beams are recorded in the volume hologram 950.

In the following description, the interference fringes formed by the interference between the main beams OMB, RMB of the object and reference lights OL, RL is called "interference fringe 1". The interference fringe formed by the interference between the main beam OMB of the object light OL and the reflected light OMR of the main beam OMB is called "interference fringe 2". The interference fringe formed by the interference between the main beam RMB of the reference light RL and the reflected light RMR of the main beam RMB is called "interference fringe 3". The interference fringe formed by the interference between the reflected lights OMR, RMS of the main beams OMB, RMB of the object and reference lights OL, RL is called "interference fringe 4". The interference fringe formed by the interference between the main beam OMB of the object light OL and the reflected light RMR of the main beam RMB of the reference light RL is called "interference fringe 5". The interference fringe formed by the interference between the main beam RMB of the reference light RL and the reflected light OMR of the main beam OMB of the object light OL is called "interference fringe 6".

As described above, the six interference fringes are formed on the volume hologram 950. A modulation amount of refractive indexes of the interference fringes 2 to 6 is less than that of the interference fringe 1.

Three interference fringes among the six interference fringes formed in the volume hologram 950 cause stray light directed toward the driver D. The interference fringes causing the stray light are the "interference fringe 1", "interference fringe 3" and "interference fringe 6".

FIG. 34A shows schematically the stray light caused by the interference fringe 1. FIG. 34B shows schematically the stray light caused by the interference fringe 3. FIG. 35 schematically shows the stray light caused by the interference fringe 6. The volume hologram 950 shown in FIGS. 34A to 35 is incorporated in the HUD 900. Therefore, FIGS. 34A to 35 show the volume hologram 950 sandwiched between the inner and outer glasses 941, 942. FIGS. 34A to 35 schematically show the optical system after the pinhole plates 963, 964 to clarify the generation principles of the stray light although the object light OL and reference light RL does not exist after the volume hologram 950 is incorporated in the HUD 900.

FIG. 34A schematically shows the generation principles of the stray light caused by the interference fringe 1. The stray light caused by the interference fringe 1 is described with reference to FIG. 34A.

External light enters the outer glass 942. FIG. 34A shows an external light component EC1 incident on the outer glass 942 at an incidence angle as great as the incidence angle of the main beam OMB of the object light OL on the inner glass 941. The external light component EC1 sequentially passes through the outer glass 942, volume hologram 950 and inner glass 941, and then reaches the boundary between the inner glass 941 and the interior space. The external light component EC1 is partially subjected to Fresnel reflection at the boundary between the inner glass 941 and the interior space, and then propagates again toward the volume hologram 950. The external light component EC1 is then partially diffracted by the interference fringe 1 recorded in the volume hologram 950. Accordingly, the external light component EC1 is partially emitted in the same direction as the main beam RMB of the reference light RL. Thus, the external light component EC1 is partially perceived as the stray light by the driver D.

FIG. 34B shows schematically the generation principles of the stray light caused by the interference fringe 3. The stray light caused by the interference fringe 3 is described with reference to FIG. 34B.

There is also external light incident on the inner glass 941 from the exterior space. FIG. 34B shows an external light component EC2 emitted at an angle as great as the emission angle of the reflected light RMR of the main beam RMB of the reference light RL emitted from the outer glass 942. The external light component EC2 is incident on the inner glass 941 from the interior space. The external light component EC2 then passes through the inner glass 941, and then reaches the volume hologram 950. The external light component EC2 is diffracted by the interference fringe 3 recorded in the volume hologram 950 and emitted in the same direction as the main beam RMB of the reference light RL. Thus, the external light component EC2 is perceived as the stray light by the driver D.

FIG. 35 shows schematically the generation principles of the stray light caused by the interference fringe 6. The stray light caused by the interference fringe 6 is described with reference to FIG. 35.

The interference fringe 6 is formed to allow optical transmission inside the volume hologram 950. FIG. 35 shows an external light component EC3 incident at the same incidence angle as the reflected light OMR of the main beam OMB of the object light OL. The external light component EC3 is diffracted by the interference fringe 6, propagates in the same direction as the main beam RMB of the reference light RL, and is emitted from the inner glass 941. Thus, the external light component EC3 is perceived as the stray light by the driver D.

If interference fringes are recorded by two-light flux interference in the volume hologram 950, as described above, interference is caused by the Fresnel reflected light generated at an interface between the volume hologram 950 and the air. As a result of the interference exposure by the Fresnel reflected light, unintentional interference fringes are recorded in the volume hologram 950. Therefore, stray light directed toward the driver D (observer) is generated.

Patent Document 2 suggests suppressing generation of the Fresnel reflected light at an interface of the volume hologram by means of optical contact liquid dropped between the volume hologram and the non-reflective plate. Since the Fresnel reflected light is less likely to occur, there is little stray light.

If the non-reflective plate and the optical contact liquid are used like the disclosed techniques in Patent Document 2, in order to cause little stray light, process steps increases before exposure process, in which the volume hologram is exposed. In addition to the non-reflective plate and optical close-contact liquid, dedicated equipment is required to use these.

Patent Document 1: JP 2007-526498 A
Patent Document 2: JP 2001-331084 A

SUMMARY OF THE INVENTION

It is an object of the present invention to provide simple techniques for cause little stray light in a see-through display device. Another object of the present invention is to provide a see-through display device configured to display images with excellent visibility and a vehicle on which the see-through display device is mounted.

A see-through display device according to one aspect of the present invention includes: a light source configured to emit light; a projection optical system configured to project image light generated from the light; a transmissive hologram including a first surface on which the image light enters from the projection optical system; and an interface configured to cause Fresnel reflection of the image light deflected by the hologram, wherein the hologram includes a first interference fringe recorded by object light and reference light which are incident on the first surface by means of two-light flux interference; the image light incident on the first surface is deflected by the first interference fringe toward the interface; and the interface reflects the image light toward the first surface.

A vehicle according to another aspect of the present invention has the aforementioned see-through display device mounted thereon, wherein the see-through display device further includes a light diffuser provided on an optical path of a main beam of the reference light used for recording the first interference fringe, and the light diffuser is a dashboard.

A see-through display device according to another aspect of the present invention includes: a light source configured to emit light; a projection optical system configured to project image light generated from the light; a transmissive hologram including a first surface which the image light enters from the projection optical system, a second surface opposite to the first surface, and a first interference fringe formed to allow the image light to propagate from the first surface to the second surface; and an interface configured to cause Fresnel reflection of the image light deflected by the first interference fringe, wherein the image light incident on the interface is S-polarized light, and an emission angle of the image light emitted from the interface is larger than an incidence angle of the image light incident on the first surface.

With the aforementioned see-through display device and the vehicle on which the see-through display device is mounted, stray light generated in the see-through display device may be suppressed by using simple techniques. Therefore, with the see-through display device and the vehicle on which the see-through display device is mounted, high quality images may be displayed with little stray light.

Objects, features, and advantages of the present invention will become more apparent from the following detailed description and the appended drawings.

BRIEF DESCRIPTION OF THE DRAWINGS

FIG. 34A is a schematic view of an optical path of stray light in the HUD shown in FIG. 32.

FIG. 34B schematically shows generation principles about resultant stray light from interference fringes.

DETAILED DESCRIPTION OF THE INVENTION

Figure 1A:
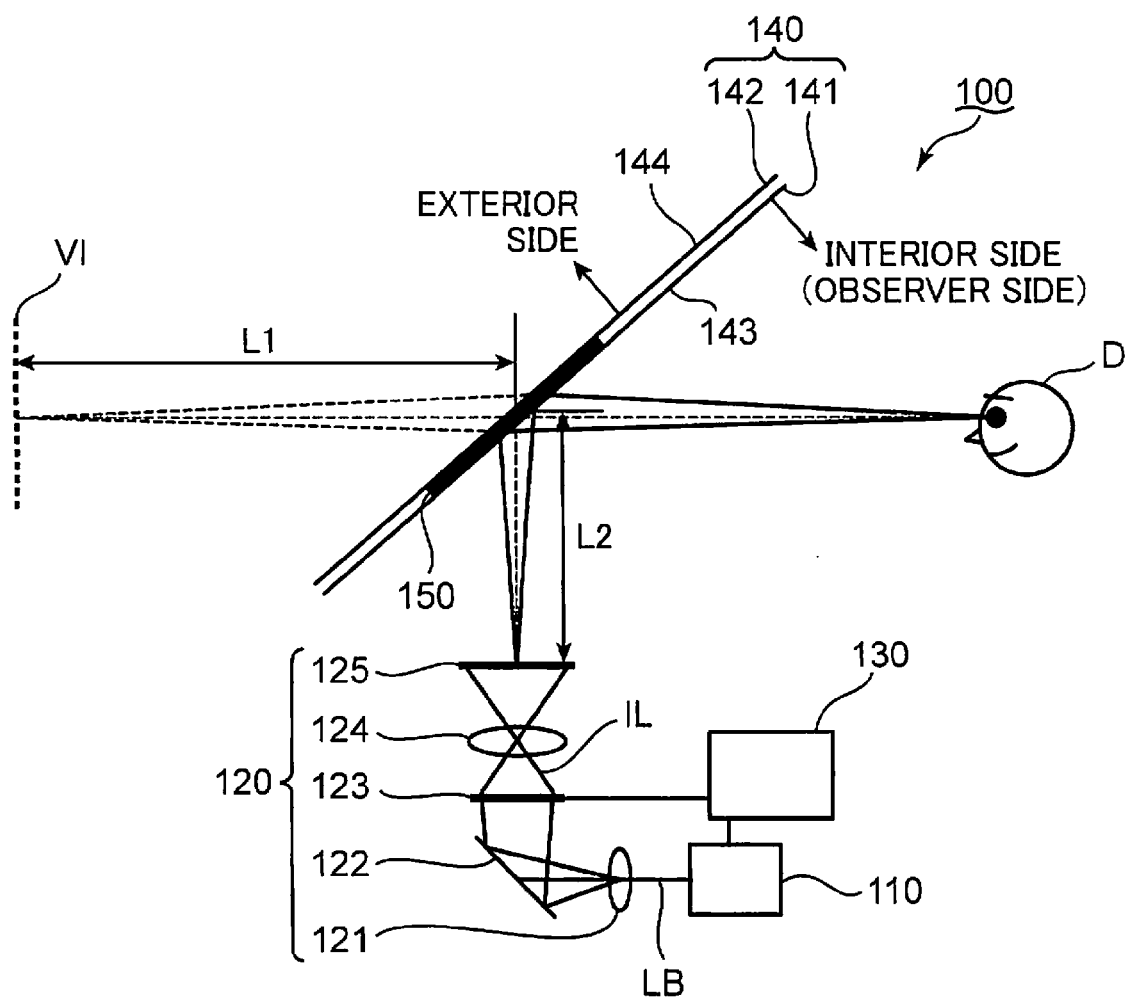
FIG. 1A is a schematic view of an HUD exemplified as the see-through display device according to the first embodiment.

The see-through display device and the vehicle on which the see-through display device is mounted are described with reference to the accompanying drawings. In the following embodiments, similar components are assigned with similar reference numerals or symbols. Redundant description is omitted as appropriate to clarify the description. Configurations, arrangements and shapes shown in the drawings and the description relating to the drawings merely serve to make principles of the see-through display device and vehicle easily understood. The principles of the see-through display device and vehicle are not limited thereto.

<First Embodiment>
(Structure of See-Through Display Device)

FIG. 1A is a schematic view of an HUD 100 exemplified as the see-through display device according to the first embodiment. The HUD 100 is described with reference to FIG. 1A.

The HUD 100 includes a laser source 110, which emits a laser beam LB, and a projection optical system 120, which generates image light IL from the laser beam LB. In the present embodiment, the laser source 110 is exemplified as the light source configured to emit light.

The projection optical system 120 includes a lens 121, which receives the laser beam LB from the laser source 110, a return mirror 122, which changes the propagation direction of the laser beam LB from the lens 121, a liquid crystal panel 123, which receives the laser beam LB from the return mirror 122 and generates the image light IL, a projection lens 124, which receives the image light IL from the liquid crystal panel 123, and a screen 125, which receives the image light IL projected from the projection lens 124.

The HUD 100 further includes a controller 130. The controller 130 controls the laser source 110 and the liquid crystal panel 123. Accordingly, the image light IL is generated to display desired images.

For example, the HUD 100 is mounted on a vehicle. FIG. 1A shows a windshield 140 of a vehicle. The transparent windshield 140 is used as a part of the HUD 100. The windshield 140 includes a transparent inner glass 141 defining a space (interior space), in which a driver D exists, and a transparent outer glass 142 forming a boundary with a space (exterior space) outside the vehicle. The driver D is an observer observing images displayed by the HUD 100. A surface of the inner glass 141 forming a boundary with the interior space is referred to as the inner surface 143 in the following description. The inner surface 143 faces the driver D. The opposite surface of the windshield 140 to the inner surface 143 (i.e. the surface of the outer glass 142) is referred to as the outer surface 144 in the following description. In the present embodiment, the windshield 140 and the inner and outer glasses 141, 142 are exemplified as the transparent substrate.

The HUD 100 further includes a volume hologram 150 situated between the inner and outer glasses 141, 142. The volume hologram 150 deflects the image light IL projected from the projection optical system 120 to the driver D. Unlike the volume hologram 950 described with reference to FIG. 32, the volume hologram 150 of the present embodiment functions as a transmissive hologram.

The laser source 110 of the HUD 100 emits the laser beam LB. The lens 121 of the projection optical system 120 spreads the laser beam LB. The spread laser beam LB is returned by the return mirror 122 toward the liquid crystal panel 123. Consequently, the laser beam LB enters the liquid crystal panel 123.

The liquid crystal panel 123 two-dimensionally forms desired patterns under control of the controller 130. The laser beam LB passing through the liquid crystal panel 123 is spatially modulated and becomes the image light IL. The image light IL passes through the projection lens 124 and is projected on the screen 125.

The image light IL emitted from the screen 125 enters the volume hologram 150 sandwiched between the inner and outer glasses 141, 142. In the following description, the surface of the volume hologram 150 which the image light IL from the projection optical system 120 enters is called the first surface. The opposite surface of the volume hologram 150 to the first surface is called the second surface.

The image light IL emitted from the screen 125 enters the volume hologram 150 sandwiched between the inner and outer glasses 141, 142. The volume hologram 150 diffracts the incident image light IL toward the driver D. Accordingly, the D may view a virtual image VI of the image displayed on the screen 125 through the windshield 140.

As described above, in the present embodiment, a transmissive hologram is used as the volume hologram 150. Therefore, an optical path of the image light IL around the windshield 140 is different from the optical path of the image light IL of the conventional HUD 900 described with reference to FIGS. 32 to 35. The image light IL propagates toward the driver D along the optical path of the image light IL formed by the volume hologram 150 and the windshield 140. Therefore, the driver D may view the virtual image VI of the image projected from the screen 125 through the windshield 140. The optical path of the image light IL around the windshield 140 is described below.

Figure 1B:
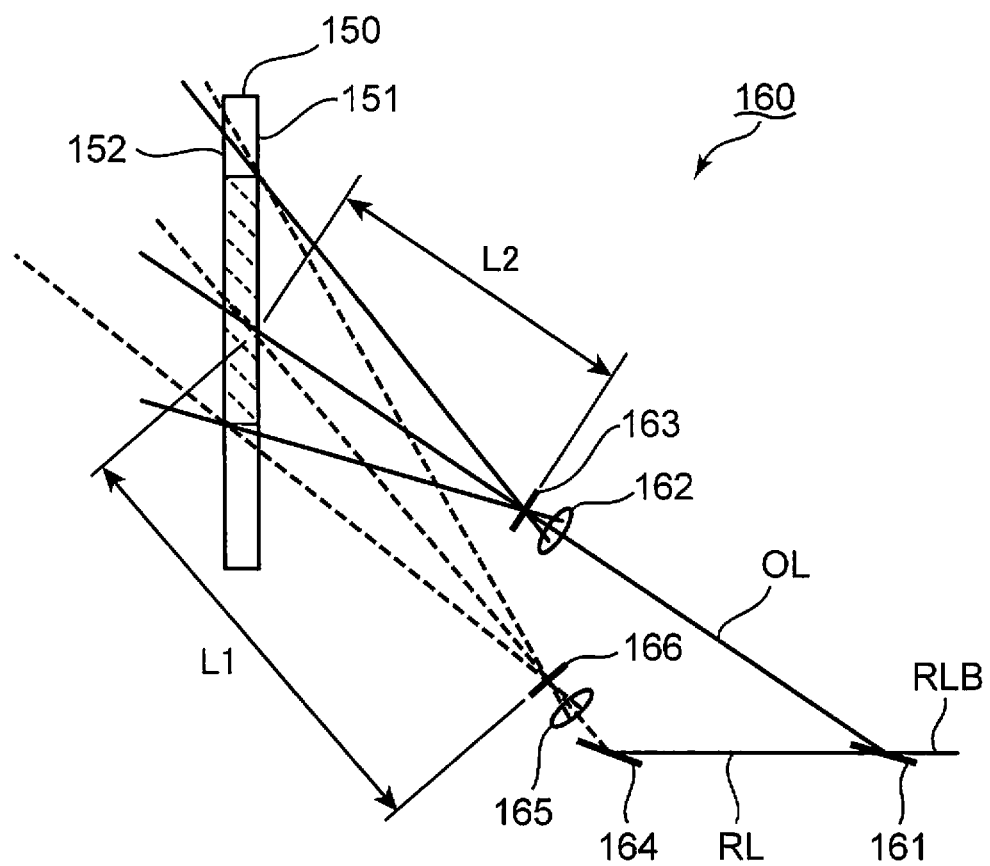
FIG. 1B is a schematic view of an exposure optical system for exposing a volume hologram of the HUD shown in FIG. 1A.

FIG. 1B is a schematic view of an exposure optical system 160 of the volume hologram 150 functioning as a transmissive hologram. The optical system (exposure optical system 160) for recording interference fringes on the volume hologram 150 is described with reference to FIGS. 1A and 1B.

The exposure optical system 160 includes a half mirror 161 which receives a laser beam RLB having the same wavelength as the laser beam LB emitted by the laser source 110 described with reference to FIG. 1A. The half mirror 161 divides the laser beam RLB into an object light OL and a reference light RL.

The exposure optical system 160 further includes a lens 162, which receives the object light OL, and a pinhole plate 163 situated between the lens 162 and the volume hologram 150. A small hole is formed in the pinhole plate 163.

The object light OL is directed from the half mirror 161 to the lens 162. The lens 162 concentrates the light on the small hole of the pinhole plate 163. Accordingly, the object light OL passing through the pinhole plate 163 becomes spherical waves. The object light OL then enters the first surface 151 of the volume hologram 150.

The exposure optical system 160 further includes a return mirror 164, which deflects the reference light RL toward the volume hologram 150, a lens 165, which receives the reference light RL from the return mirror 164, and a pinhole plate 166 situated between the lens 165 and the volume hologram 150. A small hole is formed in the pinhole plate 166, like the pinhole plate 163 for the object light OL.

The reference light RL propagates from the half mirror 161 toward the return mirror 164. The return mirror 164 deflects the reference light RL toward the lens 165. The lens 165 concentrates the light on the small hole of the pinhole plate 166. Accordingly, the reference light RL passing through the pinhole plate 166 becomes spherical waves.

As described above, the volume hologram 150 includes the first surface 151 which the object light OL enters and the second surface 152 opposite to the first surface 151. Unlike the exposure optical system 960 described with reference to FIG. 33A, the return mirror 164, lens 165 and pinhole plate 166 are arranged so that the reference light RL of the exposure optical system 160 of the present embodiment enters the first surface 151 of the volume hologram 150.

An interference fringe is recorded inside the volume hologram 150 by means of the two-light flux interference between the object and reference lights OL, RL incident on the first surface 151 of the volume hologram 150. The interference fringe recorded by the two-light flux interference between the object and reference lights OL, RL is exemplified as the first interference fringe.

Figure 32:
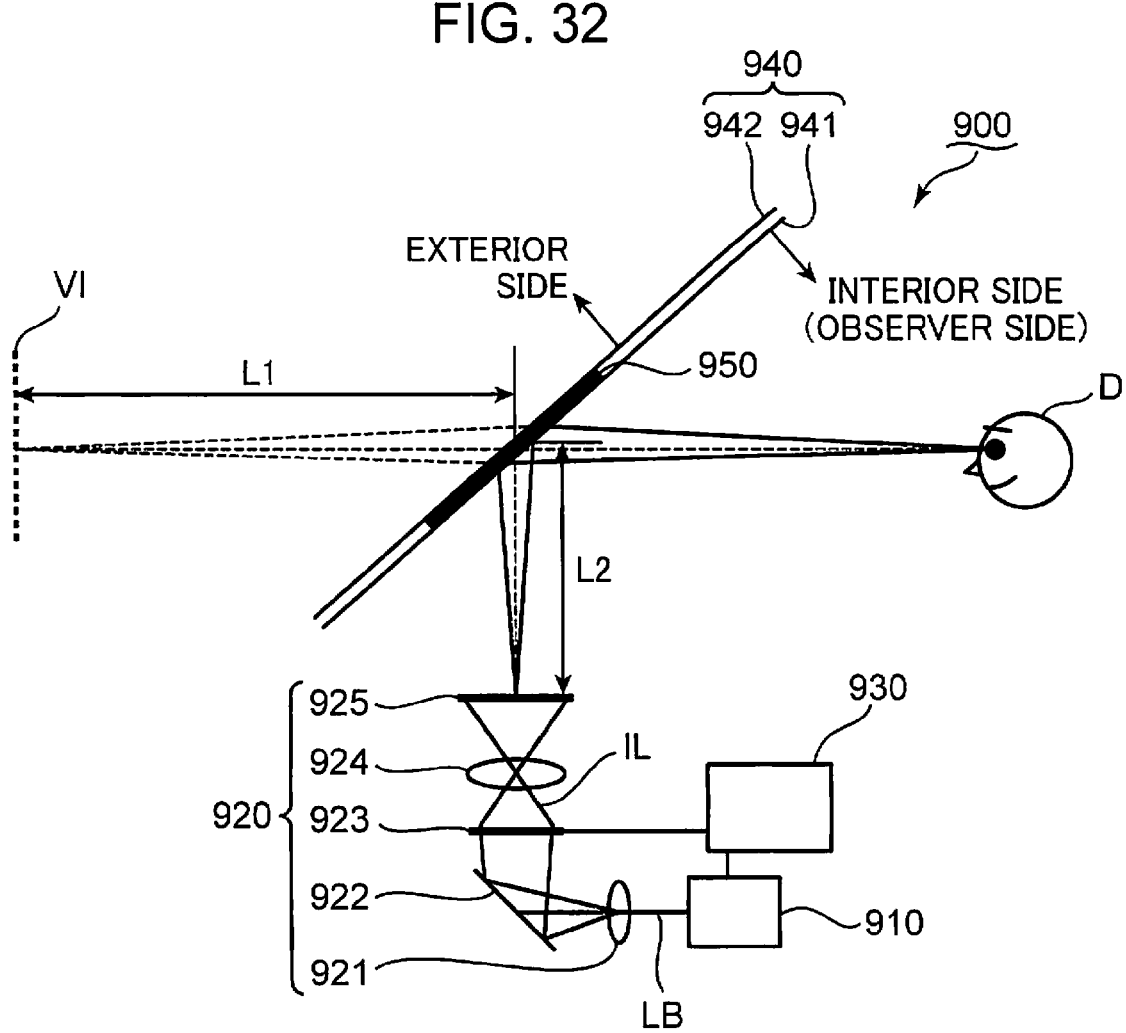
FIG. 32 is a schematic view of an HUD in which a conventional reflective volume hologram is incorporated.
Figure 33A:
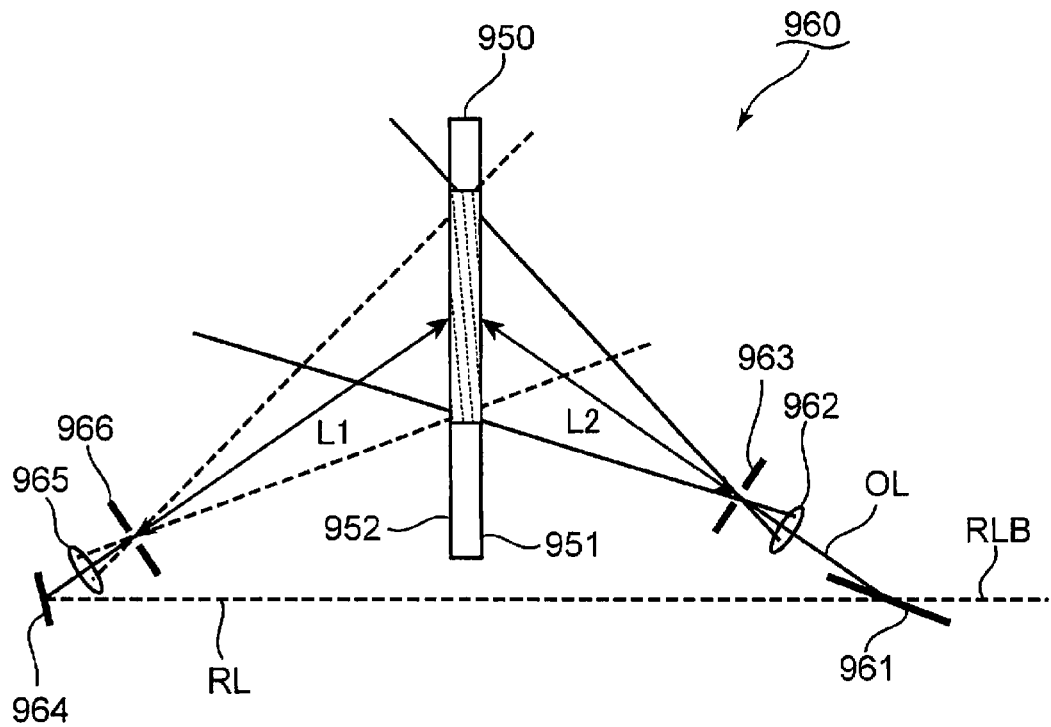
FIG. 33A is a schematic view of an exposure optical system of the HUD shown in FIG. 32.
Figure 33B:
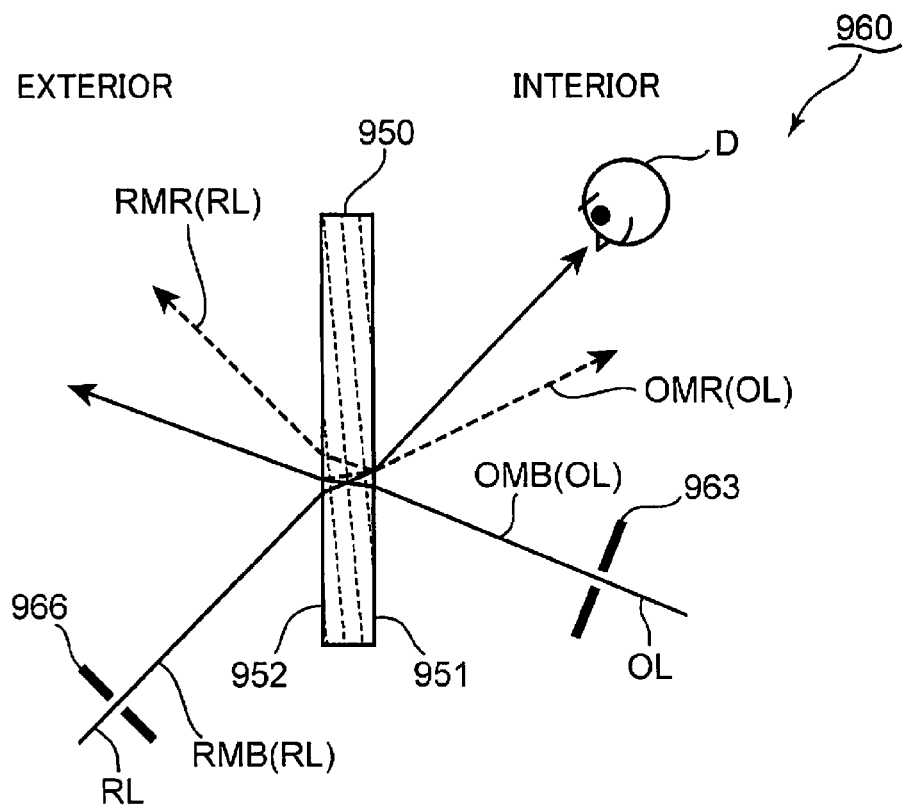
FIG. 33B is a schematic view showing a main beam in the exposure optical system shown in FIG. 33A and a positional relationship between a volume hologram and an observer.

Unlike the volume hologram 950 functioning as a reflective hologram described with reference to FIG. 32, the interference fringe formed by the volume hologram 150 of the present embodiment allows light to propagate from the first surface 151 to the second surface 152. Therefore, the volume hologram 150 of the present embodiment functions as a transmissive hologram.

The pinhole plate 163 is positioned and angularly set with respect to the volume hologram 150 so that the position of the small hole of the pinhole plate 163, through which the object light OL passes, corresponds to the central region of the screen 125 of the HUD 100 described with reference to FIG. 1A. In FIG. 1A, the distance from the volume hologram 150 to the central region of the screen 125 is shown by the symbol "L2". Likewise, as shown in FIG. 1B, the distance from the small hole of the pinhole plate 163 to the volume hologram 150 is "L2".

The pinhole plate 166 is positioned and angularly set with respect to the volume hologram 150 so that the position of the small hole of the pinhole plate 166, through which the reference light RL passes, corresponds to the central region of the virtual image VI created by the HUD 100 described with reference to FIG. 1A. In FIG. 1A, the distance from the volume hologram 150 to the central region of the virtual image VI is shown by the symbol "L1". Likewise, as shown in FIG. 1B, the distance from the small hole of the pinhole plate 166 to the volume hologram 150 is "L1".

If the volume hologram 150 is irradiated for a predetermined time with the object and reference lights OL, RL under the aforementioned optical settings of the exposure optical system 160, interference fringes are recorded in the volume hologram 150. Consequently, as described above, the volume hologram 150 functions as a transmissive hologram.

If photopolymer is used as a volume hologram, a phase hologram (a type of interference patterns) is typically formed in the volume hologram. If photopolymer is used as a volume hologram, irradiation with ultraviolet radiation or heat treatment is typically performed after the exposure to fix the interference fringe. Materials other than the photopolymer may be used for the volume hologram in the present embodiment. For example, photosensitive photographic materials (e.g. silver halide), thermoplastic materials or photoresist may be used as materials for the volume hologram. Alternatively, other suitable materials for the volume hologram may be used. The principles of the present embodiment are not limited to specific materials to be used for the volume hologram.

Figure 2:
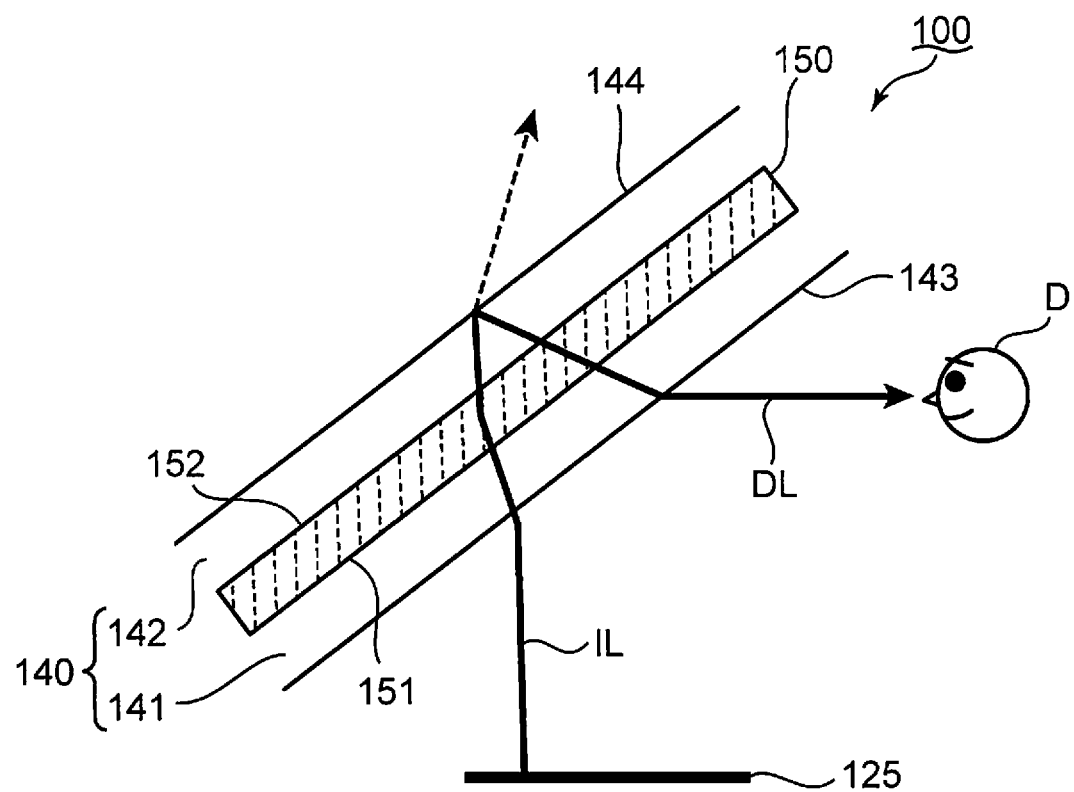
FIG. 2 is a schematic view of an optical path of image light in the volume hologram of the HUD shown in FIG. 1A.

FIG. 2 schematically shows an optical path of the image light IL in the volume hologram 150 in which an interference fringe is formed so as to allow transmission of the image light IL. The optical path of the image light IL around the windshield 140 is described with reference to FIG. 2.

FIG. 2 shows the screen 125 of the HUD 100 and the image light IL emitted from the screen 125. The image light IL is incident on the inner glass 141 of the windshield 140. The image light IL is then transmitted through the inner glass 141 and enters the first surface 151 of the volume hologram 150. The first surface 151 (incidence surface of the object and reference lights OL, RL) of the volume hologram 150 in the windshield 140 faces the driver D.

The interference fringe formed in the volume hologram 150 diffracts the image light IL at a predetermined diffraction angle and allows the light to be transmitted from the first surface 151 to the second surface 152. Therefore, the image light IL incident on the volume hologram 150 propagates toward the outer glass 142 without being directed to the driver D. In the following description, the image light diffracted by the volume hologram 150 is called the diffracted light DL.

Figure 3:
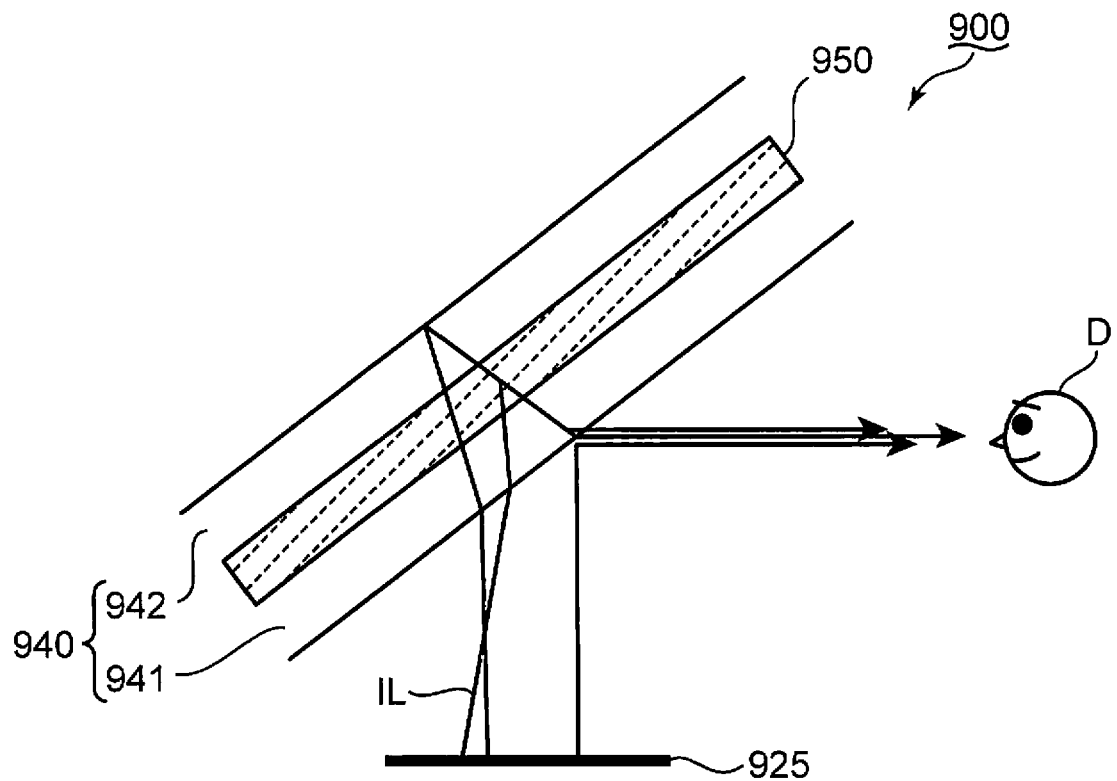
FIG. 3 is a schematic view of an optical path of image light in a reflective volume hologram used in a conventional HUD.

FIG. 3 schematically shows an optical path of the image light IL in the transmissive volume hologram 950 described with reference to FIGS. 32 to 35. Differences in the optical path of the image light IL between the transmissive volume hologram 150 and the reflective volume hologram 950 are described with reference to FIGS. 2 and 3.

FIG. 3 shows the screen 925 of the HUD 900 and the image light IL emitted from the screen 925. The image light IL emitted from the screen 925 is incident on the inner glass 941 of the windshield 940. The image light IL is then transmitted through the inner glass 941 and enters the volume hologram 950.

As described above, the volume hologram 950 functions as a reflective hologram. Therefore, the interference fringe formed in the volume hologram 950 directly diffracts the image light IL toward the driver D.

An optical path of the image light IL after the transmission through the volume hologram 150 is described with reference to FIGS. 1A to 2 again.

As described above, the diffracted light DL diffracted by the volume hologram 150 propagates toward the outer surface 144 of the outer glass 142. A part of the diffracted light DL is subjected to Fresnel reflection at the outer surface 144 of the outer glass 142. The diffracted light DL reflected by the outer glass 144 is again transmitted through the outer glass 142 and the volume hologram 150, and eventually emitted from the inner surface 143 of the inner glass 141 to the driver D. The propagation direction of the diffracted light DL from the outer glass 142 toward the inner glass 141 is significantly different from the propagation direction of the object and reference lights OL, RL in the exposure process described with reference to FIG. 1B. Therefore, the volume hologram 150 is less likely to diffract the diffracted light DL propagating from the outer glass 142 toward the inner glass 141. The remaining diffracted light DL without Fresnel reflection at the outer surface 144 of the outer glass 142 is emitted to the outside of the vehicle along the dotted line shown in FIG. 2. Thus, the driver D may observe the virtual image VI of the image projected on the screen 125 under usage of the volume hologram 150 functioning as a transmissive hologram, like the conventional HUD 900. In the present embodiment, the outer surface 144 of the outer glass 142 is exemplified as the interface which reflects the image light by means of Fresnel reflection.

Figure 4A:
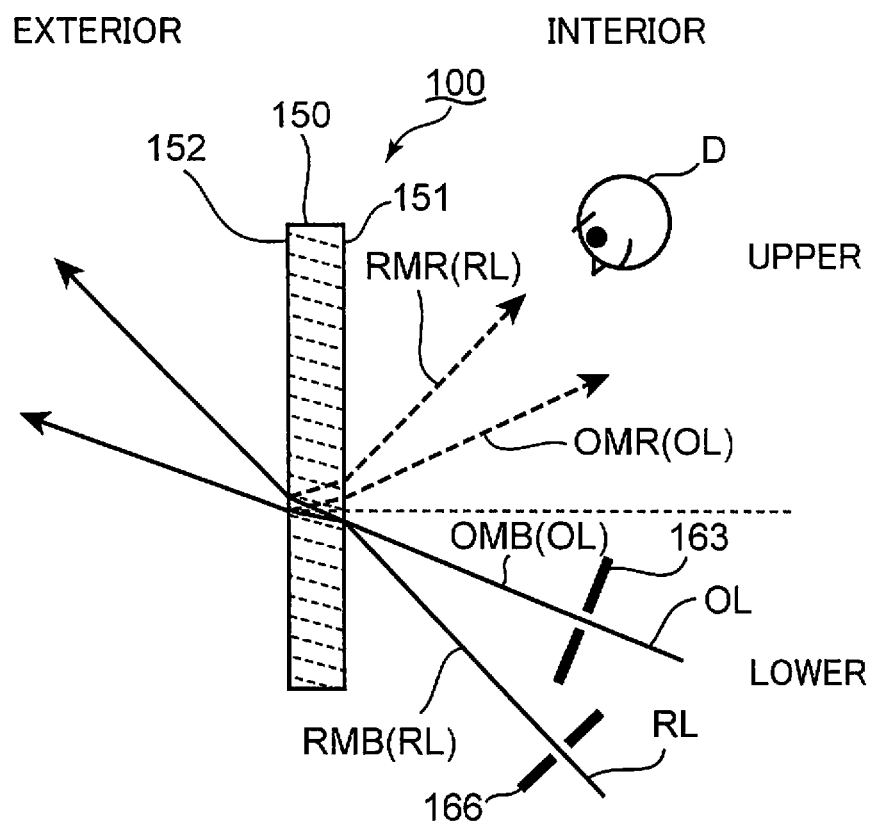
FIG. 4A is a schematic view of a path of a main beam in the exposure optical system shown in FIG. 1B.

FIG. 4A schematically shows a path of a main beam in the exposure optical system 160. Stray light generated in the HUD 100 which incorporates the volume hologram 150 functioning as a transmissive hologram is described with reference to FIG. 4A.

Like the HUD 900, stray light occurs in the HUD 100 as well. FIG. 4A shows an optical system after the pinhole plates 163, 166. In order to make the generation principles of stray light easily understood, only the main beams OMB, RMB of the object and reference lights OL, RL are plotted in FIG. 4A.

The generation principles of stray light are described by using the main beams OMB, RMB. However, the same generation principles of stray light are applicable not only to interference between the main beams OMB, RMB, but also to other interference generated by two light fluxes (e.g. when angles are ranged within a tolerant angle at which interference occurs or when wavelengths are different from each other).

When light is incident on a transparent object, which is different from the surrounding space (air) in a refractive index, a part of the light is subjected to Fresnel reflection at a boundary between the surrounding space and the transparent object.

In FIG. 4A, the space forming the boundary with the first surface 151 of the volume hologram 150 is called "interior space". The space forming the boundary with the second surface 152 of the volume hologram 150 is called "exterior space".

The main beam OMB of the object light OL enters the first surface 151 of the volume hologram 150, and then reaches the second surface 152. A part of the main beam OMB is subjected to Fresnel reflection according to the aforementioned principles. Therefore, the reflected light OMR of the main beam OMB is generated.

Likewise, the main beam RMB of the reference light RL enters the first surface 151 of the volume hologram 150, and then reaches the second surface 152. A part of the main beam RMB is subjected to Fresnel reflection according to the aforementioned principles. Therefore, the reflected light RMR of the main beam RMB is generated.

As a result of the aforementioned Fresnel reflection, four light beams pass through the volume hologram 950. Consequently, interference fringes resulting from interference among the four beams are recorded in the volume hologram 950.

In the following description, the interference fringe formed by the interference between the main beams OMB, RMB of the object and reference lights OL, RL is called "interference fringe 1". The interference fringe formed by the interference between the main beam OMB of the object light OL and the reflected light OMR of the main beam OMB is called "interference fringe 2". The interference fringe formed by the interference between the main beam RMB of the reference light RL and the reflected light RMR of the main beam RMB is called "interference fringe 3". The interference fringe formed by the interference between the reflected lights OMR, RMS of the main beams OMB, RMB of the object and reference lights OL, RL is called "interference fringe 4". The interference fringe formed by the interference between the main beam OMB of the object light OL and the reflected light RMR of the main beam RMB of the reference light RL is called "interference fringe 5". The interference fringe formed by the interference between the main beam RMB of the reference light RL and the reflected light OMR of the main beam OMB of the object light OL is called "interference fringe 6".

As described above, the six interference fringes are formed in the volume hologram 150. The interference fringes 2 to 6 have lower modulation amounts of refractive indexes than the interference fringe 1 does.

Three interference fringes out of the six interference fringes formed in the volume hologram 150 cause stray light directed toward the driver D. The interference fringes causing the stray light are the "interference fringe 1", "interference fringe 3" and "interference fringe 4".

Figure 4B:
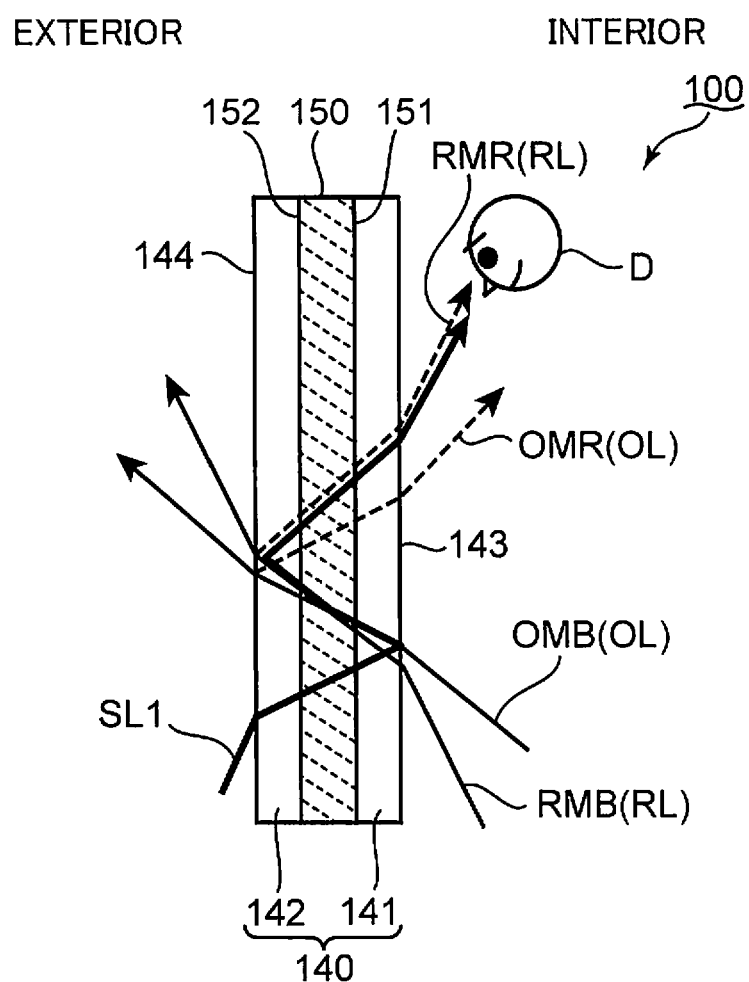
FIG. 4B is a schematic view showing generation principles of resultant stray light from interference fringes recorded in the volume hologram of the HUD shown in FIG. 1A.
Figure 5A:
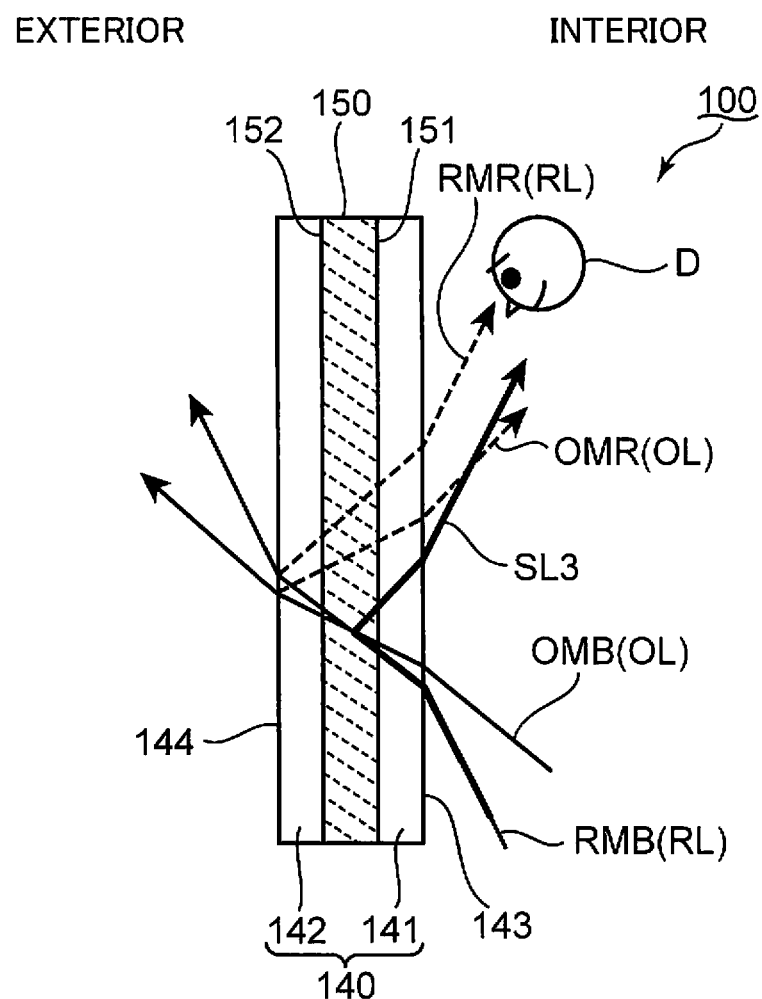
FIG. 5A is a schematic view showing generation principles of stray light caused by interference fringes recorded in the volume hologram of the HUD shown in FIG. 1A.
Figure 5B:
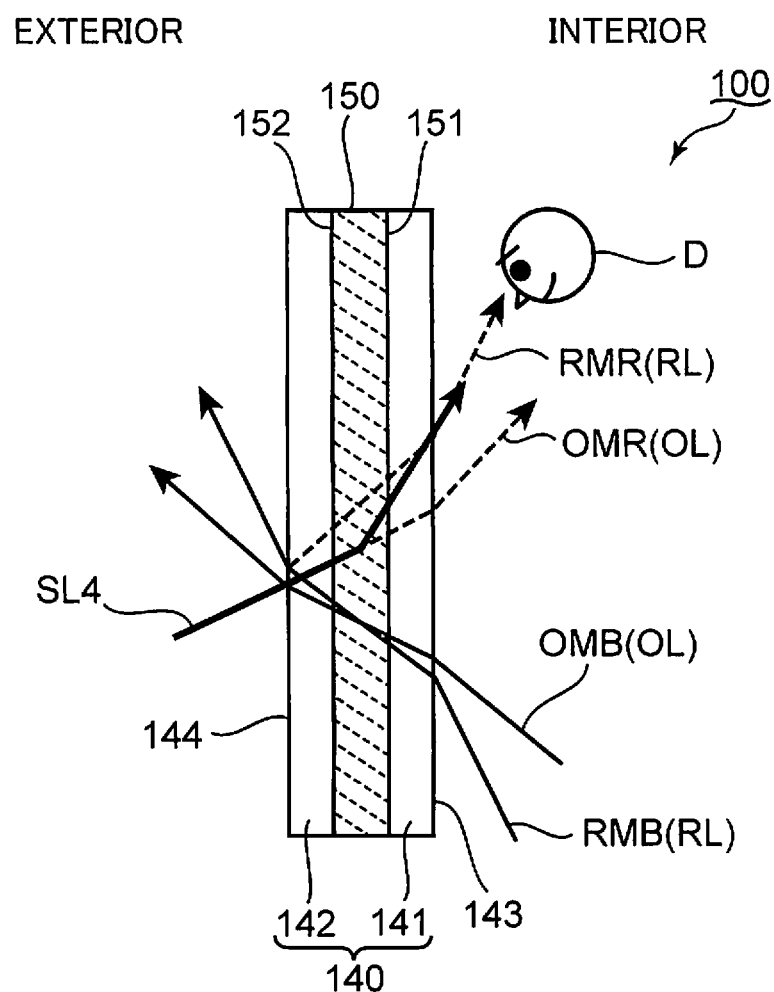
FIG. 5B is a schematic view showing generation principles of stray light caused by interference fringes recorded in the volume hologram of the HUD shown in FIG. 1A.

FIG. 4B schematically shows stray light caused by the interference fringe 1. FIG. 5A schematically shows stray light caused by the interference fringe 3. FIG. 5B schematically shows stray light caused by the interference fringe 4. The volume hologram 150 shown in FIGS. 4B to 5B is incorporated in the HUD 100. Therefore, FIGS. 4B to 5B show the volume hologram 150 sandwiched between the inner and outer glasses 141, 142. After the volume hologram 150 is incorporated in the HUD 100, the object and reference lights OL, RL are not present, but FIGS. 4B to 5B schematically show the optical system after the pinhole plates 163, 164 as well to explain clearly the generation principles of stray light.

FIG. 4B schematically shows the generation principles of the stray light caused by the interference fringe 1. The stray light caused by the interference fringe 1 is described with reference to FIG. 4B.

The external light enters the outer glass 142. FIG. 4B shows an external light component SL1 incident on the outer glass 142 at the same incidence angle as the incidence angle of the main beam OMB of the object light OL on the inner glass 141. The external light component SL1 sequentially passes through the outer glass 142, volume hologram 150 and inner glass 141 and reaches the boundary between the inner glass 141 and the interior space. A part of the external light component SL1 is subjected to Fresnel reflection at the boundary between the inner surface 143 of the inner glass 141 and the interior space, and then propagates again toward the volume hologram 150. After that, a part of the external light component SL1 is diffracted by the interference fringe 1 recorded in the volume hologram 150. Consequently, the external light component SL1 partially propagates along the same path as the main beam RMB of the reference light RL and is subjected to Fresnel reflection at the outer surface 144 of the outer glass 142. Eventually, a part of the external light component SL1 is emitted in the same direction as the reflected light RMR of the main beam RMB of the reference light RL. Accordingly, a part of the external light component SL1 is perceived as stray light by the driver D.

FIG. 5A schematically shows the generation principle of the stray light caused by the interference fringe 3. The stray light caused by the interference fringe 3 is described with reference to FIG. 5A.

There is external light incident on the inner glass 141 from the exterior space as well. FIG. 5A shows an external light component SL3 incident on the inner glass 141 at the same incidence angle as the main beam RMB of the reference light RL. The external light component SL3 is incident on the inner glass 141 from the interior space. Then, the external light component SL3 passes through the inner glass 141 and reaches the volume hologram 150. The interference fringe 3 recorded in the volume hologram 150 diffracts a part of the external light component SL3 in the same direction as the reflected light RMR of the main beam RMB of the reference light RL. Eventually, the external light component SL3 is partially emitted from the inner glass 141 in the same direction as the reflected light RMR of the main beam RMB of the reference light RL. Accordingly, the external light component SL3 is perceived as stray light by the driver D.

FIG. 5B schematically shows the generation principle of the stray light caused by the interference fringe 4. The stray light caused by the interference fringe 4 is described with reference to FIG. 5B.

FIG. 5B shows an external light component SL4 incident on the outer surface 144 at the same incidence angle as the reflection angle of the reflected light OMR of the main beam OMB of the object light OL at the outer surface 144 of the outer glass 142. The external light component SL4 is diffracted by the interference fringe 4, propagates in the same direction as the reflected light RMR of the main beam RMB of the reference light RL, and is emitted from the inner glass 141. Accordingly, the external light component SL4 is perceived as stray light by the driver D.

(Effects of the See-Through Display Device)

Effects of the HUD 100 exemplified as the see-through display device of the first embodiment are described below.

The HUD 100 of the present embodiment includes the volume hologram 150 functioning as a transmissive hologram. As described with reference to FIG. 1B, in the exposure process for recording interference fringes in the volume hologram 150, the reference and object lights RL, OL are incident on the first surface 151 of the volume hologram 150. Paths of the stray light generated by the resultant interference fringes in the volume hologram 150 are similar to the stray light generation paths in the volume hologram 950 functioning as a reflective hologram described with reference to FIGS. 32 to 35.

Figure 35:
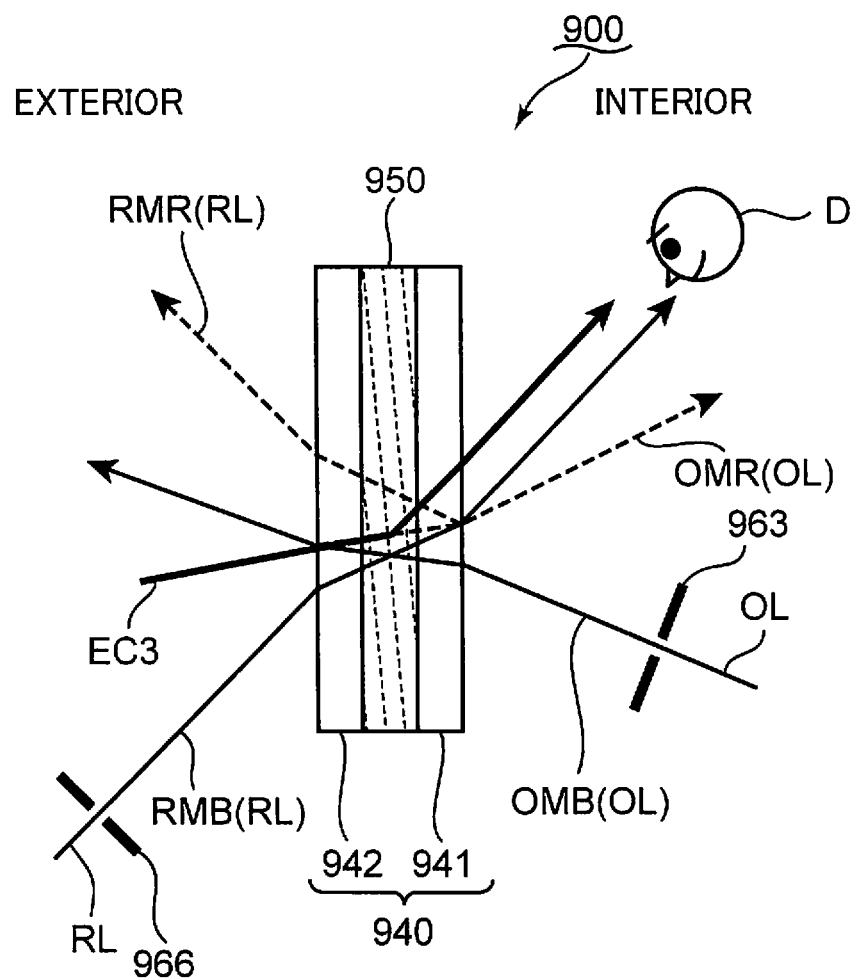
FIG. 35 is a schematic view of an optical path of stray light in the HUD shown in FIG. 32.

For example, in comparison between FIGS. 5B and 35, it is figured out that the stray light generation paths caused by the interference fringe 4 in the volume hologram 150 is similar to the stray light generation paths caused by the interference fringe 6 in the volume hologram 950. The volume hologram 150 used in the present embodiment may significantly reduce luminous intensity of the stray light (external light component SL4) caused by the interference fringe 4 in comparison with luminous intensity of the stray light (external light component EC3) caused by the interference fringe 6 in the volume hologram 950.

Brightness of stray light depends on diffraction efficiency of formed interference fringes. The diffraction efficiency of the interference fringes depends on a light amount of the two light fluxes to record the interference fringes. If the light amount of the two light fluxes is high when the interference fringes are recorded, the diffraction efficiency of the recorded interference fringes becomes high.

The interference fringe 6 of the volume hologram 950 is generated by interference between two light fluxes, i.e. the main beam RMB of the reference light RL and the reflected light OMR of the main beam OMB of the object light OL. On the other hand, the interference fringe 4 of the volume hologram 150 is generated by interference between the reflected lights OMR, RMR of the main beams OMB, RMB of the object and reference lights OL, RL. Thus, the interference fringe 4 of the volume hologram 150 is generated by two light fluxes, i.e. the reflected lights OMR, RMR caused by Fresnel reflection. Therefore, the interference fringe 4 is formed at a lower light amount than that of the beams contributing to the record of the interference fringe 6 of the volume hologram 950. Accordingly, the diffraction efficiency of the interference fringe 4 of the volume hologram 150 used in the HUD 100 of the present embodiment becomes lower than the interference fringe 6 of the volume hologram 950 of the HUD 900. In comparison between stray lights generated in similar paths (external light components SL4, EC3), the stray light (external light component SL4) in the HUD 100 is less bright than the stray light (external light component EC3) in the HUD 900. Therefore, the HUD 100 may display high quality images with better visibility than the HUD 900.

For example, if the Fresnel reflectance is 5%, the diffraction efficiency of the interference fringe 4 of the volume hologram 150 is 1/20 times as high as the diffraction efficiency of the interference fringe 6 of the volume hologram 950. Therefore, the brightness of the stray light (external light component SL4) in the HUD 100 may be reduced to 1/20 of the brightness of the stray light (external light component EC3) in the HUD 900.

<Second Embodiment>

Figure 6:
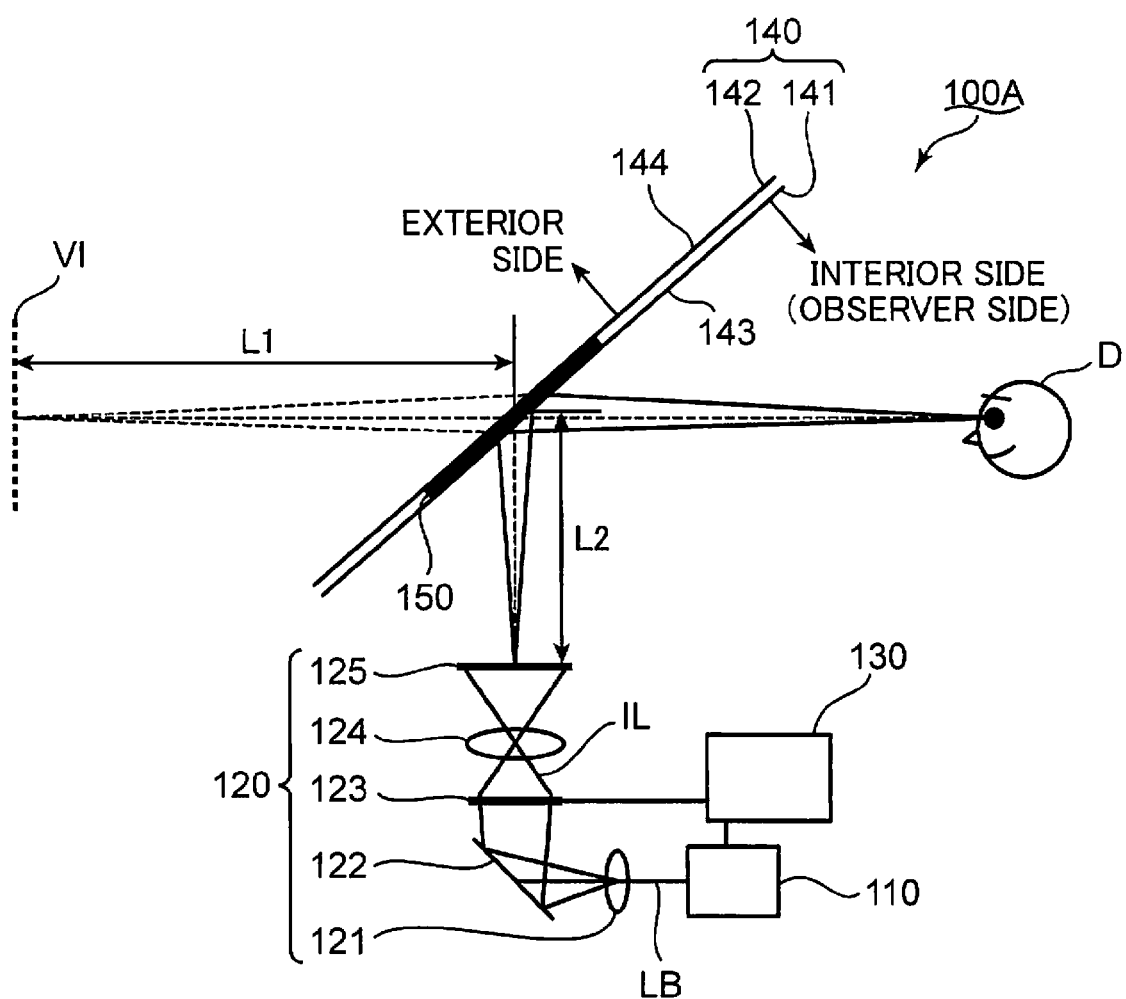
FIG. 6 is a schematic view of an HUD exemplified as the see-through display device according to the second embodiment.

FIG. 6 is a schematic view of an HUD 100A exemplified as the see-through display device according to the second embodiment. The HUD 100A is described with reference to FIG. 6. Similar components to those of the HUD 100 described in the context of the first embodiment are assigned with similar reference numerals or symbols. The descriptions in the first embodiment are applied to the same components as those of the HUD 100.

Like the HUD 100 of the first embodiment, the HUD 100A includes the laser source 110, projection optical system 120, controller 130, windshield 140, and volume hologram 150. The HUD 100A of the present embodiment further includes a half-wavelength plate mounted on the inner surface 143 of the windshield 140.

Figure 7:
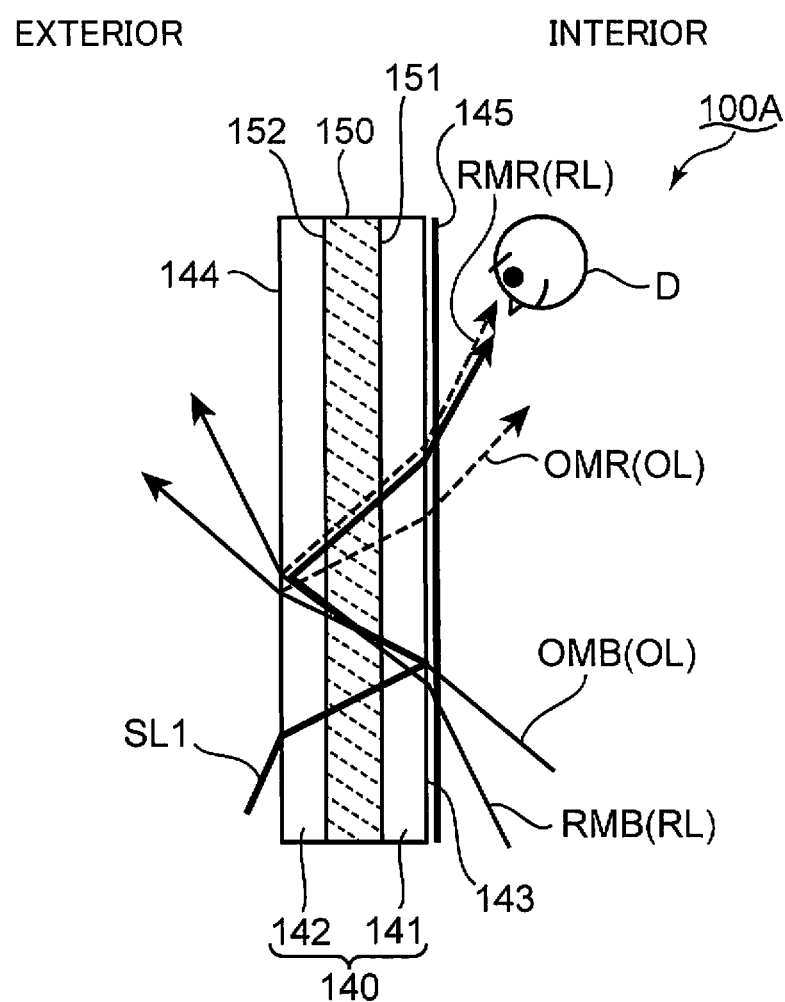
FIG. 7 is a schematic enlarged view of the HUD shown in FIG. 6 around the windshield.

FIG. 7 is a schematic enlarged view around the windshield 140 of the HUD 100A. The HUD 100A is described with reference to FIGS. 6 and 7.

The half-wavelength plate 145 mounted on the inner surface 143 of the windshield 140 reduces brightness of the external light component SL1, which is caused by the interference fringe 1 formed in the volume hologram 150 and perceived as stray light. In the present embodiment, the half-wavelength plate 145 is situated across an optical path of the image light IL toward the first surface 151 of the volume hologram 150. Alternatively, the half-wavelength plate 145 may be situated across an optical path toward the second surface 152 of the volume hologram 150. Brightness reduction principles (described below) for the external light component SL1 may be applied to the half-wavelength plate 145 arranged along the first or second surface 151, 152.

P-polarized light has small reflectance than S-polarized light. Without the half-wavelength plate 145, an S-polarized light component of the external light incident from the exterior space becomes stray light as an S-polarized light component. The P-polarized light component also becomes the stray light as a P-polarized light component.

With the half-wavelength plate 145, the S-polarized light component of the external light becomes the P-polarized light at the interface between the half-wavelength plate 145 and the air. The P-polarized light component subjected to Fresnel reflection at the interface between the half-wavelength plate 145 and the air again passes through the half-wavelength plate 145 and returns into the S-polarized light component. Eventually, the S-polarized light component is converted into the P-polarized light component when the S-polarized light component is emitted from the half-wavelength plate 145 toward the driver D.

Figure 8:
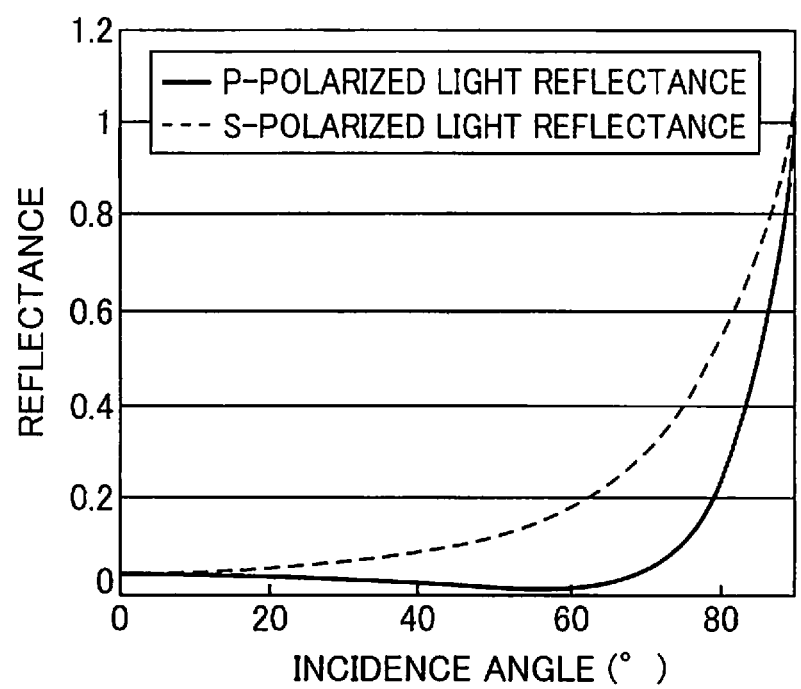
FIG. 8 is a graph schematically showing a relationship between an incidence angle and a reflectance.

FIG. 8 is a graph schematically showing a relationship between an incidence angle and reflectance. The graph shown in FIG. 8 represents differences in optical characteristics between the S-polarized and P-polarized light components. Transmittance of the external light component SL1 which is caused by the interference fringe 1 in the volume hologram 150 and perceived as stray light is described with reference to FIGS. 7 and 8.

In a calculation for transmittance of the external light component SL, for example, a value of "1.5" may be used as the refractive index of the inner glass 141, the outer glass 142 and the volume hologram 150. A value of "45°" may be used as the incidence angle of the main beam OMB of the object light OL on the inner glass 141. A value of "50%" may be used as the diffraction efficiency of the interference fringe 1 recorded in the volume hologram 150. A value of "5°" may be used as the deflection angle (the angle between the main beams OMB, RMB of the object and reference lights OL, RL in the volume hologram 150).

Without the half-wavelength plate 145 under the aforementioned calculation conditions, a ratio of the S-polarized light emitted from the inner glass 141 in the same direction as that of the reflected light RMR of the main beam RMB of the reference light RL with respect to the incident light becomes "0.5%". The ratio of the P-polarized light becomes "0%" under the same conditions.

The aforementioned difference in the ratio of the emitted light between the S-polarized and P-polarized lights is caused by a difference in characteristics about transmittance and reflectance between the S-polarized and P-polarized lights. In short, the transmittance of the S-polarized light is 91% at the interface between the outer glass 142 and the air whereas the transmittance of the P-polarized light is 99% at the interface between the outer glass 142 and the air. The reflectance of the S-polarized light is 9.2% at the interface between the inner glass 141 and the air whereas the reflectance of the P-polarized light is 0.85% at the interface between the inner glass 141 and the air. The reflectance of the S-polarized light is 14% at the interface between the outer glass 142 and the air whereas the reflectance of the P-polarized light is 0.016% at the interface between the outer glass 142 and the air. The transmittance of the S-polarized light is 86% at the interface between the inner glass 141 and the air whereas the transmittance of the P-polarized light is 100% at the interface of the inner glass 141 and the air.

With the half-wavelength plate 145 under the aforementioned calculation conditions (c.f. FIG. 7), a ratio of the S-polarized light emitted from the inner glass 141 in the same direction as that of the reflected light RMR of the main beam RMB of the reference light RL with respect to the incident light becomes "0.046%". The ratio of the P-polarized light under the same conditions becomes "0.001%". In short, the total light amount emitted from the inner glass 141 in the same direction as that of the reflected light RMR of the main beam RMB of the reference light RL is reduced by the half-wavelength plate 145 by an order of magnitude or to a greater degree. This is caused by the smaller reflectance of the P-polarized light component than the S-polarized light component at the interface between the windshield 140 and the air.

With the half-wavelength plate 145, both of the S-polarized and P-polarized light components on the outer glass 142 are subjected to Fresnel reflection once as the P-polarized light component to decrease their transmittance as a whole. Therefore, the half-wavelength plate 145 reduces the brightness of the external light component SL1 which is caused by the interference fringe 1 in the volume hologram 150 and perceived as stray light. Thus, the HUD 100A may display high quality images.

The half-wavelength plate 145 shown in FIG. 7 is mounted on the inner surface 143 of the windshield 140. Alternatively, the half-wavelength plate 145 may be mounted between the first surface 151 of the volume hologram 150 and the inner glass 141. Yet alternatively, the half-wavelength plate 145 may be mounted between the second surface 152 of the volume hologram 150 and the outer glass 142. Further alternatively, the half-wavelength plate 145 may be mounted on the outer surface 144 of the windshield 140. The brightness of the external light component SL1 is advantageously reduced under any of these arrangements of the half-wavelength plate 145.

<Third Embodiment>

Figure 9:
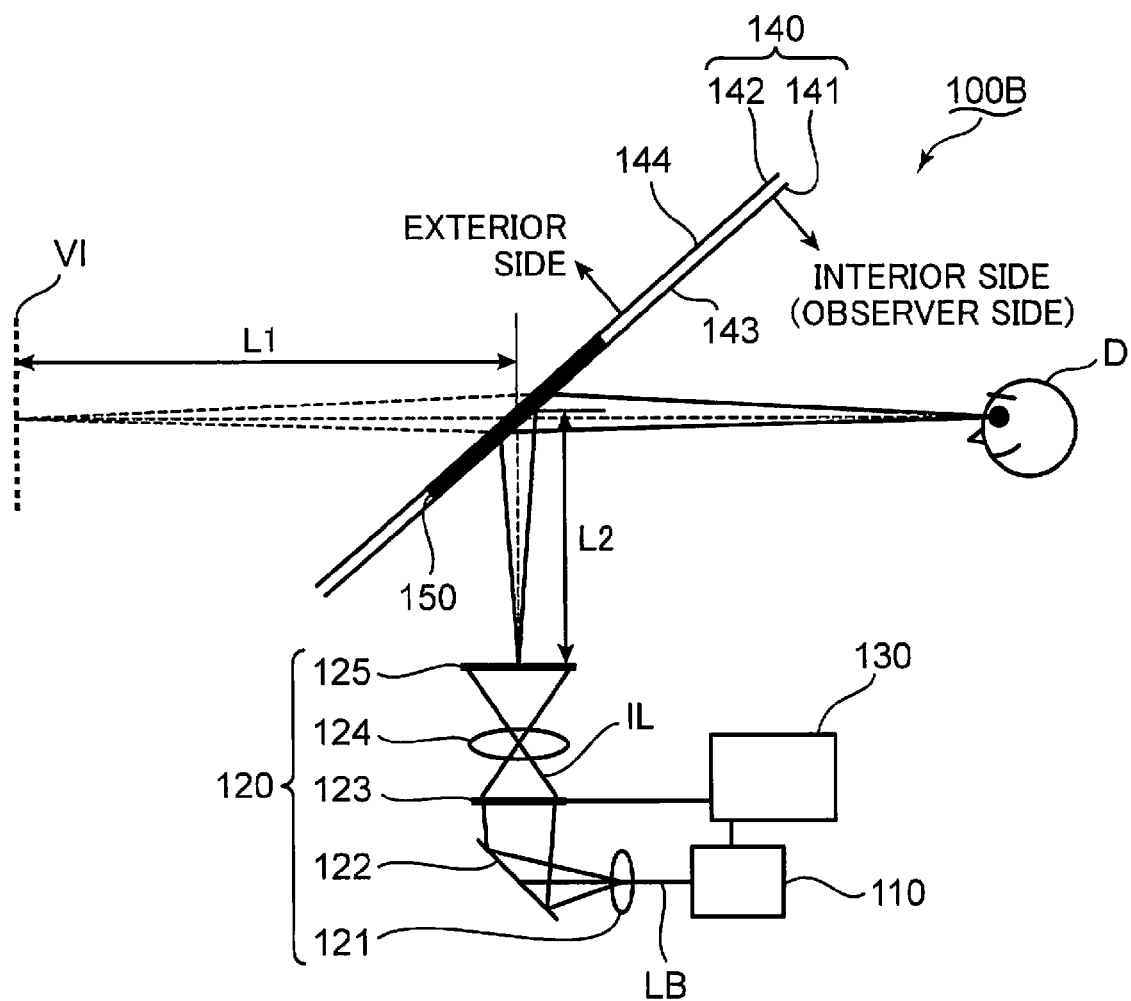
FIG. 9 is a schematic view of an HUD exemplified as the see-through display device according to the third embodiment.

FIG. 9 is a schematic view of an HUD 100B exemplified as the see-through display device according to the third embodiment. The HUD 100B is described with reference to FIG. 9. Similar components to those of the HUD 100 described in the context of the first embodiment are assigned with similar reference numerals or symbols. The descriptions in the first embodiment are applied to the same components as those of the HUD 100.

Like the HUD 100 of the first embodiment, the HUD 100B includes the laser source 110, projection optical system 120, controller 130, windshield 140 and volume hologram 150. The HUD 100B of the present embodiment further includes an antireflective coating on the inner surface 143 of the windshield 140.

Figure 10:
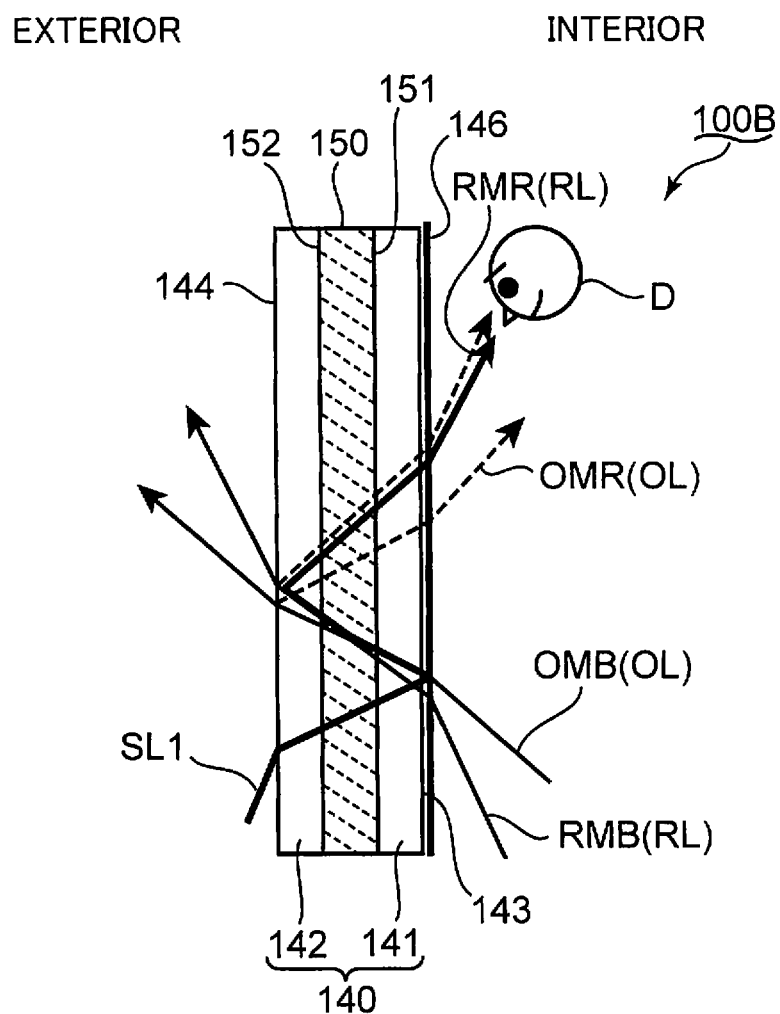
FIG. 10 is a schematic enlarged view of the HUD shown in FIG. 9 around the windshield.

FIG. 10 is a schematic enlarged view around the windshield 140 of the HUD 100B. The HUD 100B is further described with reference to FIG. 10.

The antireflective coating 146 formed on the inner surface 143 of the windshield 140 reduces brightness of the external light component SL1, which is caused by the interference fringe 1 in the volume hologram 150 and perceived as stray light. In the present embodiment, the antireflective coating 146 suppresses Fresnel reflection on the inner surface 143 of the windshield 140. Accordingly, the antireflective coating 146 reduces reflected light propagating toward the first surface 151 of the volume hologram 150. Thus, the HUD 100B may display high quality images.

The antireflective coating 146 may be formed by means of multilayer or single-layer coating of a highly refractive material such as $TiO_2$ and a low-refractive material such as $SiO_2$ by vacuum vapor deposition techniques. In the present embodiment, the antireflective coating 146 is formed on the windshield 140. Therefore, the antireflective coating 146 is formed in a large surface area. Accordingly, the antireflective coating 146 may include a resin film substrate and coating liquid, which is based on fluorine-containing monomer materials and coated on the resin film substrate. The wet-coated antireflective coating 146 may be adhered to the inner surface 143 of the windshield 140. The principle of the present embodiment is not restricted in any way by types or configurations of the antireflective coating 146. As long as the antireflective coating 146 suppresses light reflection of a predetermined wavelength, brightness of the external light component SL1 is advantageously reduced.

<Fourth Embodiment>

Figure 11:
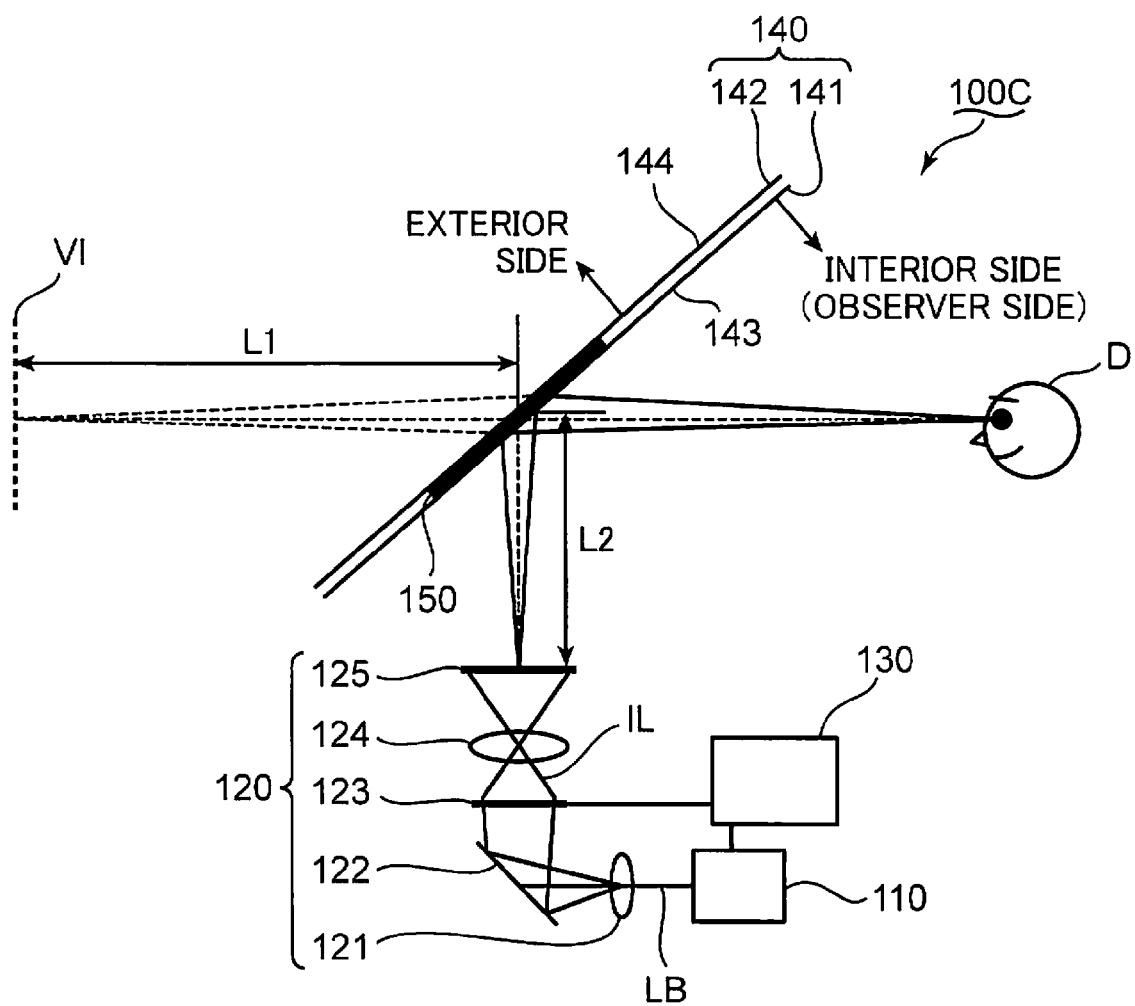
FIG. 11 is a schematic view of an HUD exemplified as the see-through display device according to the fourth embodiment.

FIG. 11 is a schematic view of an HUD 100C exemplified as the see-through display device according to the fourth embodiment. The HUD 100C is described with reference to FIG. 11. Similar components to those of the HUD 100B described in the context of the third embodiment are assigned with similar reference numerals or symbols. The descriptions in the third embodiment are applied to the same components as those of the HUD 100B.

Like the HUD 100B of the third embodiment, the HUD 100C includes the laser source 110, projection optical system 120, controller 130, windshield 140 and volume hologram 150. The HUD 100C of the present embodiment further includes an antireflective structure formed on the inner surface 143 of the windshield 140.

Figure 12:
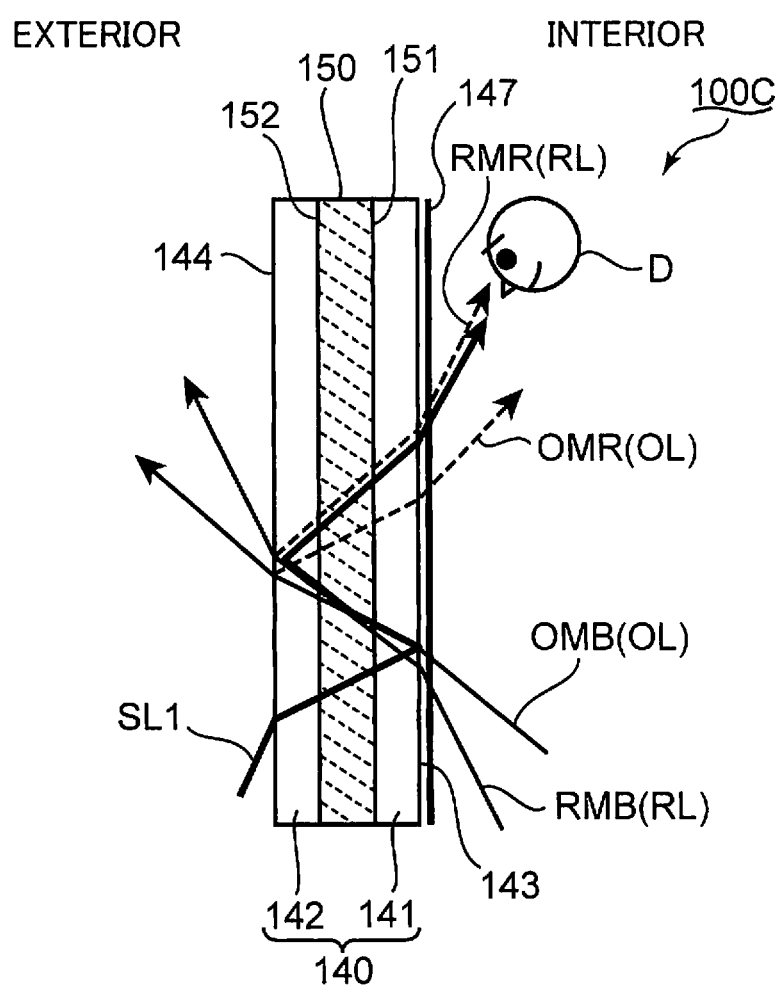
FIG. 12 is a schematic enlarged view of the HUD shown in FIG. 11 around the windshield.

FIG. 12 is a schematic enlarged view around the windshield 140 of the HUD 100C. The HUD 100C is further described with reference to FIG. 12.

An antireflective structure 147 formed on the inner surface 143 of the windshield 140 reduces brightness of the external light component SL1, which is caused by the interference fringe 1 in the volume hologram 150 and perceived as stray light. In the present embodiment, the antireflective structure 147 suppresses Fresnel reflection on the inner surface 143 of the windshield 140. Accordingly, the antireflective structure 147 reduces reflected light propagating toward the first surface 151 of the volume hologram 150. Thus, the HUD 100C may display high quality images. A moth eye structure in a size equivalent to a wavelength is exemplified as the antireflective structure 147.

<Fifth Embodiment>

Figure 13:
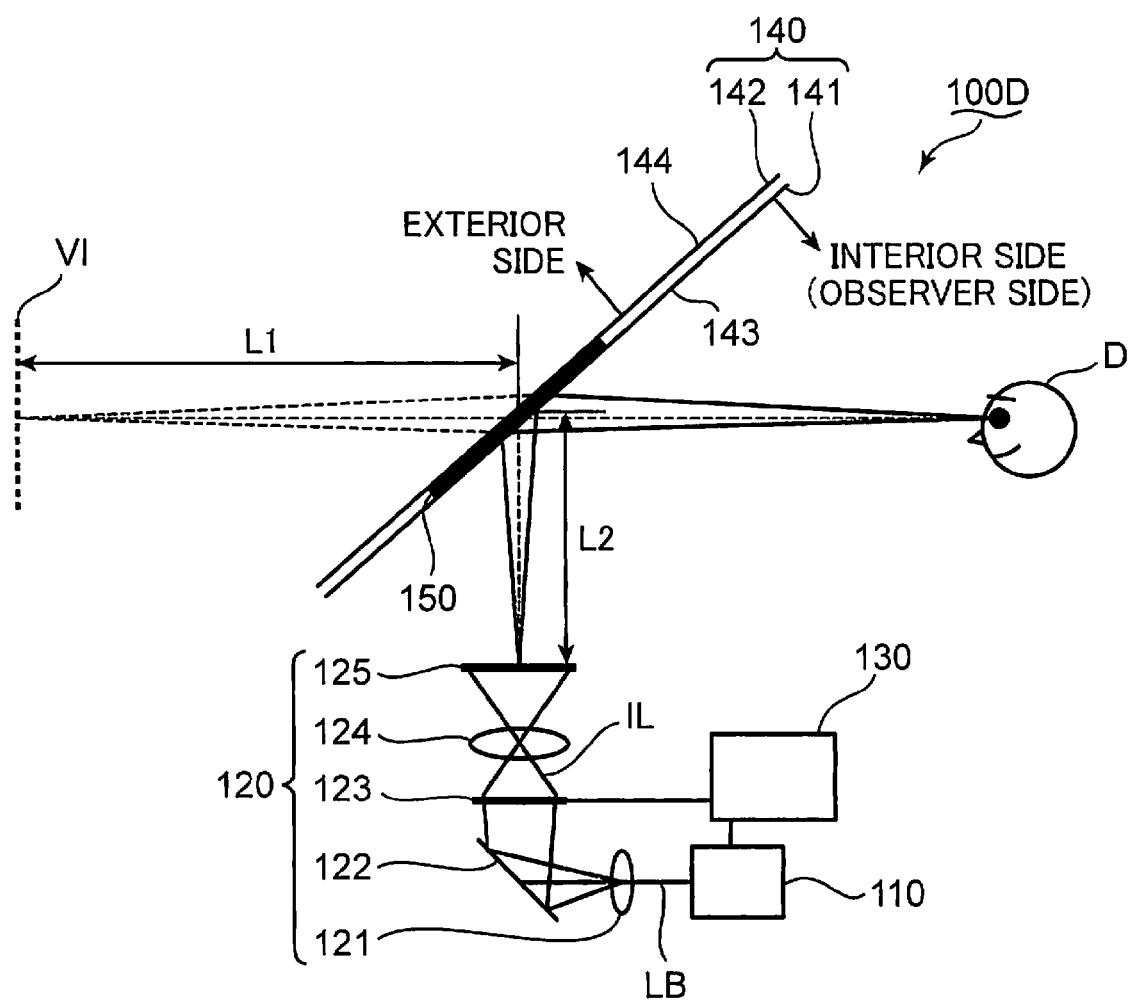
FIG. 13 is a schematic view of an HUD exemplified as the see-through display device according to the fifth embodiment.

FIG. 13 is a schematic view of an HUD 100D exemplified as the see-through display device according to the fifth embodiment. The HUD 100D is described with reference to FIG. 13. Similar components to those of the HUD 100 described in the context of the first embodiment are assigned with similar reference numerals or symbols. The descriptions in the first embodiment are applied to the same components as those of the HUD 100.

Like the HUD 100 of the first embodiment, the HUD 100D includes the laser source 110, projection optical system 120, controller 130, windshield 140 and volume hologram 150.

Figure 14:
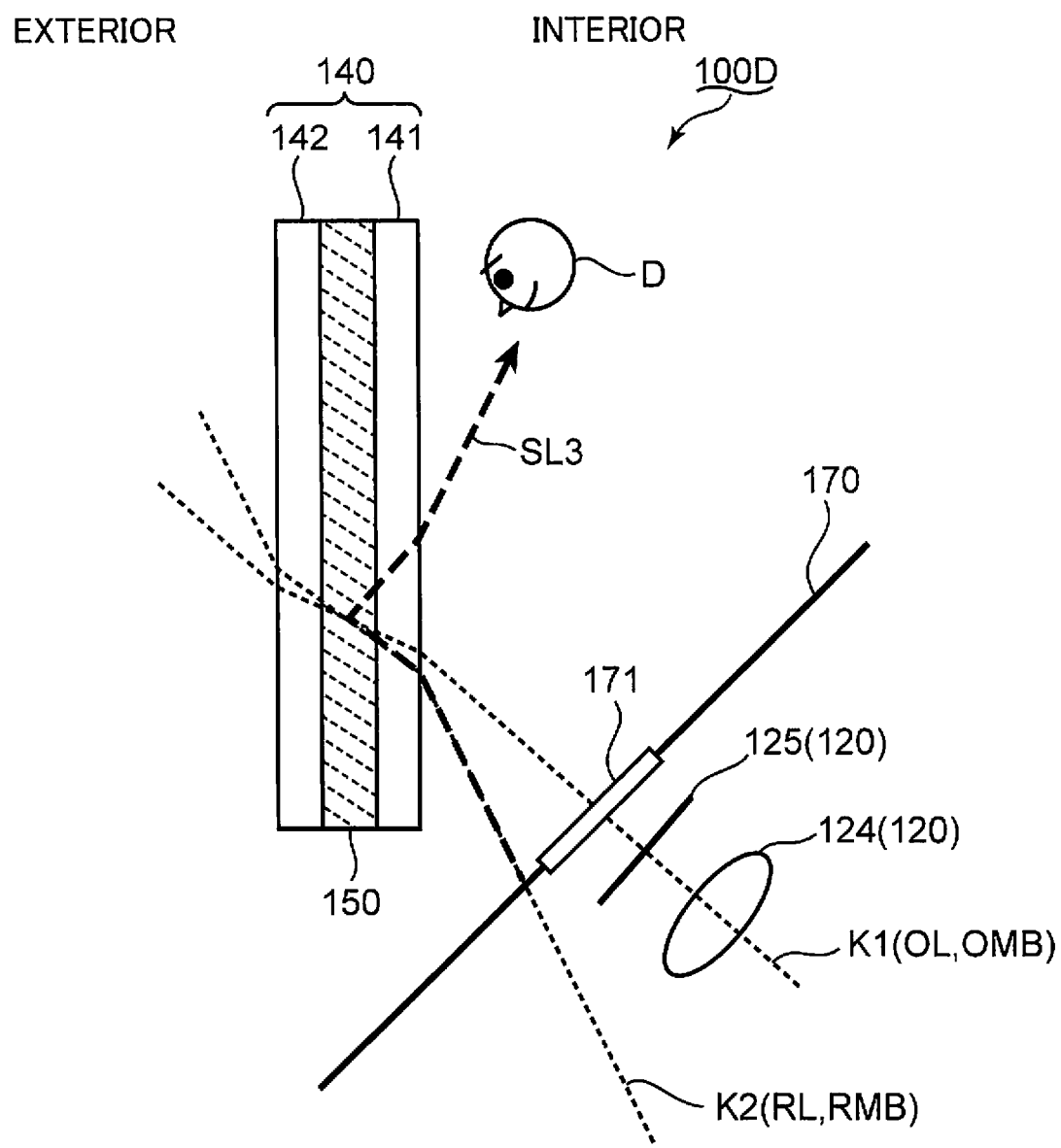
FIG. 14 is a schematic view of a windshield of the HUD shown in FIG. 13 and a projection optical system which projects image light onto the windshield.

FIG. 14 is a schematic view showing the windshield 140 and the projection optical system 120 which projects the image light IL on the windshield 140. A method for reducing brightness of the external light component SL3, which is caused by the interference fringe 3 recorded in the volume hologram 150 and perceived as stray light, is described with reference to FIGS. 8, 13 and 14.

FIG. 14 shows the projection lens 124 and the screen 125 of the projection optical system 120. The projection optical system 120, laser source 110 and controller 130 of the HUD 100D are stored in a dashboard 170 of a vehicle. Therefore, the dashboard 170 is situated between the inner glass 141 and the screen 125. In the present embodiment, the dashboard 170 is used as a part of the HUD 100D.

The HUD 100D further includes a cover glass 171 attached to the dashboard 170 situated between the inner glass 141 and the screen 125. In FIG. 14, an optical path line K1 (object light) and an optical path line K2 (reference light) obtained by extending the optical paths of the main beams OMB, RMB of the object and reference lights OL, RL, which are used for recording interference fringes in the volume hologram 150, are shown by the dot lines.

The dashboard 170 is provided with an opening through which the image light IL passes from the projection optical system 120. The cover glass 171 covering the opening of the dashboard 170 prevents dust from flowing into the dashboard 170 through the opening.

As described with reference to FIG. 4A, the interference fringes in the volume hologram 150 are formed by irradiation from below by means of two light fluxes of the reference and object lights RL, OL. In this case, stray light (external light component SL3) is generated if the reference light RL gets excessively close to the object light OL. The generation principles of the stray light caused by the external light component SL3 is described below.

For example, the external light (external light component SL3) such as solar light entering from the outside is directly reflected by a surface of the cover glass 171. If there are the cover glass 171 and the optical components used in the projection optical system 120 on the optical path line K2 of the main beam RMB of the reference light RL and if the reflection angle of the light reflected by the surface of the cover glass 171 is the same as the angle of the main beam RMB of the reference light RL, the light propagates along the optical path shown by the dot line in FIG. 14, and eventually may be viewed by the driver D.

The cover glass 171 with a finished surface over the entire area of a surface accuracy no more than the wavelength is advantageous for displaying high quality images. However, such cover glass 171 causes little optical loss (e.g. diffusion) on the surface and directly reflects the external light (external light component SL3). Accordingly, if there are the cover glass 171 and the optical components used in the projection optical system 120 on the optical path line K2 of the main beam RMB of the reference light RL, the driver D may be likely to perceive the external light component SL3 as stray light.

As shown in FIG. 14, in the present embodiment, the cover glass 171 and the optical components used in the projection optical system 120 are not situated on the optical path line K2 of the main beam RMB of the reference light RL. Therefore, the external light (external light component SL3) which has a coincident angle with the main beam RMB of the reference light RL is less likely to be generated. The driver D is thus less likely to perceive resultant stray light (external light component SL3) from the interference fringe 3 of the volume hologram 150.

The dashboard 170 is typically formed from a dark material. In addition, a surface of the dashboard 170 is subjected to matting. The surface of the dashboard 170 also has coarse surface roughness. In the optical design of the present embodiment, as shown in FIG. 14, the optical path line K2 of the main beam RMB of the reference light RL intersects with the dashboard 170. Since the aforementioned characteristics (optical diffusion function) of the dashboard 170 contribute to a significant reduction in a light amount reflected in the optical axis direction of the main beam RMB of the reference light RL, the driver D is less likely to perceive resultant stray light (external light component SL3) from the interference fringe 3 of the volume hologram 150. In the present embodiment, the dashboard 170 is exemplified as the light diffuser.

Instead of the dashboard 170, the HUD 100D may include another light diffuser situated on the optical path line K2 of the main beam RMB of the reference light RL. If light is diffused on the optical path line K2 of the main beam RMB of the reference light RL, stray light (external light component SL3) caused by the interference fringe 3 of the volume hologram 150 is less likely to be perceived.

<Sixth Embodiment>

Figure 15:
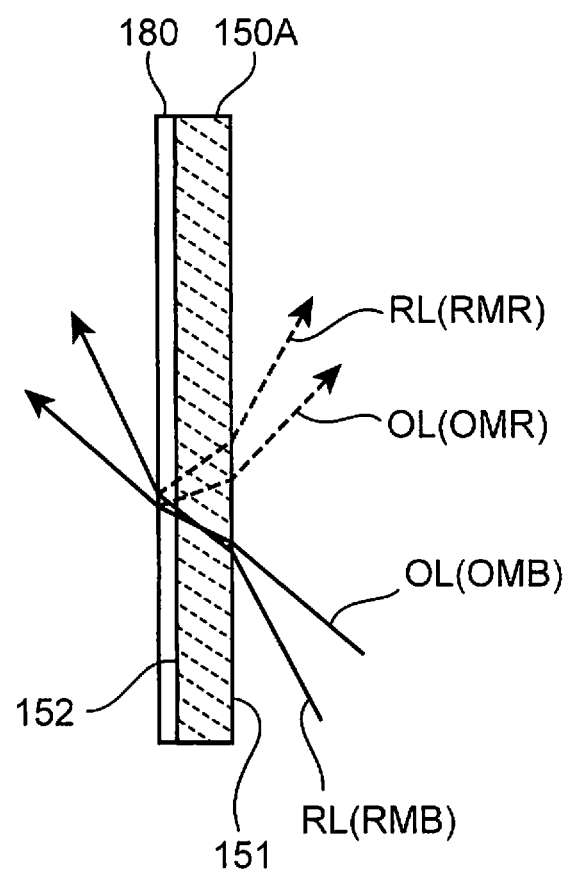
FIG. 15 schematically shows another method for forming interference fringes in a volume hologram used for the see-through display (the sixth embodiment).

FIG. 15 schematically shows another method for forming interference fringes in a volume hologram. The method for forming interference fringes in a volume hologram is described with reference to FIG. 15. The volume hologram described in the sixth embodiment may be advantageously used instead of the volume hologram 150 of the HUDs 100 to 100D of the first to fifth embodiments.

FIG. 15 shows a volume hologram 150A. When the volume hologram 150A is exposed by the reference and object lights RL, OL, a quarter-wavelength plate 180 is mounted on the second surface 152 of the volume hologram 150A.

The reference and object lights RL, OL incident on the first surface 151 of the volume hologram 150A are polarized in the perpendicular direction to a paper plane of FIG. 15. Thus, both of the reference and object lights RL, OL are incident as S-polarized light on the first surface 151. The resultant volume hologram 150A may reduce stray light (external light component SL3) caused by the aforementioned interference fringe 3.

In order to make the generation principle of the stray light easily understood, only the main beams OMB, RMB of the object and reference lights OL, RL are shown in FIG. 15.

The generation principle of the stray light is described by using the main beams OMB, RMB. The main beams OMB, RMB pass through the pinhole plates, and then enter the volume hologram 150A with diffusing, like the first embodiment (c.f. FIG. 1B). However, the same generation principle of stray light is applicable not only to the interference between the main beams OMB, RMB, but also to interference generated by two light fluxes (e.g. when the angles are ranged within a tolerant angle in which interference occurs or when the wavelengths are different).

The main beam OMB of the object light OL incident as S-polarized light on an incidence surface of the volume hologram 150A is incident on the first surface 151 of the volume hologram 150A. Then, the main beam OMB of the object light OL passes through the volume hologram 150A and enters the quarter-wavelength plate 180.

The main beam OMB of the object light OL is transmitted through the quarter-wavelength plate 180 and reaches the interface between the quarter-wavelength plate 180 and the air. At the interface between the quarter-wavelength plate 180 and the air, a part of the main beam OMB of the object light OL is subjected to Fresnel reflection and becomes the reflected light OMR of the main beam OMB of the object light OL. The reflected light OMR propagates toward the first surface 151 against the direction of the main beam OMB. At the interface between the quarter-wavelength plate 180 and the air, the remaining main beam OMB of the object light OL is transmitted through the quarter-wavelength plate 180 into the air.

Since the main beam OMB of the object light OL passes back and forth in the quarter-wavelength plate 180, the reflected light OMR of the main beam OMB of the object light OL becomes the P-polarized light. Therefore, the reflected light OMR of the main beam OMB of the object light OL is emitted as the P-polarized light from the volume hologram 150A into the air.

The main beam RMB of the reference light RL is also the S-polarized light, as described above, and enters the volume hologram 150A. The main beam RMB of the reference light RL then passes through the volume hologram 150A and enters the quarter-wavelength plate 180. The main beam RMB of the reference light RL is transmitted through the quarter-wavelength plate 180 and reaches the interface between the quarter-wavelength plate 180 and the air. At the interface between the quarter-wavelength plate 180 and the air, a part of the main beam RMB of the reference light RL is subjected to Fresnel reflection and becomes the reflected light RMR of the main beam RMB of the reference light RL. The reflected light RMR propagates toward the first surface 151 against the direction of the main beam RMB. At the interface between the quarter-wavelength plate 180 and the air, the remaining main beam RMB of the reference light RL is transmitted through the quarter-wavelength plate 180 into the air.

Since the main beam RMB of the reference light RL passes back and forth in the quarter-wavelength plate 180, the reflected light RMR of the main beam RMB of the reference light RL becomes the P-polarized light. Therefore, the reflected light RMR of the main beam RMB of the reference light RL is emitted as the P-polarized light from the volume hologram 150A into the air.

The P-polarized and S-polarized lights generally do not interfere. Therefore, the aforementioned interference fringes 2, 3, 5 and 6 do not appear in the volume hologram 150A. Accordingly, the stray light (external light component SL3) caused by the interference fringe 3 is less likely to occur.

An antireflective coating may be arranged instead of the quarter-wavelength plate 180 on the second surface 152 of the volume hologram 150A. Accordingly, the interference is less likely to occur between the reflected lights OMR, RMR of the main beam OMB, RMB of the object and reference lights OL, RL. Therefore, the stray light (external light component SL4) (c.f. FIG. 5B) caused by the interference fringe 4 is less likely to occur.

In the present embodiment, each of the main beams RMB, OMB of the reference and object lights RL, OL for recording interference fringes in the volume hologram 150A is the S-polarized light with respect to the incidence plane. Alternatively, each of the main beams RMB, OMB of the reference and object lights RL, OL may be the P-polarized light with respect to the incidence plane. In this case, each of the reflected light OMR of the main beam OMB of the object light OL and the reflected light RMR of the main beam RMB of the reference light RL is the S-polarized light.

<Seventh Embodiment>

Figure 16A:
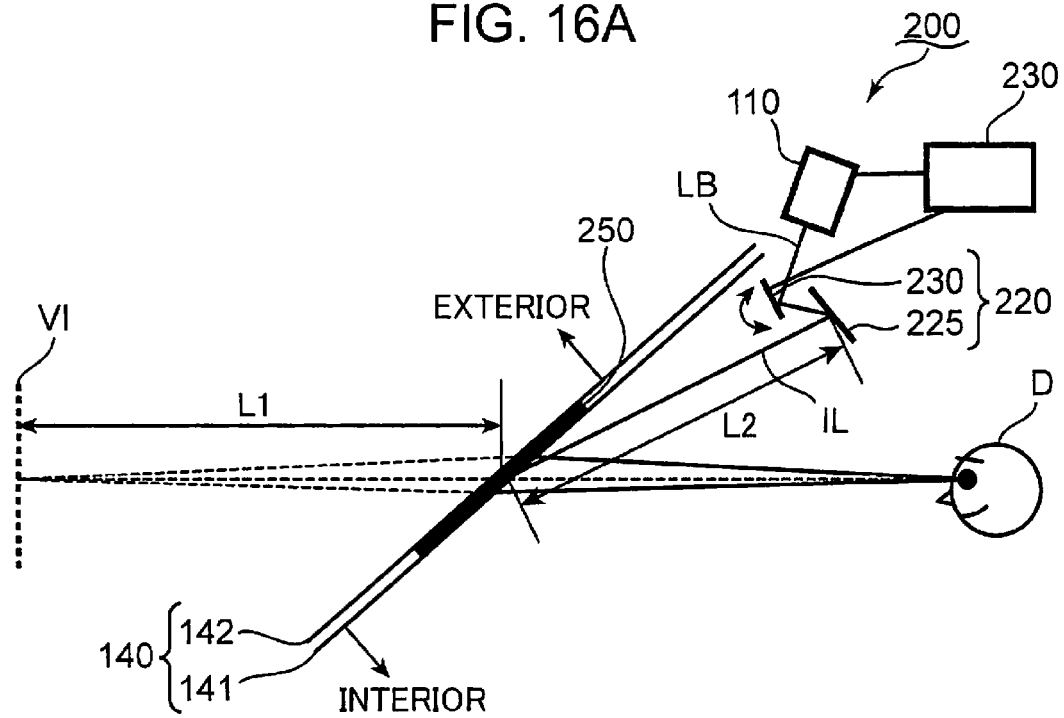
FIG. 16A is a schematic view of an HUD exemplified as the see-through display device according to the seventh embodiment.

FIG. 16A is a schematic view of an HUD 200 exemplified as the see-through display device according to the seventh embodiment. The HUD 200 is described with reference to FIG. 16A. Similar components to those of the HUD 100 described in the context of the first embodiment are assigned with similar reference numerals or symbols. The descriptions in the first embodiment are applied to the same components as those of the HUD 100.

Like the HUD 100 of the first embodiment, the HUD 200 includes the laser source 110 configured to emit the laser beam LB. The HUD 200 further includes a projection optical system 220 configured to generate the image light IL from the laser beam LB.

The projection optical system 220 includes a MEMS mirror 223, which receives the laser beam LB from the laser source 110, and a screen 225, which receives the laser beam LB from the MEMS mirror 223. The MEMS mirror 223 scans the screen 225 by means of the laser beam LB to form an image. Accordingly, the image light IL is emitted from the screen 225.

The HUD 200 further includes a controller 230. The controller 230 controls the laser source 110 and the MEMS mirror 223. Accordingly, the image light IL is generated to display desired images.

Like the HUD 100 of the first embodiment, the HUD 200 is mounted on a vehicle. The driver D in the vehicle observes an image from the HUD 200. However, unlike the HUD 100 of the first embodiment, the HUD 200 of the present embodiment projects the image light IL from above the driver D.

As described above, the laser beam LB emitted from the laser source 110 is used by the MEMS mirror 223 to scan and irradiate the screen 225. The MEMS mirror 223 and the laser source 110 are electrically connected to the controller 230. The controller 230 controls scanning timings of the MEMS mirror 223 and intensity of the laser beam LB in response to image information corresponding to an image to be displayed. As a result of modulating intensity of the laser beam LB in response to scanning timings of the MEMS mirror 223 under the control by the controller 230, an image is projected and formed on the screen 225.

Like the HUD 100 of the first embodiment, the windshield 140 of the vehicle is used as a part of the HUD 200. The HUD 200 further includes a volume hologram 250 situated between the inner and outer glasses 141, 142 of the windshield 140. Like the volume hologram 150 described in the context of the first embodiment, the volume hologram 250 functions as a transmissive hologram. A diffraction angle of the volume hologram 250 is different from the diffraction angle of the volume hologram 150 described in the context of the first embodiment. Therefore, the exposure optical system has a different arrangement to record interference fringes in the volume hologram 250 from the exposure optical system applied to the volume hologram 150 described in the context of the first embodiment.

Figure 16B:
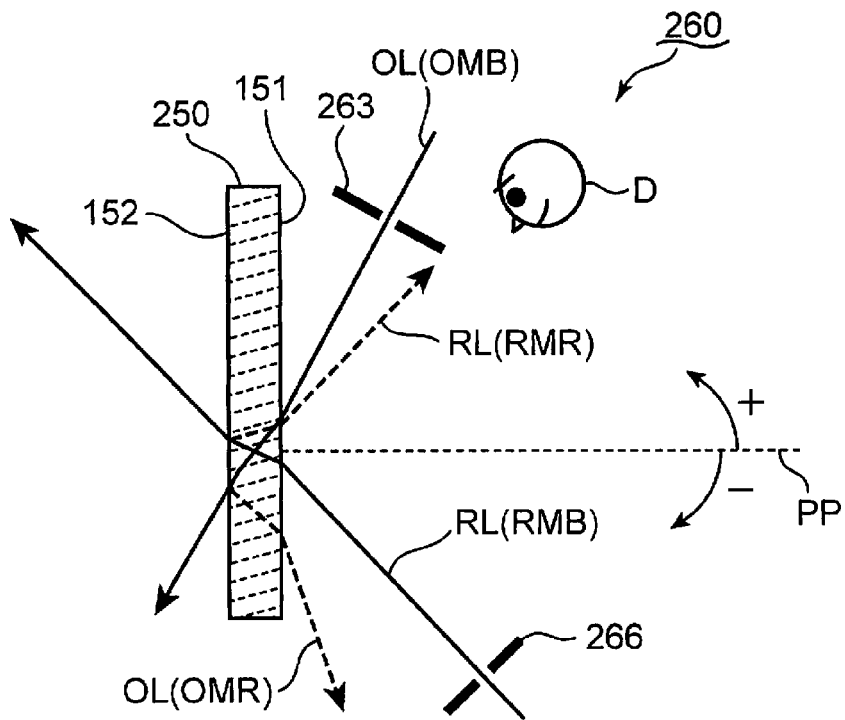
FIG. 16B is a schematic view of an exposure optical system which is applicable to a volume hologram of the HUD shown in FIG. 16A.

FIG. 16B is a schematic view of an exposure optical system 260 applied to the volume hologram 250. The exposure optical system 260 applied to the volume hologram 250 is described with reference to FIGS. 16A and 16B.

The exposure optical system 260 includes a pinhole plate 263 configured to shape the object light OL into spherical waves. A small hole is formed in the pinhole plate 263. The object light OL passes through the small hole in the pinhole plate 263 to irradiate the first surface 151 of the volume hologram 250. FIG. 16B shows the main beam OMB of the object light OL to irradiate the volume hologram 250.

The central region of the screen 225 is apart from the volume hologram 250 by "distance L2". The pinhole plate 263 is situated so that the small hole of the pinhole plate 263 is apart from the volume hologram 250 by "distance L2" as well. The pinhole plate 263 is also situated so that the object light OL on the volume hologram 250 has the same incidence angle as the image light IL of the HUD 200 does.

The exposure optical 260 includes a pinhole plate 266 configured to shape the reference light RL into spherical waves. A small hole is formed in the pinhole plate 266. The reference light RL passes through the small hole of the pinhole plate 266 to irradiate the first surface 151 of the volume hologram 250. FIG. 16B shows the main beam RMB of the reference light RL to irradiate the volume hologram 250.

As shown in FIG. 16A, the central region of the virtual image VI observed by the driver D is distant from the volume hologram 250 by "distance L1". The pinhole plate 266 is situated so that the small hole of the pinhole plate 266 is apart from the volume hologram 250 by "distance L1" as well.

FIG. 16B shows a perpendicular plane PP (the perpendicular plane PP at the intersection between the main beams OMB, RMB), which is perpendicular to the first surface 151 of the volume hologram 250. In the following description, an upward inclination angle from the perpendicular plane PP (driver D) is referred to as a plus (+) side (positive angle). A downward inclination angle from the perpendicular plane PP is referred to as a minus (−) side (negative angle).

In the exposure optical system 160 (c.f. FIG. 2) applied to the volume hologram 150 described in the context of the first embodiment, each of the main beams OMB, RMB of the object and reference lights OL, RL is incident at a minus angle. Each of the reflected lights OMR, RMR of the main beams OMB, RMB of the object and reference lights OL, RL is emitted at a plus angle.

Unlike the first embodiment, in the exposure optical system 260 applied to the volume hologram 250, the main beam OMB of the object light OL is incident on the volume hologram 250 at a plus angle whereas the main beam RMB of the reference light RL is incident on the volume hologram 250 at a minus angle. The reflected light OMR of the main beam OMB of the object light OL is emitted from the volume hologram 250 at a minus angle whereas the reflected light RMR of the main beam RMB of the reference light RL is emitted from the volume hologram 250 at a plus angle.

Figure 17:
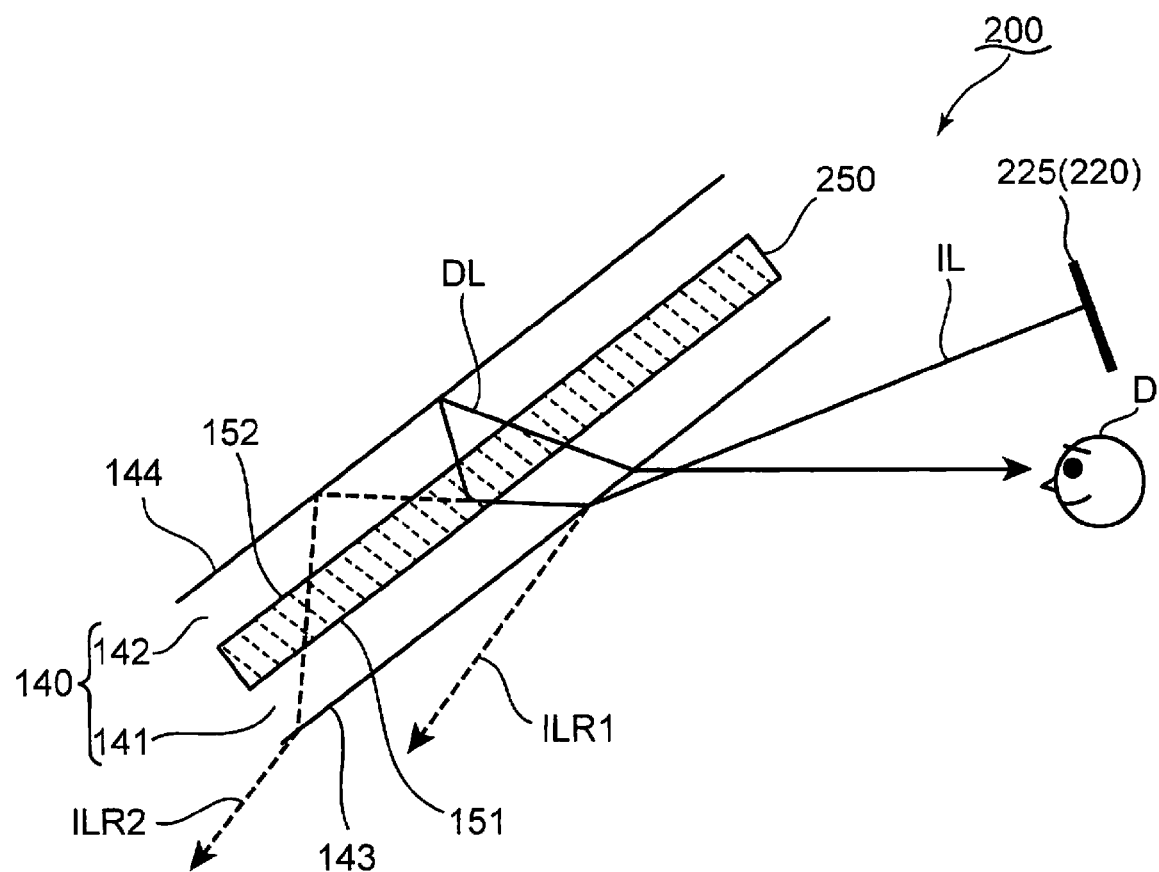
FIG. 17 is a schematic view of an optical path around a windshield of the HUD shown in FIG. 16B.

FIG. 17 is a schematic view of the optical path around the windshield 140. The optical design described with reference to FIGS. 16A and 16B contributes to reducing ghost images. The reduction effect on ghost images is described with reference to FIG. 17.

The image light IL is emitted from the screen 225 and enters the inner glass 141 of the windshield 140. A part of the image light IL is subjected to Fresnel reflection at the inner surface 143 of the windshield 140. FIG. 17 shows the Fresnel reflected light (front reflection light ILR1) of the image light IL at the inner surface 143 of the windshield 140. The front reflection light ILR1 propagates in the minus direction as defined by FIG. 16B. Therefore, the driver D is less likely to perceive the front reflection light ILR1.

The image light IL propagates in the inner glass 141 and enters the volume hologram 250. A part of the image light IL is diffracted by the interference fringes formed in the volume hologram 250 and becomes diffracted light DL. The remaining image light IL propagates linearly without diffraction. Accordingly, the remaining image light IL reaches the outer surface 144 of the windshield 140.

The outer surface 144 of the windshield 140 reflects a part of the image light IL as Fresnel reflection. FIG. 17 shows back reflected light ILR2, which is reflected by the outer surface 144 of the windshield 140. The back reflected light ILR2 is eventually transmitted through the inner glass 141, and then emitted from the inner surface 143 of the windshield 140. The back reflected light ILR2 propagates in the minus direction, like the front reflection light ILR1. The driver D is less likely to perceive the back reflected light ILR2. Therefore, the HUD 200 may display high quality images without few ghost images.

As described with reference to FIG. 16B, the interference fringes of the volume hologram 250 are recorded by the reference light RL incident at a minus angle and the object light OL incident at a plus angle. Therefore, as shown in FIG. 17, the interference fringes in the volume hologram 250 are substantially perpendicular to the first and/or second surfaces 151, 152.

The volume hologram 250 easily spreads or contracts in the thickness direction in response to a change in a temperature of the volume hologram 250, but the volume hologram 250 is less likely to show dimensional changes in other directions. Since the interference fringes in the volume hologram 250 are substantially perpendicular to the first and/or second surfaces 151, 152, as described above, the thermal variation of the volume hologram 250 become less influential to intervals between the interference fringes. Therefore, diffraction characteristics of the volume hologram 250 are less likely to be susceptible to a variation in an ambient temperature. Accordingly, a thermal change is less likely to result in a change in brightness or a positional change of images in the HUD 200. Therefore, the HUD 200 becomes very reliable.

Like the HUD 100D described in the context of the fifth embodiment, the projection optical system 220 configured to project the image light IL is absent from the optical path of the main beam RMB of the reference light RL as clearly shown in FIG. 16B. Therefore, stray light (external light component SL3: c.f. FIG. 14) is advantageously suppressed on the basis of the principles described in the context of the fifth embodiment. If a light diffuser such as a dashboard is situated on the optical path of the main beam RMB of the reference light RL, stray light may be further reduced. Therefore, the HUD 200 may display high quality images.

In the present embodiment, the main beam OMB of the object light OL and the main beam RMB of the reference light RL are incident on the first surface 151 of the volume hologram 250, like the first embodiment. Therefore, like the first embodiment, the stray light caused by the interference fringe 4 recorded by the reflected light OMR of the main beam OMB of the object light OL and the reflected light RMR of the main beam RMB of the reference light RL is reduced.

The principle described in the context of the second embodiment may be applied to the HUD 200 of the present embodiment. If a half-wavelength plate is situated at the inner surface 143 of the windshield 140, the boundary between the inner glass 141 and the first surface 151 of the volume hologram 250, the boundary between the second surface 152 of the volume hologram 250 and the outer glass 142, or the outer surface 144 of the windshield 140, the stray light (external light component SL1) may be advantageously reduced on the basis of the principle described in the context of the second embodiment.

The principle described in the context of the third embodiment may be applied to the HUD 200 of the present embodiment. If an antireflective coating is provided, instead of the half-wavelength plate, on the inner surface 143 of the windshield 140, stray light (external light component SL1) may be advantageously reduced on the basis of the principle described in the context of the third embodiment.

The principle described in the context of the sixth embodiment may be applied to the HUD 200 of the present embodiment. A quarter-wavelength plate (not shown in the figure) may be attached to the second surface 152 of the volume hologram 250 in the course of the exposure process of the volume hologram 250 described with reference to FIG. 16B.

If each of the reference and object lights RL, OL incident on the volume hologram 250 is polarized into S-polarized or P-polarized light, stray light (external light component SL4) caused by the interference fringe 4 (c.f. FIG. 5B) is less likely to occur according to the principle described in the context of the sixth embodiment.

<Eighth Embodiment>

Figure 18A:
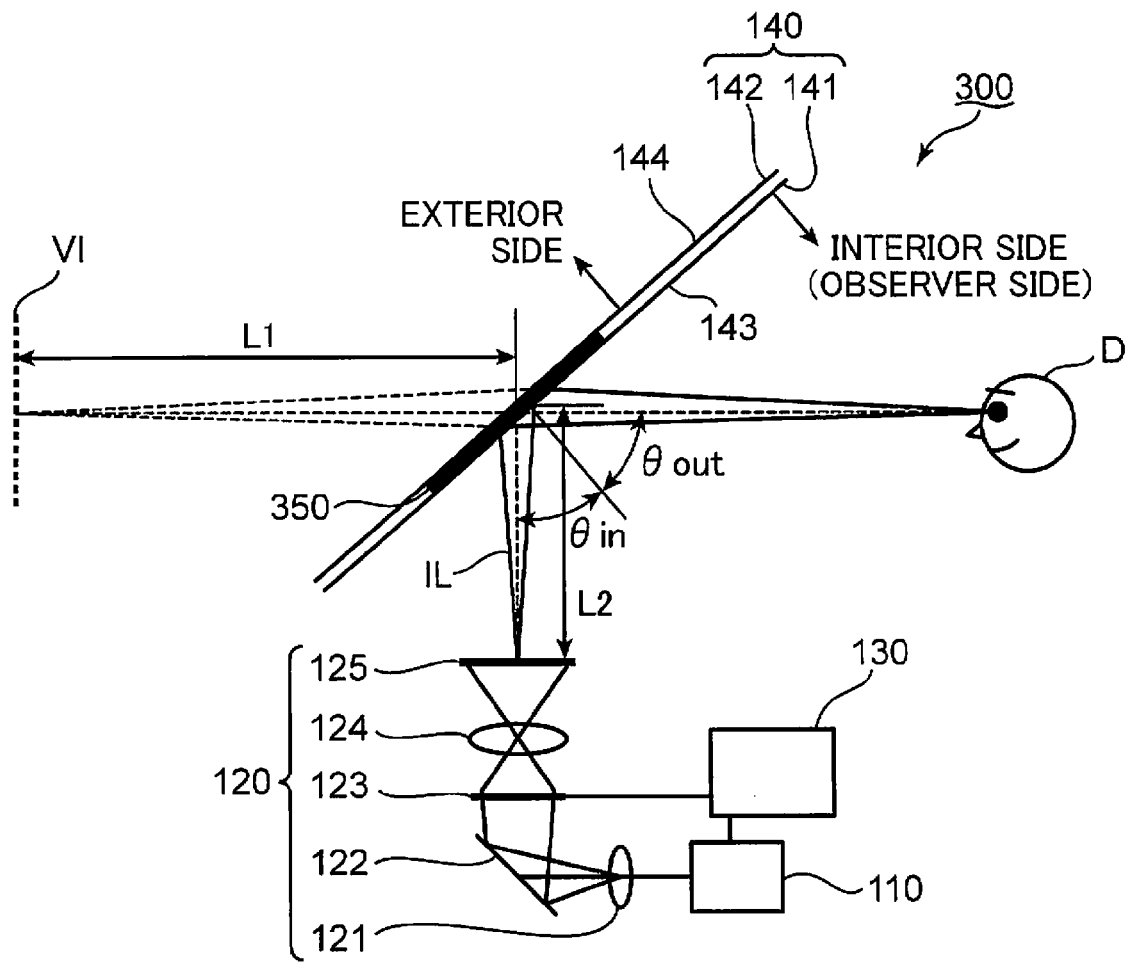
FIG. 18A is a schematic view of an HUD exemplified as the see-through display device according to the eighth embodiment.

FIG. 18A is a schematic view of an HUD 300 exemplified as the see-through display device according to the eighth embodiment. The HUD 300 is described with reference to FIG. 18A. Similar components to those of the HUD 100 described in the context of the first embodiment are assigned with similar reference numerals or symbols. The descriptions in the first embodiment are applied to the same components as those of the HUD 100.

Like the HUD 100 of the first embodiment, the HUD 300 includes the laser source 110, projection optical system 120, controller 130 and windshield 140. The HUD 300 further includes a volume hologram 350 situated between the inner and outer glasses 141, 142 of the windshield 140. The volume hologram 350 makes an emission angle $\theta_{out}$ of the image light IL emitted from the windshield 140 toward the interior space larger than an incidence angle $\theta_{in}$ of the image light IL incident on the windshield 140.

Figure 18B:
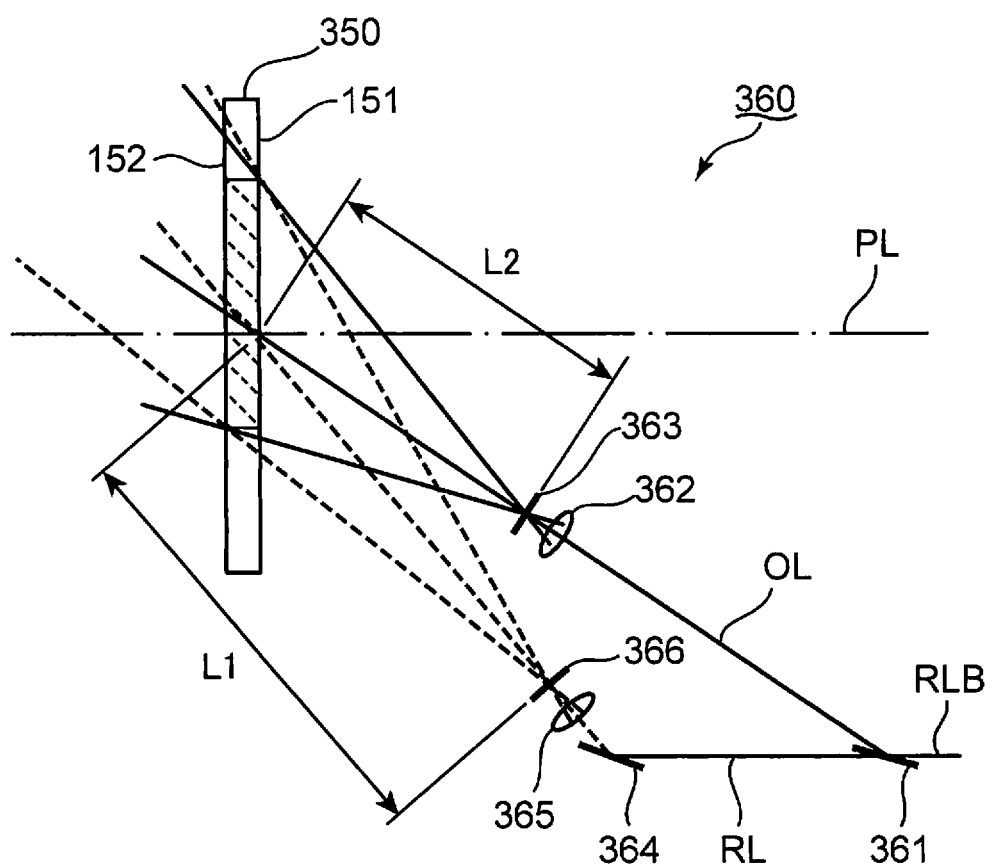
FIG. 18B is a schematic view of an exposure optical system for exposing a volume hologram of the HUD shown in FIG. 18A.

FIG. 18B is a schematic view showing an exposure optical system 360 of the volume hologram 350 functioning as a transmissive hologram. The optical system for recording interference fringes in the volume hologram 350 is described with reference to FIGS. 18A and 18B.

The exposure optical system 360 includes a half mirror 361 configured to receive a laser beam RLB having the same wavelength as the laser beam LB emitted from the laser source 110. The half mirror 361 divides the laser beam RLB into the object and reference lights OL, RL.

The exposure optical system 360 further includes a lens 362, which receives the object light OL, and a pinhole plate 363 situated between the lens 362 and the volume hologram 350. A small hole is formed in the pinhole 363.

The object light OL is directed from the half mirror 361 toward the lens 362. The lens 362 concentrates the light on the small hole of the pinhole plate 363. Accordingly, the object light OL passing through the pinhole plate 363 becomes spherical waves. Then, the object light OL enters the first surface 151 of the volume hologram 350.

The exposure optical system 360 further includes a return mirror 364, which deflects the reference light RL toward the volume hologram 350, a lens 365, which receives the reference light RL from the return mirror 364, and a pinhole plate 366 situated between the lens 365 and the volume hologram 350. A small hole is formed in the pinhole plate 366, like the pinhole plate 363 for the object light OL.

The reference light RL propagates from the half mirror 361 toward the return mirror 364. The return mirror 364 deflects the reference light RL toward the lens 365. The lens 365 concentrates the light on the small hole of the pinhole plate 366. Accordingly, the reference light RL passing through the pinhole plate 366 becomes spherical waves.

The pinhole plate 363 is positioned and angularly set with respect to the volume hologram 350 so that the position of the small hole of the pinhole plate 363, through which the object light OL passes, corresponds to the central region of the screen 125 of the HUD 300. In FIG. 18A, the distance from the volume hologram 350 to the central region of the screen 125 is shown by the reference symbol "L2". Likewise, as shown in FIG. 18B, the distance from the small hole of the pinhole plate 363 to the volume hologram 350 is "L2".

The pinhole plate 366 is positioned and angularly set with respect to the volume hologram 350 so that the position of the small hole of the pinhole plate 366, through which the reference light RL passes, corresponds to the central region of the virtual image VI created by the HUD 300 described with reference to FIG. 18A. In FIG. 18A, the distance from the volume hologram 350 to the central region of the virtual image VI is shown by the reference symbol "L1". Likewise, as shown in FIG. 18B, the distance from the small hole of the pinhole plate 366 to the volume hologram 350 is "L1".

The settings of the aforementioned exposure optical system 360 are the same as those of the exposure optical system 160 described with reference to FIG. 1B. However, the incidence angle of the reference light RL on the volume hologram 350 is set larger than the incidence angle of the object light OL on the volume hologram 350 in the exposure process of the volume hologram 350, so that the emission angle $\theta_{out}$ of the image light IL is made larger than the incidence angle $\theta_{in}$ of the image light IL. The incidence angle on the volume hologram 350 means the inclination angle against the perpendicular line PL to the first or second surface 151, 152 of the volume hologram 350.

Figure 19:
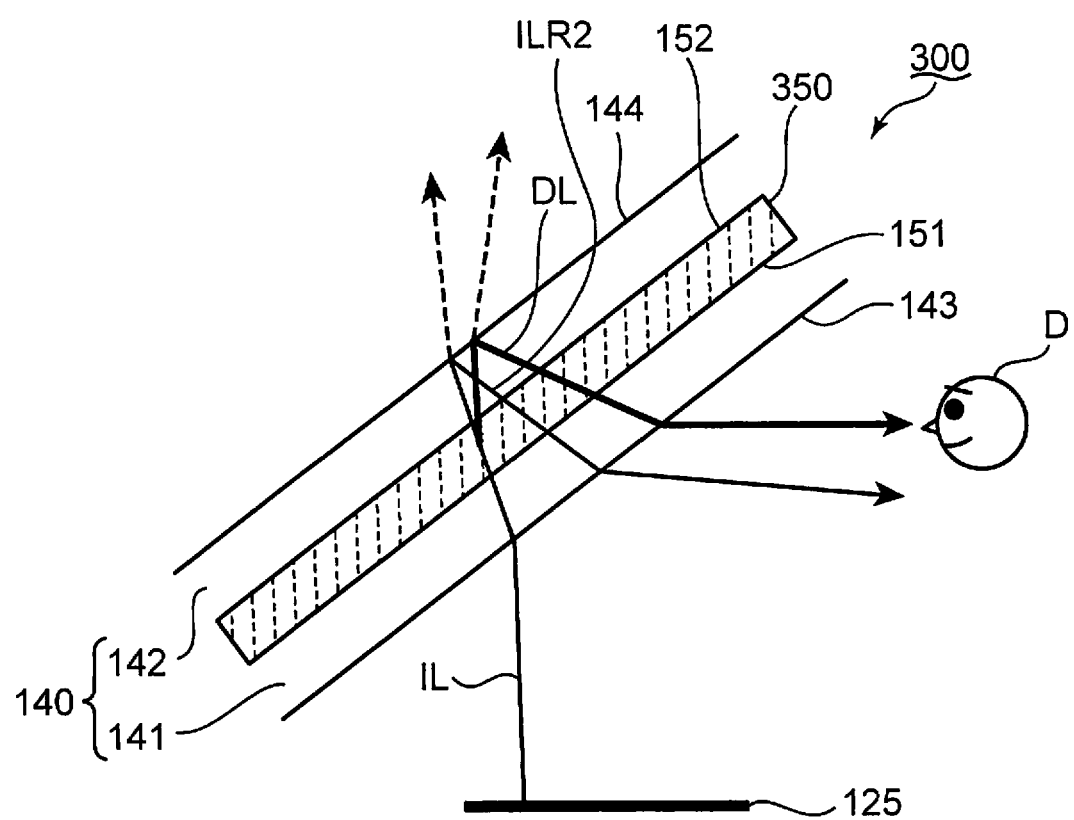
FIG. 19 is a schematic view of an optical path of image light around a windshield of the HUD shown in FIG. 18A.

FIG. 19 schematically shows an optical path of the image light IL around the windshield 140. The optical path of the image light IL around the windshield 140 is described with reference to FIGS. 18A and 19.

FIG. 19 shows the screen 125 of the HUD 300 and the image light IL emitted from the screen 125. The image light IL is incident on the inner glass 141 of the windshield 140. The image light IL is then transmitted through the inner glass 141 and enters the first surface 151 of the volume hologram 350.

The interference fringe formed by the volume hologram 350 diffracts the image light IL at a predetermined diffraction angle and allows the light to be transmitted from the first surface 151 to the second surface 152. Therefore, the image light IL incident on the volume hologram 350 propagates toward the outer glass 142 rather than directly toward the driver D. FIG. 19 shows the resultant diffracted light DL from the diffraction in the volume hologram 350. Like the diffracted light DL shown in FIG. 2, the diffracted light DL shown in FIG. 19 is reflected as Fresnel reflection by the outer surface 144 of the windshield 140, and propagates toward the driver D. Accordingly, the driver D may observe the virtual image VI corresponding to an image formed on the screen 125 by the diffracted light DL. In the present embodiment, the outer surface 144 of the windshield 140 is exemplified as the interface.

The image light IL passing through the volume hologram 350 and the outer glass 142 without diffraction by the volume hologram 350 reaches the outer surface 144 of the windshield 140, as shown in FIG. 19. A part of the image light IL which reaches the outer surface 144 of the windshield 140 is subjected to Fresnel reflection and becomes the back reflected light ILR2. In the present embodiment, the light IL which reaches the outer surface 144 of the windshield 140 is S-polarized light with respect to the outer surface 144 (i.e., single polarization in the perpendicular direction to the paper plane of FIG. 19). In this case, reflectance of the diffracted light DL at the outer surface 144 of the windshield 140 is larger than that of the back reflected light ILR2.

Figure 20:
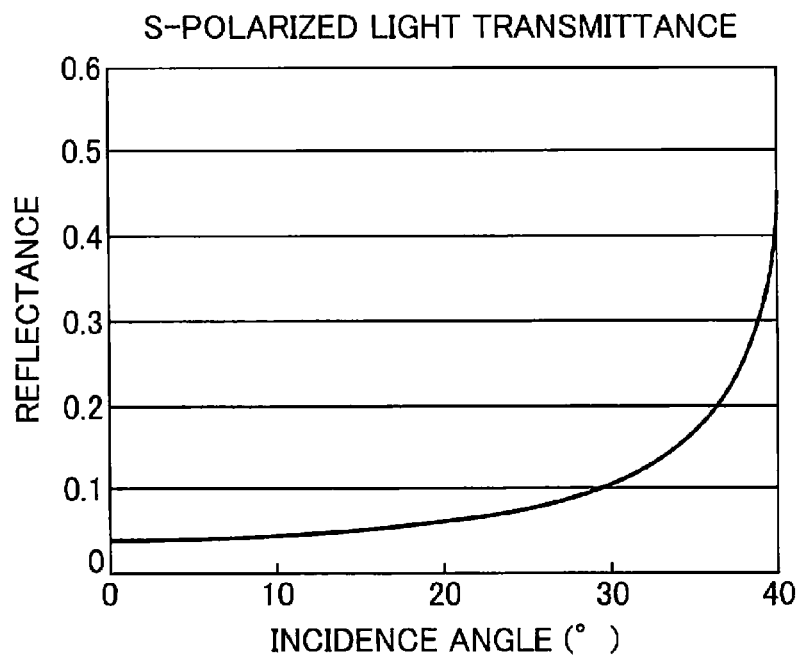
FIG. 20 is a graph schematically showing angular dependence of S-polarized light reflectance.

FIG. 20 is a graph schematically showing angular dependency about reflectance of the S-polarized light. Characteristics of the image light IL around the windshield 140 are described with reference to FIGS. 19 and 20.

As shown in FIG. 20, reflectance of the S-polarized light increases as the incidence angle increases. Therefore, as described above, the reflectance of the diffracted light DL at the outer surface 144 of the windshield 140 become larger than that of the back reflected light ILR2.

FIG. 20 shows reflectance of light emitted from a transparent substance with a refractive index of 1.5 into vacuum with a refractive index of 1. An incidence angle is plotted against the abscissa of the graph shown in FIG. 20. The perpendicular line to the interface between the transparent substance and vacuum represents an incidence angle of "0°". For example, reflectance of "about 5.9%" is obtained at an incidence angle of "20°". Reflectance of "about 10.6%" is obtained at an incidence angle of "30°". Total reflection (reflectance 100%) is obtained at an incidence angle no less than "about 41°".

With regard to the HUD 300 provided with the volume hologram 350 functioning as a transmissive hologram, if the S-polarized image light IL is incident on the windshield 140 and if the emission angle $\theta_{out}$ of the image light IL from the inner surface 143 of the windshield 140 is set larger than the incidence angle $\theta_{in}$ of the image light IL on the outer surface 144 of the windshield 140, Fresnel reflectance of the diffracted light DL becomes larger than reflectance of the back reflected light ILR2. Accordingly, an amount of the diffracted light DL to be observed by the driver D also becomes larger than that of the back reflected light ILR2. Thus, the HUD 300 may display high quality images with few ghost images.

In the present embodiment, the polarization direction of the image light IL incident on the windshield 140 is S polarization. Alternatively, the image light IL may not be the S-polarized light before the inner surface 143 of the windshield 140 as long as the image light IL reaches the outer surface 144 of the windshield 140 as the S-polarized light.

Figure 21:
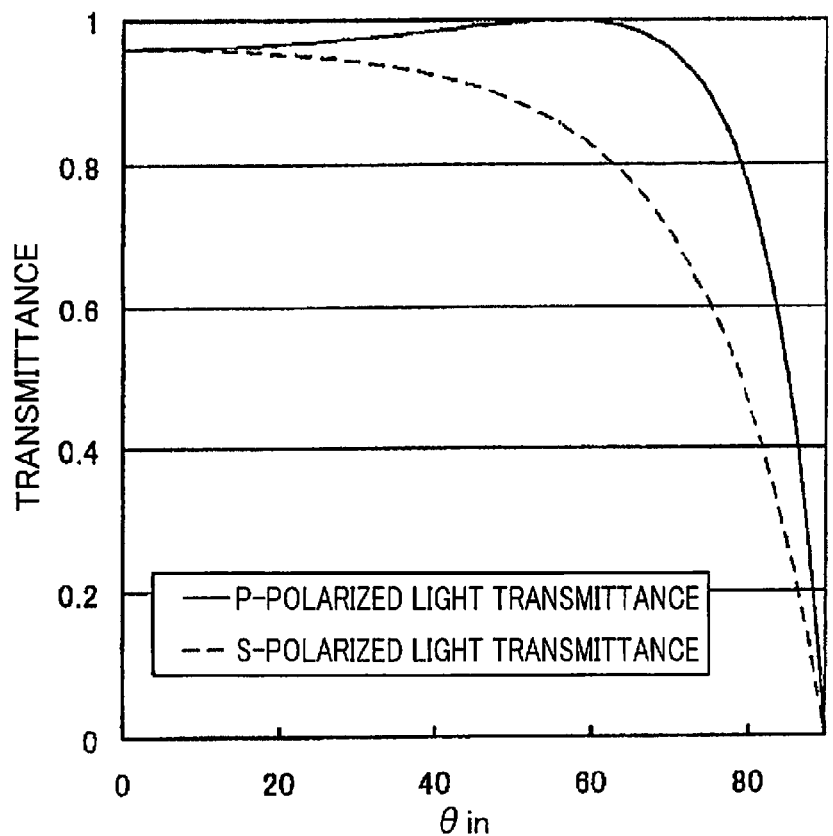
FIG. 21 is a graph showing angular dependence of transmittance.

FIG. 21 is a graph schematically showing angular dependency of transmittance. Characteristics of the image light IL around the windshield 140 are described with reference to FIG. 21.

As shown in FIG. 21, transmittance of the P-polarized light incident from the air on a transparent substance is generally larger than transmittance of the S-polarized light at the interface between the air and the transparent substance. FIG. 21 shows transmittance of light incident from a vacuum space with a refractive index of 1 on the transparent substance with a refractive index of 1.5. In FIG. 21, the incidence angle is plotted against the abscissa of the graph while the transmittance is plotted against the ordinate. The graph shown in FIG. 21 represents optical characteristics of the S-polarized and P-polarized lights.

The graph shown in FIG. 21 indicates that loss of light amount is less when the P-polarized image light IL is incident on the windshield 140 than when the S-polarized image light IL is incident on the windshield 140. When the P-polarized light is incident on the windshield 140, resultant ghost light from reflection on the front surface of the windshield 140 may be advantageously reduced in comparison with incidence of the S-polarized light on the windshield 140.

Figure 22A:
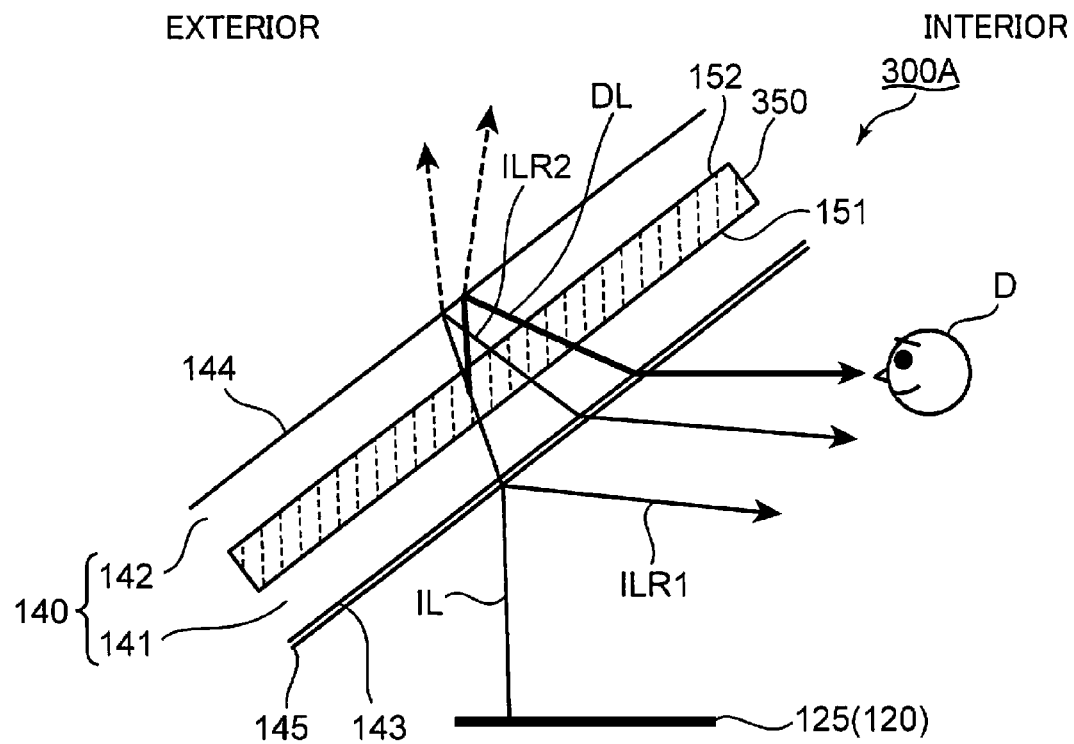
FIG. 22A is a schematic view of a modified HUD according to principles of the eighth embodiment.

FIG. 22A is a schematic view of an HUD 300A which is modified on the basis of the aforementioned principle. The modified HUD 300A are described with reference to FIG. 22A. Like the aforementioned HUD 300, the HUD 300A includes the laser source 110, projection optical system 120 and controller 130. FIG. 22A shows the screen 125, windshield 140 and the volume hologram 350 situated in the windshield 140.

In addition to the laser source 110, projection optical system 120, controller 130, windshield 140 and volume hologram 350, the HUD 300A further includes the half-wavelength plate 145 mounted on the inner surface 143 of the inner glass 141. The image light IL emitted from the screen 125 is incident as P-polarized light on the interface between the half-wavelength plate 145 and the interior space. Accordingly, the front reflection light ILR1 is reduced more significantly than the image light IL incident as S-polarized light on the interface between the half-wavelength plate 145 and the interior space. Therefore, the HUD 300A may display high quality images with few ghost images.

The image light IL, which passes through the half-wavelength plate 145 and enters the inner glass 141, becomes S-polarized light. Therefore, as described in the context of the HUD 300, ghost images caused by the back reflected light ILR2 are also reduced.

The diffracted light DL subjected to Fresnel reflection at the outer surface 144 of the windshield 140 is transmitted through the half-wavelength plate 145 and emitted toward the driver D. Since the diffracted light DL emitted from the half-wavelength plate 145 is P-polarized light, the reflection loss at the interface between the half-wavelength plate 145 and the interior space is small. Therefore, the diffracted light DL gets brighter. Therefore, the HUD 300A may display bright images.

If the incidence angle of the image light IL on the half-wavelength plate 145 is set to or nearby the Brewster angle (about 54° in FIG. 22A), reflectance of the P-polarized light is substantially 0%. Accordingly, the HUD 300A may display high quality images with few resultant ghost images from front reflection.

Figure 22B:
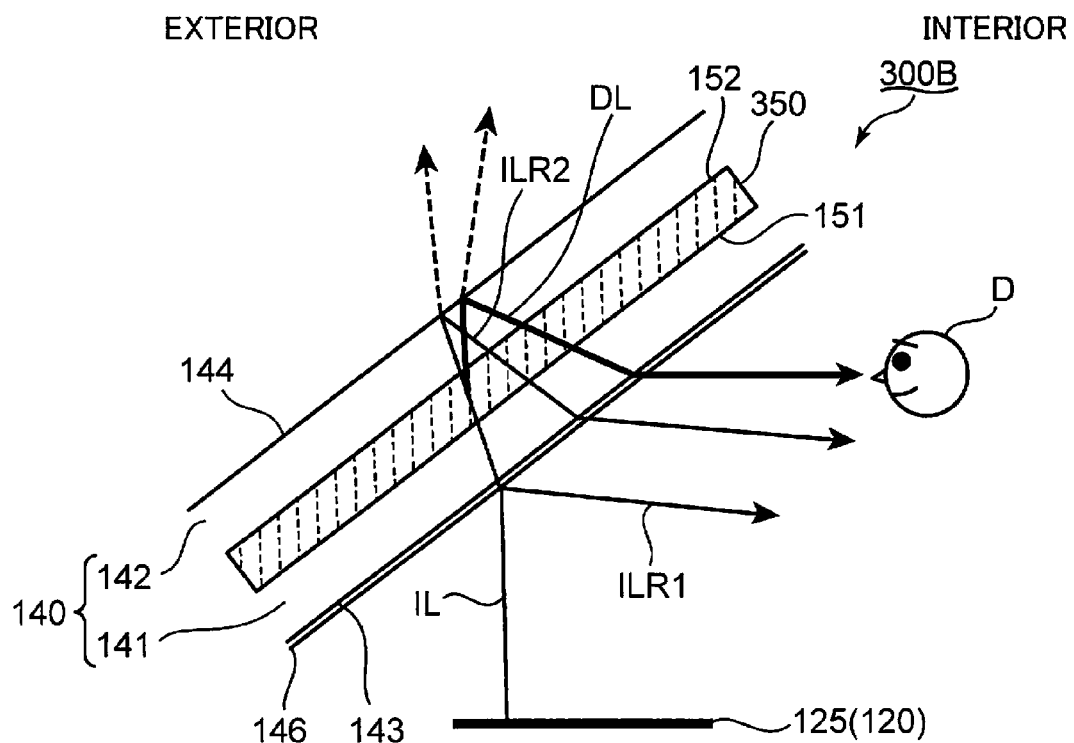
FIG. 22B is a schematic view of a modified HUD according to principles of the eighth embodiment.

FIG. 22B is a schematic view of the modified HUD 300B. The modified HUD 300B is described with reference to FIG. 22B. Like the aforementioned HUD 300A, the HUD 300B includes the laser source 110, projection optical system 120 and controller 130. FIG. 22B shows the screen 125, windshield 140 and the volume hologram 350 situated in the windshield 140.

In addition to the laser source 110, projection optical system 120, controller 130, windshield 140 and volume hologram 350, the HUD 300B further includes the antireflective coating 146 applied to the inner surface 143 of the inner glass 141. In short, instead of the half-wavelength plate 145 of the HUD 300A, the HUD 300B includes the antireflective coating 146 configured to suppress reflection of the image light IL emitted toward the first surface 151 of the volume hologram 350. The antireflective coating 146 suppresses reflection between the air and the antireflective coating 146, independently from the incidence angle of the image light IL on the antireflective coating 146. Therefore, the HUD 300B may display high quality images with few resultant ghost images from the front reflection light ILR1. Instead of the antireflective coating, an antireflective structure may be formed on the inner surface 143 of the windshield 140 according to the principle described in the context of the fourth embodiment.

Diffraction efficiency (a ratio at which the image light IL is diffracted as the diffracted light DL) of the volume hologram 350 of the HUDs 300A, 300B is preferably no less than 50%. Accordingly, an amount of the diffracted light DL becomes higher than that of the back reflected light ILR2. Therefore, the HUDs 300A, 300B may display high quality images with few resultant ghost images from the back reflected light ILR2.

<Ninth Embodiment>

(Structure of See-Through Display Device)

Figure 23:
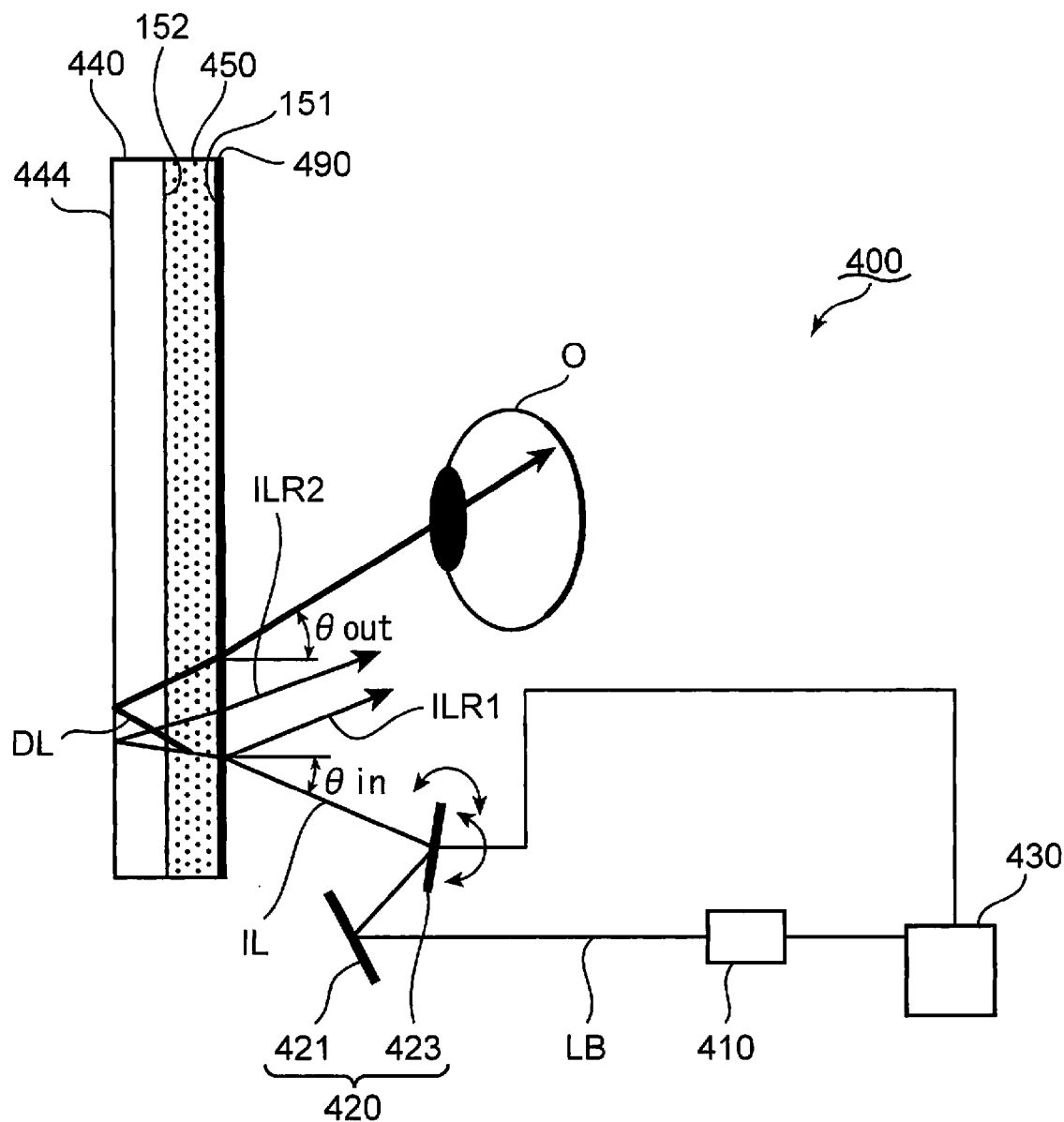
FIG. 23 is a schematic view of an HMD exemplified as the see-through display device according to the ninth embodiment.

FIG. 23 is a schematic view of an HMD 400 exemplified as the see-through display device according to the ninth embodiment. The HMD 400 is described with reference to FIG. 23. The principles described in the context of the first to eighth embodiments are applicable to the HMD 400. Similar components to those described in the context of the first to eighth embodiments are assigned with similar reference numerals or symbols. The descriptions in the first to eighth embodiments are applied to the same components as those described in the context of the first to eighth embodiments.

The HMD 400 includes a laser source 410, which emits the laser beam LB, and a projection optical system 420, which generates the image light IL from the laser beam LB. The projection optical system 420 includes a return mirror 421, which receives the laser beam LB from the laser source 410, and a MEMS mirror 423, which receives the laser beam LB from the return mirror 421.

The HMD 400 further includes a transparent resin substrate 440, a volume hologram 450 attached to the resin substrate 440, and a protective layer 490 protecting the volume hologram 450. The protective layer 490 is attached to the first surface 151 of the volume hologram 450. The resin substrate 440 is attached to the second surface 152 of the volume hologram 450.

The HMD 400 further includes a controller 430. The controller 430 controls the laser source 410 and the MEMS mirror 423.

The laser beam LB from the laser source 410 is emitted toward the return mirror 421. The return mirror 421 reflects the laser beam LB toward the MEMS mirror 423. The laser beam LB is used by the MEMS mirror 423 for two-dimensional scanning, and then emitted as the image light IL.

The controller 430 drives the MEMS mirror 423 in response to image data of the displayed image. The controller 430 drives the laser source 410 synchronously with the scanning operation of the MEMS mirror 423 to adjust a light amount of the laser beam LB. Accordingly, a two-dimensional image is formed by the image light IL emitted from the MEMS mirror 423.

Interference fringes are recorded in the volume hologram 450 by two-light flux interference, for example, according to the principle described with reference to FIG. 1B. Therefore, the volume hologram 450 functions as a transmissive hologram. As described above, the volume hologram 450 is situated on the resin substrate 440. The first surface 151 of the volume hologram 450 is covered with the protective layer 490.

In order to record the transmissive interference fringes, for example, the reference and object lights RL, OL are made incident on the first surface 151 of the volume hologram 450 according to the principle described with reference to FIGS. 18A and 18B. In this case, the incidence angle of the reference light is set larger than the incidence angle of the object light on the volume hologram so that the emission angle $\theta_{out}$ of the laser beam LB on the volume hologram 450 is greater than the incidence angle $\theta_{in}$.

A part of the image light IL used for scanning by the MEMS mirror 423 typically is subjected to Fresnel reflection as the front reflection light ILR1 at the front surface of the protective layer 490. The remaining image light IL is transmitted through the protective layer 490 and enters the volume hologram 450.

The image light IL incident on the volume hologram 450 is diffracted by the interference fringes recorded in the volume hologram 450 to generate the diffracted light DL. Since the interference fringes formed in the volume hologram 450 are a transmissive type, the image light IL incident on the volume hologram 450 is transmitted from the first surface 151 to the second surface 152.

The resin substrate 440 includes an outer surface 444 (interface between the resin substrate 440 and the air), which is opposite to the boundary with the volume hologram 450. The diffracted light DL is transmitted through the resin substrate 440 and reaches the outer surface 444. The outer surface 444 of the resin substrate 440 reflects the diffracted light DL as Fresnel reflection. Accordingly, the diffracted light DL is returned to the observer O. After Fresnel reflection at the outer surface 444, the diffracted light DL is transmitted through the volume hologram 450 and the protective layer 490, and then reaches the eyes of the observer O. In the present embodiment, the resin substrate 440 is exemplified as the transparent substrate. The outer surface 444 of the resin substrate 440 is exemplified as the interface.

The image light IL, which is not diffracted by the volume hologram 450, is reflected as Fresnel reflection at the outer surface 444 of the resin substrate 440, and then returned to the observer O as the back reflected light ILR2. The back reflected light ILR2 is transmitted through the volume hologram 450, and eventually emitted from the protective layer 490.

A polarization direction of the image light IL is adjusted so that the polarization direction of the image light IL incident on the outer surface 444 (interface between the resin substrate 440 and the air) of the resin substrate 440 corresponds to S-polarization. Accordingly, Fresnel reflectance of the diffracted light DL at the outer surface 444 of the resin substrate 440 is larger than reflectance of the back reflected light ILR2 as long as the emission angle $\theta_{out}$ of the laser beam LB is set larger than the incidence angle $\theta_{in}$, according to the principle described in the context of the eighth embodiment. Therefore, the HMD 400 may display high quality images with few resultant ghost images from the back reflected light ILR2.

According to the principle described in the context of the second embodiment, a half-wavelength plate may be arranged, instead of the protective layer 490. The image light IL may be adjusted so that a polarization direction of the image light incident on the half-wavelength plate corresponds to P polarization. Consequently, the HMD 400 may display high quality images with a decreased amount of the front reflection light ILR1.

According to the principle described in the context of the third or fourth embodiment, an antireflective coating or structure may be used, instead of the protective layer 490. Accordingly, reflectance at the interface with the air is reduced, independently from the incidence angle of the image light IL on the antireflective coating or structure. Therefore, the HMD may display high quality images with few resultant ghost images from the front reflection light ILR1.

According to the principle described in the context of the eighth embodiment, diffraction efficiency of the volume hologram 450 (a ratio of the image light IL diffracted into the diffracted light DL) may be no less than 50%. Consequently, an amount of the diffracted light DL becomes greater than that of the back reflected light ILR2. Accordingly, the HMD 400 may display high quality images with little influence of resultant ghost images from the back reflected light ILR2.

In the first to ninth embodiments, each of the see-through display devices (HUD, HMD) has a single laser source. Alternatively, the see-through display device may have different laser sources in wavelengths. In this case, a volume hologram of the see-through display device is subjected to multiple exposures by means of light with a wavelength corresponding to laser light from the laser source.

For example, a see-through display device may include a red laser source, which emits a red laser light, a green laser source, which emits a green laser light, and a blue laser source, which emits a blue laser light, as light sources. A volume hologram of the see-through display device is subjected to multiple exposures by lights with wavelengths corresponding to the red, green and blue laser light. Accordingly, interference fringes, which specifically diffract the red, green and blue laser lights, are formed in the see-through display device. Consequently, the see-through display device (HUD, HMD) may display full-color images.

In the first to ninth embodiments, each of the see-through display devices (HUD, HMD) includes a volume hologram. Alternatively, the see-through display device may include another hologram than the volume hologram. For example, the see-through display device may include a relief hologram, instead of the volume hologram. The principles described in the context of the first to ninth embodiments may be advantageously applied to the see-through display device with the relief hologram. The see-through display device may include a computer generated hologram, instead of the volume hologram. The principles described in the context of the first to ninth embodiments may be advantageously applied to the see-through display device with the computer generated hologram.

<Tenth Embodiment>

According to the principles described in the context of the first to ninth embodiments, stray light may be reduced to a greater extent in comparison with conventional see-through display devices. However, the principles described in the context of the first to ninth embodiments are not applicable to a reduction in resultant stray light from external light components incident at a specific angle.

Figure 24:
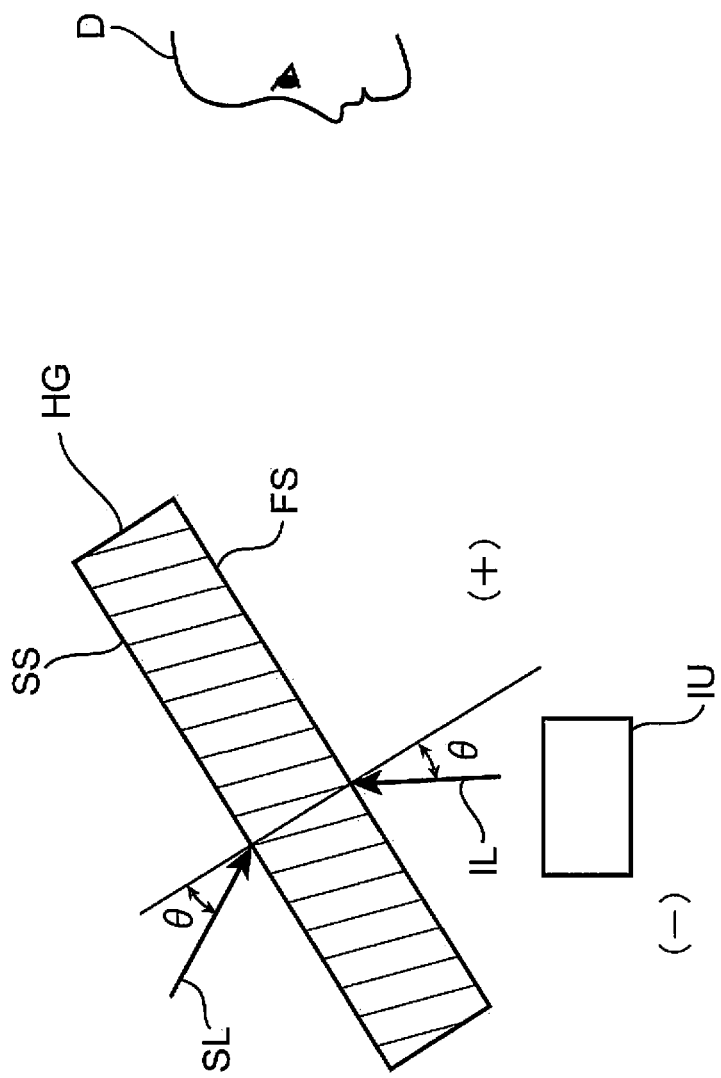
FIG. 24 is a schematic view showing generation principles of stray light.

FIG. 24 schematically shows generation principle of stray light, which may not be eliminated by means of the principles described in the context of the first to ninth embodiments. Problems associated with the principles described in the context of the first to ninth embodiments are described with reference FIG. 24.

FIG. 24 shows an emission unit IU, which emits the image light IL, and a volume hologram HG, which receives the image light IL. The image light IL is inclined at an angle θ in the minus direction with respect to a first surface FS of the volume hologram HG.

FIG. 24 shows an external light component SL incident on a second surface SS (opposite surface to the first surface FS) of the volume hologram HG. Like the image light IL, the external light component SL is inclined at an angle θ in the minus direction with respect to the second surface SS. The stray light caused by such external light component SL may not be sufficiently removed according to the principles described in the context of the first to ninth embodiments.

Figure 25:
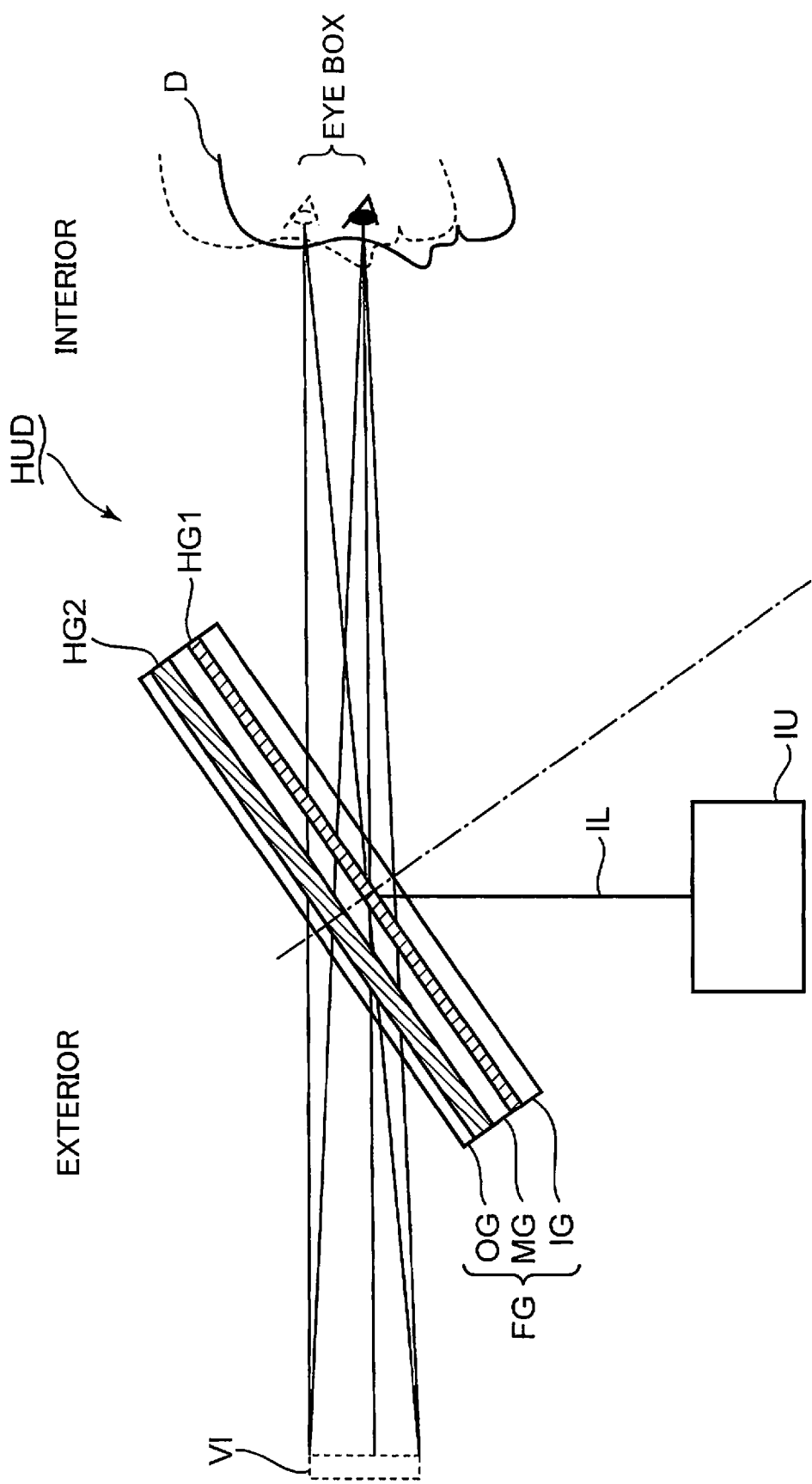
FIG. 25 is a schematic view of a conventional HUD.

JP H7-96772 A suggests an HUD configured to resolve the aforementioned problem. FIG. 25 is a schematic view showing an HUD disclosed in JP H7-96772 A. An optical design of the conventional HUD is described with reference to FIG. 25.

The conventional HUD includes the emission unit IU configured to emit the image light IL. The emission unit IU includes a spatial modulator (not shown in the figure) such as a liquid crystal panel and an illumination optical system (not shown in the figure) such as a backlight which illuminates the spatial modulator. The image light IL generated by the spatial modulator and illumination optical system is emitted from the emission unit IU to a windshield FG of a vehicle.

The windshield FG includes an inner glass IG, which faces the driver D, an outer glass OG opposite to the inner glass IG, and a medium glass MG situated between the inner and outer glasses IG, OG.

The conventional HUD further includes a first hologram HG1 situated between the inner and medium glasses IG, and a second hologram HG2 situated between the medium and outer glasses MG, OG.

The image light IL from the emission unit IU enters the inner glass IG, and then reaches the first hologram HG1. The first hologram HG1 diffracts the image light IL toward the driver D. A direction of the diffraction grating of the first hologram HG1 is designed as appropriate. The first hologram HG1 may cause concentration action. Accordingly, the image displayed by the spatial modulator in the emission unit IU is spread. Consequently, the driver D may observe the spread image displayed by the spatial modulator as a virtual image VI in front of the windshield FG.

The optical system of the emission unit IU advantageously includes a semiconductor laser source with a narrower wavelength width than lamps or light-emitting diodes. Accordingly, diffraction efficiency of the first hologram HG1 is increased. Therefore, the HUD may achieve high light-utilization efficiency under low power consumption.

The first hologram HG1 is mainly used for diffracting the image light IL toward the driver D whereas the second hologram HG2 is used for reflecting the external light incident from the exterior space into the exterior space. Since the second hologram HG2 reflects the external light, the external light component SL, which is difficult to be removed by the volume hologram described in the context of the aforementioned first to ninth embodiments, may be advantageously removed. However, the second hologram HG2 is provided, separately from the first hologram HG1. The second hologram HG2 is then superimposed on the first hologram HG1 in the windshield FG. Accordingly, the optical design shown in FIG. 25 requires optical alignment between the first and second holograms HG1, HG2. Therefore, it is difficult to manufacture the conventional HUD.

In order to simplify the manufacture of an HUD, it is preferred to use a hologram which has both functions of the first hologram HG1 (image display function) and the second hologram HG2 (external light removal function). Such a hologram with both of the image display function and the external light removal function may be produced if one hologram is subjected to multiple exposure processes. However, several problems are associated with the processes to apply multiple exposures to one hologram. The problems about the multiple exposure processes are described below.

Volume holograms are characterized in wavelength selectivity and angle selectivity. Due to such characteristics of volume holograms, a volume hologram may very efficiently diffract image light and achieve appropriate transmittance of external light.

If a volume hologram is incorporated in an HUD, an optical design of the HUD has to take account of an angular range to be tolerant for an movement amount of an observer view point, a fluctuation in an incidence angle, which is caused by a positional fluctuation of a screen, and a fluctuation in light source wavelength, as well as other factors for tolerating wavelength fluctuations. A thin volume hologram is highly tolerant for a wavelength fluctuation but has low diffraction efficiency. The diffraction efficiency of volume holograms increases as a modulation degree of a refractive index becomes high. Tolerance for a wavelength fluctuation increases as a diffraction angle of volume hologram becomes smaller. The thickness, modulation degree of a refractive index, and diffraction angle of the volume hologram are appropriately determined on the basis of the aforementioned conditions. Accordingly, the HUD may display sufficiently bright images which are less susceptible to a wavelength fluctuation.

Figure 26:
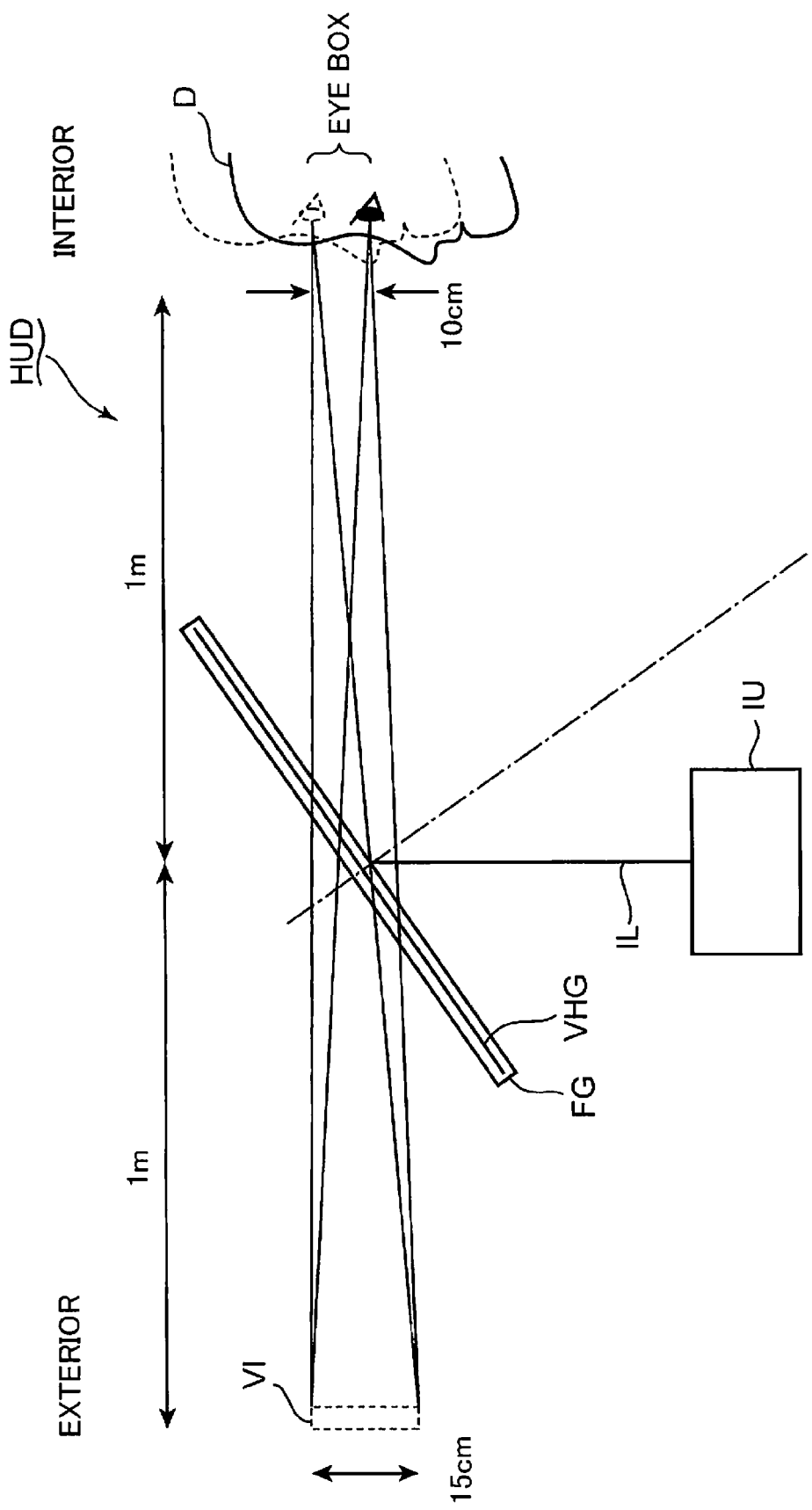
FIG. 26 is a schematic view of an HUD provided with a volume hologram.

FIG. 26 is a schematic view of an HUD provided with a volume hologram. A design of the volume hologram is described with reference to FIG. 26.

The HUD shown in FIG. 26 includes an emission unit IU, which emits the image light IL and a volume hologram VHG situated in the windshield FG. The volume hologram VHG diffracts the image light IL toward the driver D according to wavelength selectivity or angle selectivity whereas the volume hologram VHG does not diffract different light in wavelength or angle from the image light IL. Therefore, there is little diffraction for the external light directed from the exterior space in front of the windshield FG toward the driver D. Accordingly, high transmittance of the windshield FG is maintained.

As described above, the wavelength selectivity and angle selectivity of the volume hologram VHG have to be tolerant to some extents. For example, the volume hologram VHG has to diffract the image light IL appropriately toward the driver D in an eye box (a fluctuation range of the driver eye position) corresponding to a fluctuation in a seating position of the driver D or a posture of the driver D, as shown in FIG. 26.

The incidence and emission angles of the image light IL with respect to the volume hologram VHG may varies to some extents in order to make the virtual image VI wider than a predetermined size. For example, if the distance from the volume hologram VHG to the virtual image VI is "1 m", if the distance from the volume hologram VHG to the driver D is "1 m", if the size of the eye box is "10 cm", and if the size of the virtual image VI is "15 cm", a range of the emission angle of the image light IL from the volume hologram VHG toward the driver D is "about ±3°".

A oscillation wavelength of a semiconductor laser depends on a temperature of semiconductor layer elements. In order to make the driver D observe the virtual image VI appropriately under a condition of variable ambient temperature around the semiconductor layer, the volume hologram VHG has to be more tolerant for the wavelength than a fluctuation range of the light source wavelength. For example, if a red laser with a semiconductor of an AlGaInP system is used as a light source, a thermal coefficient of an excitation wavelength is "about 0.2 nm/° C.". Under consideration of environmental changes such as seasons and solar illumination, a temperature under which the red laser is used may be ranged from 0° C. to 60° C. In this case, the volume hologram VHG has to be tolerant for an entire wavelength variance of "about 30 nm".

An approximated value of diffraction efficiency of the volume hologram VHG may be estimated on the basis of a coupled wave theory by means of thickness of the volume hologram VHG, incidence and emission angles with respect to the volume hologram VHG, and modulation degree of refractive index of the volume hologram VHG ("Coupled Wave Theory for Thick Hologram Grating": H. Kogelnik, Bell Syst. Tech. J. vol. 48, pp. 2909-2947 (1969)).

The emission unit IU shown in FIG. 26 emits the image light IL with a wavelength, for example, of 532 nm. A required range of the emission angle is, for example, ±3 degrees. A fluctuation width of the wavelength of the image light IL is, for example, 30 nm (entire width). Under such conditions, the volume hologram VHG has to be no more than 3 micron in thickness to make a reduction amount of the diffraction efficiency of the volume hologram VHG no more than ½. The modulation degree of refractive index also has to be no less than 0.1 to achieve diffraction efficiency of around 100%.

Recent developments in the field of photopolymers allow volume holograms to largely modulate a refractive index. However, volume holograms have achieved about "0.03" of the modulation degree of refractive index so far. Therefore, approximately "10%" of the diffraction efficiency has been achieved so far. Consequently, in order to display sufficiently bright images in the current situation, an emission unit is required to have a high power light source. If an emission unit includes a high power light source, sufficiently bright images may be displayed in accordance with the diffraction efficiency of a volume hologram.

As described above, the problems described with reference to FIG. 25 may be resolved if a volume hologram is subjected to multiple exposure processes to form interference fringes for removing unnecessary external light. However, in this case, the volume hologram is required to have a high modulation degree of refractive index. In order to remove unnecessary external light, the external light causing the stray light should be diffracted at diffraction efficiency substantially close to 100%. However, it is difficult to form the interference fringes for removing unnecessary external light effectively in the volume hologram with the aforementioned thickness.

In addition, there is another problem that the interference fringes for removing unnecessary light cause other unnecessary light components. There is yet another problem that angle selectivity of the volume hologram is changed by resultant contraction of the volume hologram from a thermal change of the volume hologram. Such changes in angle selectivity make it difficult to remove unnecessary external light effectively.

In the present embodiment, techniques for resolving the aforementioned problems are described. The principle of the present embodiment is aimed to suppress occurrence of stray light, which is difficult to be removed on the basis of the principles of the first to ninth embodiments.

Figure 27:
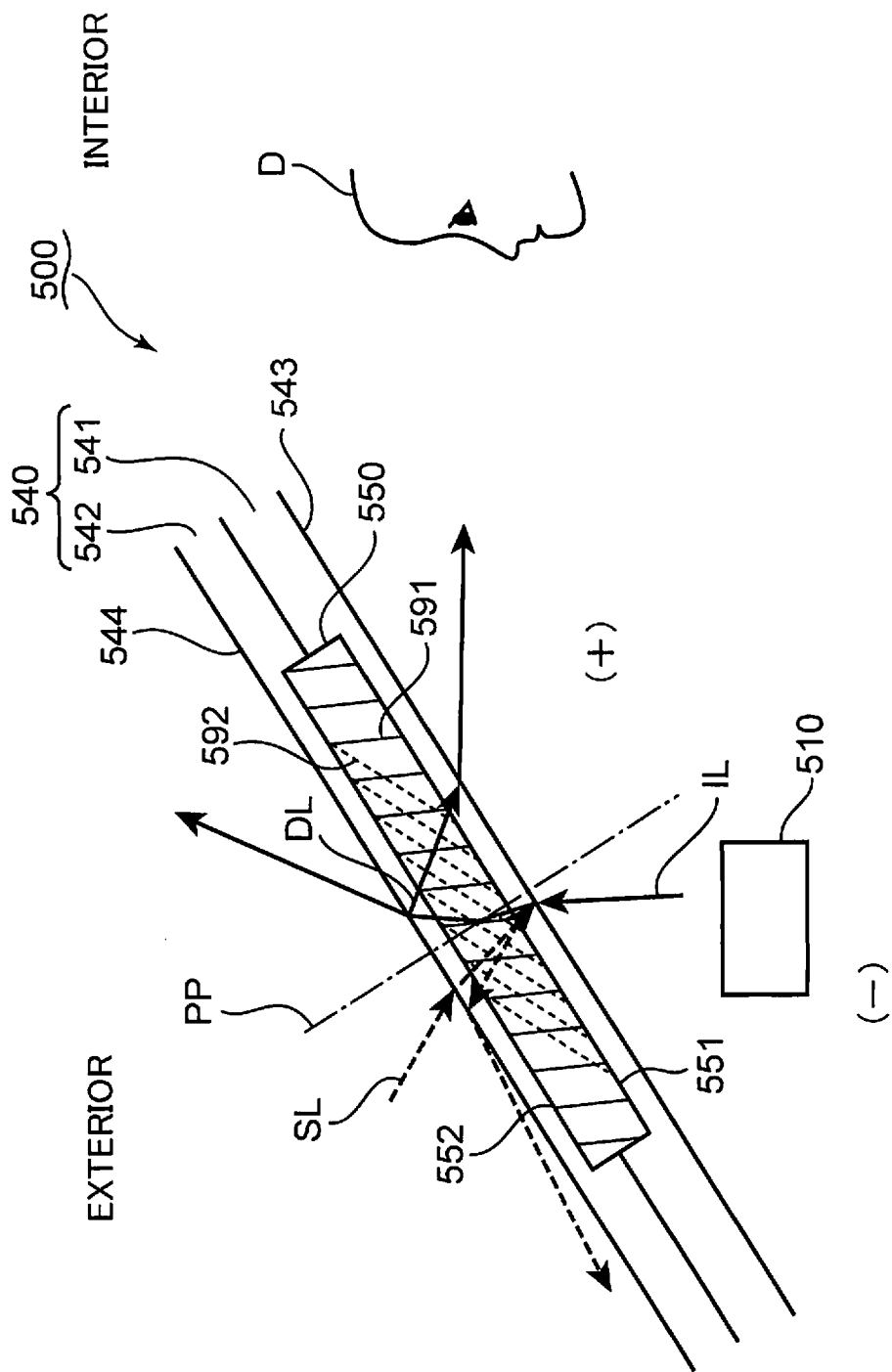
FIG. 27 is a schematic view of an HUD exemplified as the see-through display device according to the tenth embodiment.

FIG. 27 shows an HUD 500 exemplified as the see-through display device according to the tenth embodiment. The modified HUD 500 is described with reference to FIG. 27.

The HUD 500 shown in FIG. 27 includes an emission unit 510 configured to emit the image light IL. The emission unit 510 may incorporate, for example, the laser light unit 110, projection optical system 120, and controller 130, which are described with reference to FIG. 1A.

The HUD 500 of the present embodiment is mounted on a vehicle, like the see-through display device described in the context of the first to ninth embodiments. The transparent windshield 540 of the vehicle is used as a part of the HUD 500, like the see-through display device described in the context of the first to ninth embodiments. In the following description, the surface of the windshield 540, which faces the driver D of the vehicle, is referred to as "inner surface 543". The opposite surface of the windshield 540 to the inner surface 543 is referred to as "outer surface 544". The inner surface 543 defines the inner space of the vehicle. The outer surface 544 defines a boundary between the vehicle and the outer space. The driver D is an observer observing virtual images corresponding to images generated by the image light IL through the windshield 540, like the first to ninth embodiments. In the present embodiment, the windshield 540 is exemplified as the transparent substrate.

The windshield 540 has an inner glass 541, which includes the inner surface 543, and the outer glass 542, which includes the outer surface 544. The emission unit 510 emits the image light IL toward the inner glass 541.

The HUD 500 further includes a volume hologram 550 sandwiched between the inner and outer glasses 541, 542. The volume hologram 550 includes the transmissive interference fringe described in the context of the first to ninth embodiments. In the following description, the transmissive interference fringe formed in the volume hologram 550 is referred to as "first interference fringe 591". The first interference fringe 591 may be recorded, for example, by means of the techniques described with reference to FIG. 1B. In the present embodiment, the surface of the volume hologram 550, which the object and reference lights used for recording the first interference fringe 591 enter, is referred to as "first surface 551". Like the first to ninth embodiments, the first surface 551 faces the driver D. In the following description, the opposite surface of the volume hologram 550 to the first surface 551 is referred to as "second surface 552". Many types of stray light may be appropriately removed by the first interference fringe 591, like the see-through display devices described in the context of the first to ninth embodiments.

The volume hologram 550 is subjected to multiple exposure processes. Accordingly, a reflective interference fringe is also recorded in the volume hologram 550, in addition to the first interference fringe 591. In the following description, the reflective interference fringe is referred to as "second interference fringe 592". As described below, the second interference fringe 592 is formed so as to remove the external light component incident on the outer surface 544 of the windshield 540.

The image light IL emitted from the emission unit 510 enters the inner glass 541. Then, the image light IL enters the volume hologram 550. The first interference fringe 591 of the volume hologram 550 diffracts the image light IL. As described above, since the first interference fringe 591 is a transmissive type, the image light IL may pass through from the first surface 551 to the second surface 552. In the following description, the image light IL diffracted by the first interference fringe 591 is referred to as "diffracted light DL".

As described above, the diffracted light DL is emitted from the second surface 552 to the outside of the volume hologram 550. Then, the diffracted light DL reaches the outer surface 544 of the windshield 540. As described in the context of the first to ninth embodiments, a part of the diffracted light DL is subjected to Fresnel reflection at the outer surface 544, and then propagates toward the driver D. In the present embodiment, the outer surface 544 is exemplified as the interface.

The diffracted light DL reflected at the outer surface 544 is again incident on the volume hologram 550. The diffracted light DL incident on the volume hologram 550 deviates significantly from the Bragg condition of the first interference fringe 591. Therefore, the diffracted light DL propagates toward the inner surface 543 of the windshield 540 without diffraction by the first interference fringe 591. Then, the diffracted light DL is emitted from the inner surface 543, and then propagates toward the driver D.

Figure 28:
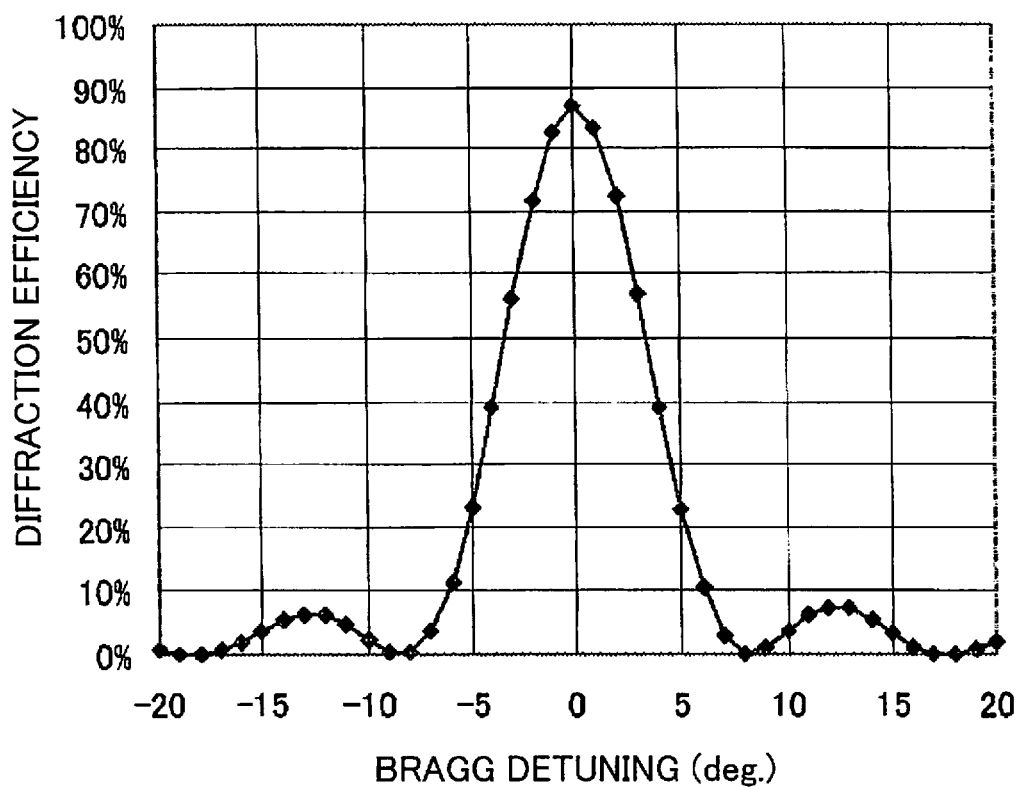
FIG. 28 is a graph showing calculation results about diffraction efficiency of a first interference fringe recorded in the volume hologram of the HUD shown in FIG. 27.

FIG. 28 is a graph showing computation results about diffraction efficiency of the first interference fringe 591. The diffraction efficiency of the first interference fringe 591 is described with reference to FIGS. 27 and 28. Computation of the diffraction efficiency shown in FIG. 28 is based on the coupled wave theory.

The wavelength of the light source (i.e. wavelength of the image light IL) is set to 532 nm in the computation of the diffraction efficiency of the first interference fringe 591. The optimum incidence angle is set to 30 degrees. The optimum incidence angle means the incidence angle at which the diffraction efficiency peaks. The emission angle of the diffracted light DL from the volume hologram 550 is set to 50 degrees. The thickness of the volume hologram 550 is set to 20 micron. The modulation degree of refractive index of the volume hologram 550 is set to 0.015. The graph in FIG. 28 shows a change in the diffraction efficiency in response to deviation from the optimum incidence angle. In the present embodiment, the image light IL incident at the optimum incidence angle is exemplified as the first light. The optimum incidence angle of the image light IL on the volume hologram 550 is exemplified as the first incidence angle. The emission angle of the image light IL (diffracted light DL) incident at the optimum incidence angle is exemplified as the first emission angle.

FIG. 28 clearly indicates that the transmissive first interference fringe 591 reaches the diffraction efficiency nearby 100% even at a low modulation degree of refractive index. It is clear that the first interference fringe 591 is tolerant enough for applications to the HUD 500 in terms of a fluctuation in the incidence angle and wavelength.

As described above, the HUD 500 displays an image by means of Fresnel reflection of the image light IL at the outer surface 544 of the windshield 540. Therefore, about 4% of the diffracted light DL from the first interference fringe 591 reaches the driver. The remaining diffracted light DL is emitted to the outside of the vehicle. However, since the transmissive first interference fringe 591 achieves around 100% of the diffraction efficiency, displayed images may be as bright as those displayed by the HUD described with reference to FIG. 25.

The volume hologram 550 of the present embodiment may be comparatively thick. This is advantageous in terms of removal of stray light. As described with reference to FIG. 24, the principles of the first to ninth embodiments are not suitable for removing the stray light caused by the external light component SL incident at the same incidence angle as the image light IL. If the external light component SL is reflected by the inner surface 543 of the windshield 540 and then reaches the driver D along a path of the diffracted light DL, the external light component SL is perceived as stray light by the driver D.

As described above, the volume hologram 550 is subjected to multiple exposure processes to record the second interference fringe 592. The second interference fringe 592 diffracts the external light component SL, which causes stray light, before the inner surface 543 of the windshield 540. In short, the reflective second interference fringe 592 performs diffraction so that the external light component SL incident on the second surface 552 of the volume hologram 550 is emitted from the second surface 552. Accordingly, a path of the external light component SL is less likely to overlap the path of the diffracted light DL.

Figure 29:
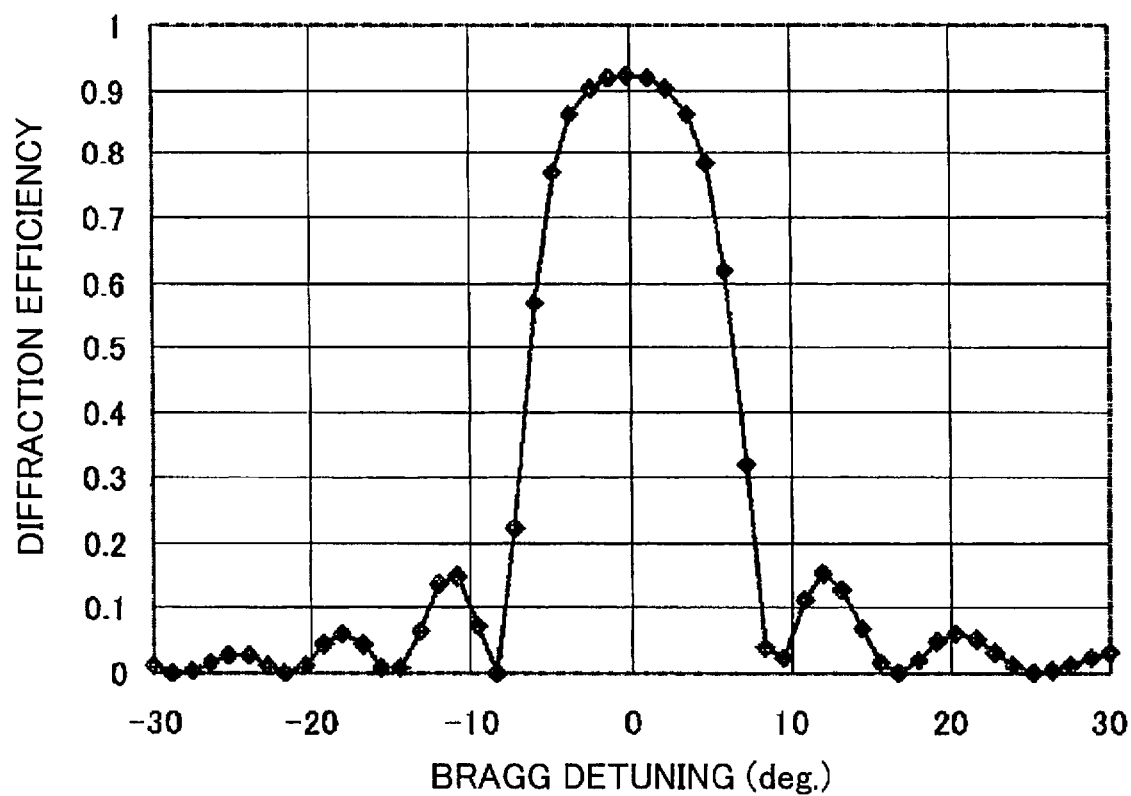
FIG. 29 is a graph showing calculation results about diffraction efficiency of a second interference fringe recorded in the volume hologram of the HUD shown in FIG. 27.

FIG. 29 is a graph showing computation results about diffraction efficiency of the second interference fringe 592. The optimum incidence angle on the volume hologram 550 is set to 30 degrees. The emission angle from the volume hologram 550 is set to 85 degrees. The diffraction efficiency of the second interference fringe 592 is described with reference to FIGS. 27 to 29.

The external light component SL is shown in FIG. 27. The external light component SL is incident from the outer space onto the outer surface 544 of the windshield 540. The external light component SL is reflected as Fresnel reflection by the outer surface 544 of the windshield 540. Accordingly, a part of the external light component SL propagates toward the volume hologram 550, which is situated inside the windshield 540, and enters the second surface 552 of the volume hologram 550 at the same incidence angle as the optimum incidence angle of the image light IL. In the present embodiment, the external light component SL incident on the second surface 552 of the volume hologram 550 is exemplified as the second light. The incidence angle of the external light component SL on the volume hologram 550 is exemplified as the second incidence angle. The emission angle of the external light component SL incident at the optimum incidence angle is exemplified as the second emission angle.

Without the second interference fringe 592 recorded in the volume hologram 550, the external light component SL incident on the volume hologram 550 reaches the driver D along the path of the diffracted light DL. Accordingly, the external light component SL is perceived as stray light by the driver D.

In the present embodiment, the second interference fringe 592 achieves the maximum diffraction efficiency for the external light component SL incident at the same incidence angle of 30 degrees as the optimum incidence angle of the first interference fringe 591. Therefore, the volume hologram 550 effectively diffracts the external light component SL, which results in little stray light caused by the external light component SL.

Since the modulation degree of refractive index of the second interference fringe 592 and the incidence angle are optimized, the second interference fringe 592 is tolerant for an angular fluctuation within a wider range than that of the first interference fringe 591. Therefore, resultant stray light from the external light component SL is effectively removed.

Figure 30:
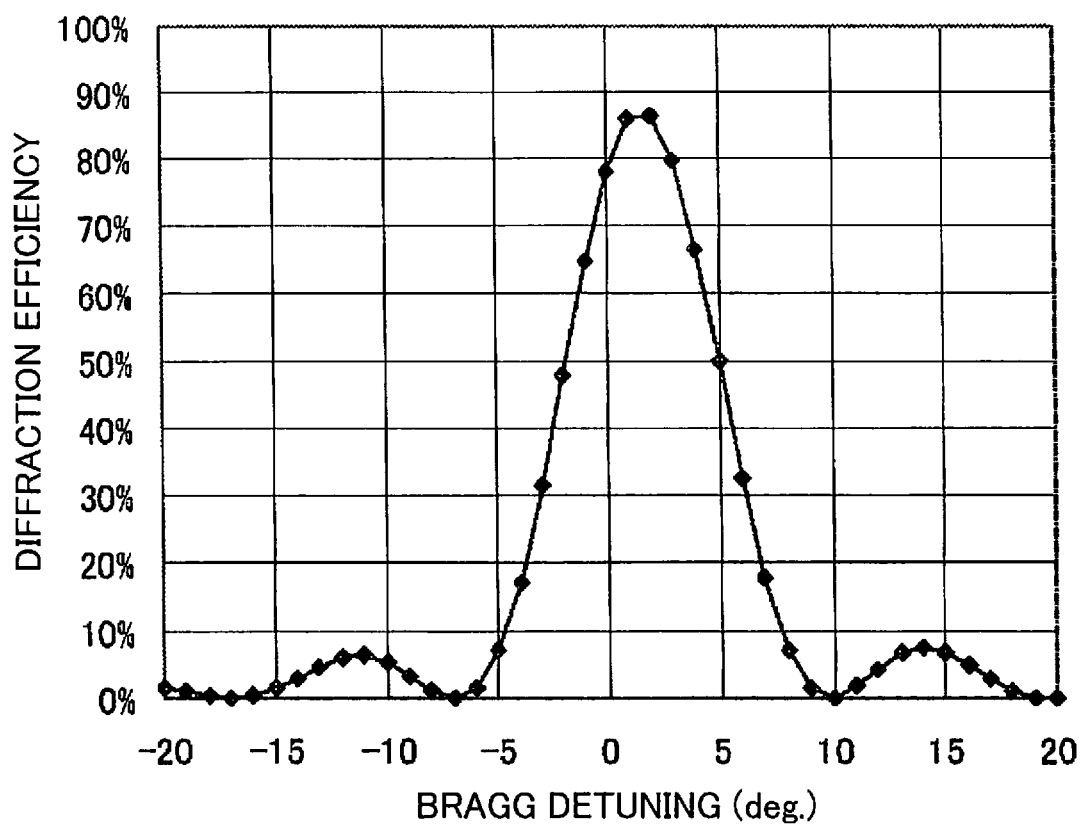
FIG. 30 is a graph showing calculation results about angular dependency characteristics of diffraction efficiency of the first interference fringe recorded in the volume hologram of the HUD shown in FIG. 27.

FIG. 30 is a graph showing calculation results about angular dependency characteristics of diffraction efficiency of the first interference fringe 591. The diffraction efficiency of the first interference fringe 591 is further described with reference to FIGS. 27, 28 and 30.

As described above, the HUD 500 is mounted on a vehicle. The windshield 540 of the vehicle is used as a part of the HUD 500. The volume hologram 550 is attached to the windshield 540. If the volume hologram 550 is used in such an environment, variations in solar light or ambient temperature cause expansion or contraction of the volume hologram. This varies diffraction characteristics of the first interference fringe 591 recorded in the volume hologram 550.

The graph in FIG. 30 shows diffraction characteristics under a thermal change of the volume hologram 550 described with reference to FIG. 28 to cause 3% contraction in the volume hologram 550. Photopolymer has been well developed as materials for volume holograms, but a linear expansion coefficient of photopolymers is typically "$10^{-4}$" with respect to 1-degree temperature variation. A temperature variation of several tens of degrees may be considered as a thermal condition of usage for the windshield 540. Under such conditions, it is expected that the volume hologram expands or contracts by about several percents.

In comparison between FIGS. 28 and 30, the optimum incidence angle increases as a result of contraction of the volume hologram 550.

Figure 31:
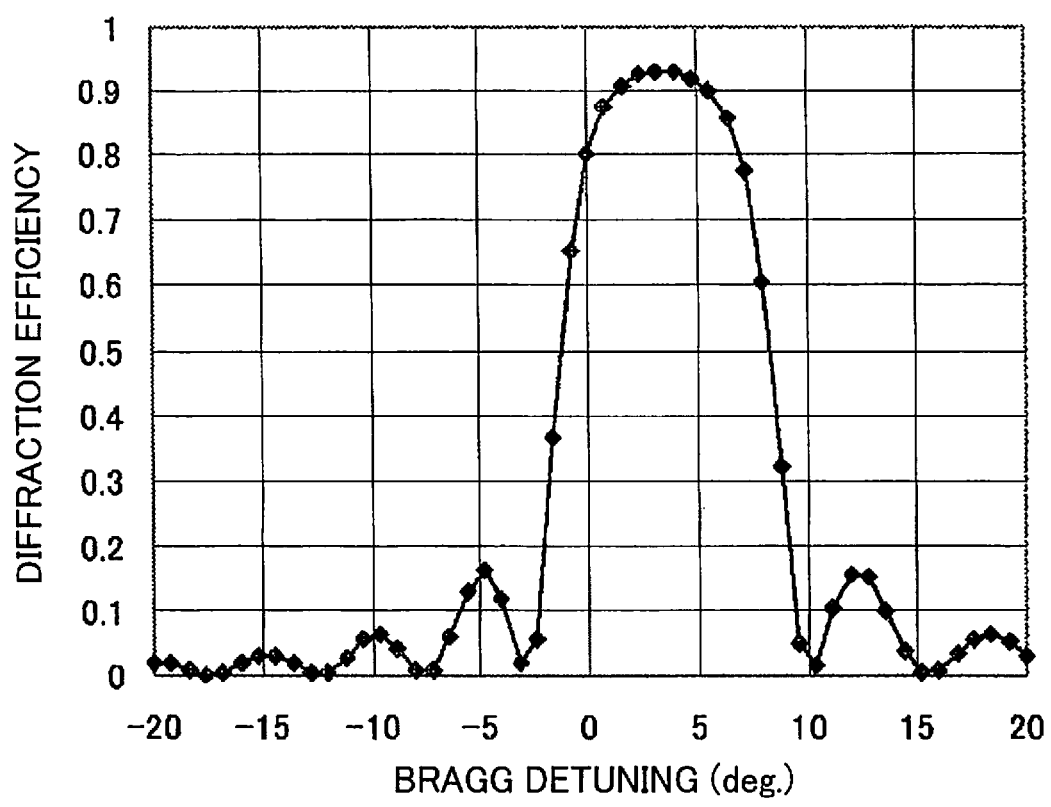
FIG. 31 is a graph showing calculation results about angular dependency characteristics of diffraction efficiency of the second interference fringe recorded in the volume hologram of the HUD shown in FIG. 27.

FIG. 31 is a graph showing diffraction characteristics of the second interference fringe 592 when the volume hologram 550 contracts by 3%. The diffraction characteristics of the second interference fringe 592 are described with reference to FIGS. 27 to 29.

Comparison between FIGS. 29 and 31 makes it clear that the optimum incidence angle on the second interference fringe 592 increases due to the contraction of the volume hologram 550, like the first interference fringe 591. In the present embodiment, if the optimum incidence angle on the first interference fringe 591 increases in response to a thermal change of the volume hologram 550, the optimum incidence angle on the second interference fringe 592 also increases. If the optimum incidence angle on the first interference fringe 591 decreases in response to a thermal change of the volume hologram 550, the optimum incidence angle on the second interference fringe 592 also decreases. Therefore, the volume hologram 550 may remove stray light appropriately even under an environment with a thermal change. It is preferred that a change rate of the optimum incidence angle on the first interference fringe 591 in response to a thermal change of the volume hologram is the same as a change rate of the optimum incidence angle on the second interference fringe 592. Accordingly, performance of the volume hologram 550 to remove stray light become less susceptible to a thermal change of the volume hologram 550.

A design of the volume hologram 550 for obtaining the aforementioned temperature—diffraction characteristics is described with reference to FIG. 27.

FIG. 27 shows the perpendicular plane PP to the first surface 551 of the volume hologram 550. In the following description, an upward inclination angle from the perpendicular plane PP (driver D) is referred to as a plus (+) side (positive angle). An opposite angle, i.e. downward inclination from the perpendicular plane PP is referred to as a minus (−) side (negative angle).

In the present embodiment, the optimum incidence angle of the image light IL is a negative angle whereas the emission angle of the image light IL (diffraction light DL) from the first surface 551 of the volume hologram 550 is a positive angle. Each of the optimum incidence angle of the external light component SL and the emission angle of the external light component SL from the second surface 552 of the volume hologram 550 is a negative angle.

Under the aforementioned optical relationship, a change in the optimum incidence angle in response to a thermal change of the volume hologram 550 is substantially the same between the external light component SL and the image light IL.

If the optimum incidence angle of the image light IL is a positive angle, the emission angle of the image light IL (diffracted light DL) from the first surface 551 of the volume hologram 550 is set to a negative angle. In this case, each of the optimum incidence angle of the external light component SL and the emission angle of the external light component SL from the second surface 552 of the volume hologram 550 is set to a positive angle.

In the aforementioned design of the volume hologram 550, the optimum incidence angle of the image light IL on the volume hologram 550 is preferably set to a value no more than 50 degrees. In this case, the volume hologram 550 is formed so that the emission angle of the image light IL (diffracted light DL) from the first surface 551 of the volume hologram 550 is ranged from 50 degrees to 70 degrees. The volume hologram 550 is formed so that the emission angle from the second surface 552 of the volume hologram 550 is no less than 70 degrees. Accordingly, a change rate of the optimum incidence angle in response to expansion and/or contraction of the volume hologram 550 is substantially the same between the first and second interference fringes 591, 592.

Conventional holograms used for removing stray light are designed without consideration for the resultant variation of the diffraction characteristics from a thermal change of the hologram. Therefore, when the ambient temperature changes, stray light may be insufficiently removed even if the hologram effectively removes the stray light at a designed temperature.

If images are displayed by means of a hologram provided separately from another hologram for removing stray light, like the HUD described with reference to FIG. 25, a thermal difference between the interior and exterior spaces may cause a problem. For example, if air conditioner of the vehicle is operated, the interior space may be significantly different in temperature from the exterior space, which results in a difference in a temperature between the first hologram HG1 adjacent to the inner glass IG and the second hologram HG2 adjacent to the outer glass OG. This difference results in a mismatch of characteristics about an incidence angle between the first and second holograms HG1, HG2.

In the present embodiment, the first interference fringe 591 used for displaying the image and the second interference fringe 592 used for removing the stray light are recorded in the same medium (volume hologram 550) by multiple exposure processes. Therefore, there are few differences in a temperature between the first and second interference fringes 591, 592. Accordingly, the incidence characteristics of the first and second interference fringes 591, 592 become coincident at any temperature even under a thermal change of the volume hologram 550.

A depth of refractive index modulation of the first and second interference fringes 591, 592 is comparatively small. In particular, a depth of refractive index modulation of all the interference fringes is no more than the maximum dynamic range of a material used as the volume hologram 550. Under such conditions, the first and second interference fringes 591, 592 are recorded by means of multiple exposure processes on the same material (volume hologram 550). Since the first interference fringe 591 allows transmission of the image light IL, the image is provided to the driver D (observer) via the diffraction of the first interference fringe 591 and Fresnel reflection at the outer surface 544 of the windshield 540. Therefore, even if the modulation degree of refractive index is small, image may be appropriately displayed. In addition, the stray light removal performance is stabilized even under an environment with a temperature change.

The see-through display device according to the principles described in the context of the present embodiment may include a red laser source, which emits a red laser light, a green laser source, which emits a green laser light, and a blue laser source, which emits a blue laser light, as light sources. The volume hologram of the see-through display device is subjected to multiple exposures by lights with wavelengths which correspond to the red, green and blue laser light, respectively. Accordingly, interference fringes specifically diffracting the red, green and blue laser lights are formed in the see-through display device. Consequently, the see-through display device may display full-color images.

The aforementioned embodiments are merely exemplary. Therefore, the principles described in the embodiments are not restricted by the detailed description above or the accompanying drawings. Thus, it is readily understood that a person skilled in the art may make various changes, combinations or omissions within a scope of the principles of the aforementioned embodiments.

The aforementioned embodiments mainly include the following features. The see-through display device provided with the following features and the vehicle on which the see-through display device is mounted may cause little stray light. Therefore, an observer observing the image may receive images under little influence from the stray light.

A see-through display device according to one aspect of the aforementioned embodiments includes: a light source configured to emit light; a projection optical system configured to project image light generated from the light; a transmissive hologram including a first surface on which the image light enters from the projection optical system; and an interface configured to cause Fresnel reflection of the image light deflected by the hologram, wherein the hologram includes a first interference fringe recorded by object light and reference light which are incident on the first surface by means of two-light flux interference; the image light incident on the first surface is deflected by the first interference fringe toward the interface; and the interface reflects the image light toward the first surface.

According to the aforementioned configuration, the projection optical system projects image light generated from the light emitted by the light source. The image light from the projection optical system is incident on the first surface of the transmissive hologram. The image light incident on the first surface is deflected by the first interference fringe of the hologram toward the interface. Then, the interface reflects the image light as Fresnel reflection. Therefore, the image light propagates toward the first surface.

The object and reference lights are incident on the first surface, and then subjected to Fresnel reflection due to a difference in a refractive index between the hologram and a medium surrounding the hologram, under which the first interference fringe is recorded. Since a light amount of these two kinds of the reflection lights is comparatively small, the first interference fringe formed by interference of the two reflected lights achieves comparatively small diffraction efficiency, which results in decreased brightness of resultant stray light from the first interference fringe formed by the interference of the two reflected lights. Thus, an observer may observe an image under little influence from the stray light.

In the aforementioned configuration, it is preferred that the first surface faces an observer observing an image demonstrated by the image light, and if an angle on a side of the observer is defined as a positive angle with respect to a perpendicular plane to the first surface and if an opposite angle to the positive angle is defined as a negative angle, an incidence angle of the object angle on the first surface is a positive angle.

According to the aforementioned configuration, the first surface faces the observer observing the image represented by the image light. If an angle on a side of the observer is defined as a positive angle with respect to a perpendicular plane to the first surface and if an opposite angle to the positive angle is defined as a negative angle, an incidence angle of the object angle on the first surface is a positive angle. Consequently, the observer may observe images with little influence of ghost images.

In the aforementioned configuration, it is preferred that the hologram includes a second surface opposite to the first surface. A half-wavelength plate across an optical path toward the first or second surface is further provided.

According to the aforementioned configuration, the hologram includes the second surface opposite to the first surface. Since the half-wavelength plate interferes with an optical path toward the first or second surface, there is decreased brightness of resultant stray light from the first interference fringe formed by interference of the object and reference lights, which are incident on the first surface. Thus, the observer may observe images under little influence from the stray light.

In the aforementioned configuration, it is preferred that an antireflective coating or an antireflective structure is further provided to decrease light reflection toward the first surface.

According to the aforementioned configuration, the antireflective coating or structure may decrease light which is unnecessarily reflected as Fresnel reflection toward the first surface.

In the aforementioned configuration, it is preferred that the projection optical system is absent from an optical path of a main beam of the reference light which is used for recording the first interference fringe.

According to the aforementioned configuration, since the projection optical system is absent from the optical path of the main beam of the reference light which is used for recording the first interference fringe, stray light is less likely to occur.

In the aforementioned configuration, it is preferred that the see-through display device further includes a light diffuser provided on the optical path of the main beam of the reference light used for recording the first interference fringe.

According to the aforementioned configuration, since the light diffuser is provided on the optical path of the main beam of the reference light used for recording the first interference fringe, stray light is less likely to occur.

In the aforementioned configuration, it is preferred that the reference and object lights are incident as S-polarized light or P-polarized light on the first surface of the volume hologram, which has the second surface provided with a quarter-wavelength plate, to record the first interference fringe.

According to the aforementioned configuration, the quarter-wavelength plate is situated on the second surface. Since the reference and object lights are incident as S-polarized or P-polarized light on the first surface, stray light is less likely to occur.

In the aforementioned configuration, it is preferred that a vehicle is equipped with the aforementioned see-through display device, wherein the light diffuser is a dashboard.

According to the aforementioned configuration, the vehicle dashboard is used as the light diffuser. Therefore, stray light may be reduced by a dashboard which is used in an ordinary vehicle.

A see-through display device according to another aspect of the aforementioned embodiments includes: a light source configured to emit light; a projection optical system configured to project image light generated from the light; a transmissive hologram including a first surface which the image light enters from the projection optical system, a second surface opposite to the first surface, and a first interference fringe formed to allow the image light to propagate from the first surface to the second surface; and an interface configured to cause Fresnel reflection of the image light deflected by the first interference fringe, wherein the image light incident on the interface is S-polarized light, and an emission angle of the image light from the interface is larger than an incidence angle of the image light incident on the first surface.

According to the aforementioned configuration, the projection optical system projects image light generated from the light emitted by the light source. The image light from the projection optical system is incident on the first surface of the transmissive hologram. The image light incident on the first surface is directed toward the second surface by the first interference fringe formed to allow the image light to propagate from the first surface to the second surface. The image light deflected by the first interference fringe is reflected as Fresnel reflection by the interface. The image light incident on the interface is S-polarized light. The emission angle of the image light emitted from the interface is larger than the incidence angle of the image light incident on the first surface. Therefore, ghost images are less likely to occur.

In the aforementioned configuration, it is preferred that the see-through display device further includes a half-wavelength plate across an optical path toward the first or second surface, wherein the image light incident on the half-wavelength plate is P-polarized light.

According to the aforementioned configuration, the image light incident on the half-wavelength plate across an optical path toward the first or second surface is P-polarized light. Therefore, ghost images are less likely to occur.

In the aforementioned configuration, it is preferred that the see-through display device further includes an antireflective coating or structure which decreases light reflection toward the first surface.

According to the aforementioned configuration, the antireflective coating or structure decreases unnecessary Fresnel reflection of light toward the first surface.

In the aforementioned configuration, it is preferred that the hologram has diffraction efficiency no less than 50%.

According to the aforementioned configuration, since the hologram has diffraction efficiency no less than 50%, ghost images are less likely to occur.

In the aforementioned configuration, it is preferred that the see-through display device further includes a transparent substrate including an inner surface facing an observer observing an image represented by the image light, and an outer surface opposite to the inner surface, wherein the interface is the outer surface, and the hologram supported on the inner surface or between the inner and outer surfaces is a volume hologram including a second interference fringe which removes external light incident on the outer surface.

According to the aforementioned configuration, the transparent substrate includes the inner surface facing the observer observing the image represented by the image light and the outer surface opposite to the inner surface. The outer surface is used as the interface. The hologram supported on the inner surface or between the inner and outer surfaces is a volume hologram including a second interference fringe which removes external light incident on the outer surface. Therefore, the external light is less likely to degrade the image.

In the aforementioned configuration, it is preferred that a first incidence angle on the volume hologram of first light, for which diffraction efficiency by the first interference fringe is maximized, is equal to a second incidence angle on the volume hologram of second light, for which diffraction efficiency by the second interference fringe is maximized.

According to the aforementioned configuration, the first incidence angle on the volume hologram of the first light, for which the diffraction efficiency by the first interference fringe is maximized, is equal to a second incidence angle on the volume hologram of second light, for which the diffraction efficiency by the second interference fringe is maximized. Therefore, the external light is less likely to degrade the image.

In the aforementioned configuration, it is preferred that if the first incidence angle increases because of a change in a temperature of the volume hologram, the second incidence angle also increases, and if the first incidence angle decreases because of a change in a temperature of the volume hologram, the second incidence angle also decreases.

According to the aforementioned configuration, if the first incidence angle increases because of a change in a temperature of the volume hologram, the second incidence angle also increases, and if the first incidence angle decreases because of a change in a temperature of the volume hologram, the second incidence angle also decreases. Therefore, the thermal change becomes less influential to image quality.

In the aforementioned configuration, it is preferred that a change rate of the first incidence angle in response to a change in a temperature of the volume hologram is equal to a change rate of the second incidence angle in response to a change in a temperature of the volume hologram.

According to the aforementioned configuration, the change rate of the first incidence angle in response to a change in a temperature of the volume hologram is equal to the change rate of the second incidence angle in response to a change in a temperature of the volume hologram. Therefore, the thermal change becomes less influential to image quality.

In the aforementioned configuration, it is preferred that the external light reflected by the second interference fringe is emitted from the second surface.

According to the aforementioned configuration, the external light reflected by the second interference fringe is emitted from the second surface. Therefore, the external light is less likely to degrade the image.

In the aforementioned configuration, it is preferred that an angle on a side of the observer with respect to a perpendicular plane to the first or second surface is defined as a positive angle, and an opposite angle to the positive angle is defined as a negative angle. If the first incidence angle is a positive angle, a first emission angle of the first light from the volume hologram is a negative angle. If the first incidence angle is a negative angle, the first emission angle of the first light from the volume hologram is a positive angle. If the second incidence angle is a positive angle, a second emission angle of the second light from the volume hologram is also a positive angle. If the second incidence angle is a negative angle, the second emission angle of the second light from the volume hologram is also a negative angle.

According to the aforementioned configuration, an angle on a side of the observer with respect to a perpendicular plane to the first or second surface is defined as a positive angle, and an opposite angle to the positive angle is defined as a negative angle. If the first incidence angle is a positive angle, a first emission angle of the first light from the volume hologram is a negative angle. If the first incidence angle is a negative angle, the first emission angle of the first light from the volume hologram is a positive angle. If the second incidence angle is a positive angle, a second emission angle of the second light from the volume hologram is also a positive angle. If the second incidence angle is a negative angle, the second emission angle of the second light from the volume hologram is also a negative angle. Therefore, the external light is less likely to degrade the image.

In the aforementioned configuration, it is preferred that the first incidence angle is no more than 50 degrees; the first emission angle is ranged from 50 degrees to 70 degrees; and the second emission angle is no less than 70 degrees.

According to the aforementioned configuration, the first incidence angle is no more than 50 degrees; the first emission angle is ranged from 50 degrees to 70 degrees; and the second emission angle is no less than 70 degrees. Therefore, the thermal change of the volume hologram becomes less influential to image quality.

In the aforementioned configuration, it is preferred that the first interference fringe includes interference fringes configured to specifically diffract lights in red, green and blue; and the second interference fringe includes interference fringes configured to specifically diffract lights in red, green and blue.

According to the aforementioned configuration, an image may be appropriately displayed by means of red, green and blue lights.

INDUSTRIAL APPLICABILITY

According to the principle of the aforementioned embodiments, ghost images and stray light become appropriately less likely to occur. In addition, quality of images displayed in accordance with the principle of the aforementioned embodiments is less likely to be affected by a change in an ambient temperature. Therefore, the principle of the aforementioned embodiments may be advantageously applied, for example, to a head-up display for providing necessary information in an automobile or an airplane cockpit.

The invention claimed is:
1. A see-through display device comprising:
   a light source configured to emit light;
   a projection optical system configured to project image light generated from the light;
   a transparent substrate including an inner surface which faces an observer observing an image represented by the image light, and an outer surface opposite to the inner surface;
   a transmissive hologram including a first surface, which the image light enters from the projection optical system, a second surface opposite to the first surface, and a first interference fringe which allows the image light to propagate from the first surface to the second surface;
   wherein the hologram is supported on the inner surface or between the inner and outer surfaces,
   wherein the outer surface causes Fresnel reflection of the image light deflected by the first interference fringe,
   wherein the image light is incident on the outer surface as S-polarized light,
   wherein an emission angle of the image light emitted from the outer surface is larger than an incidence angle of the image light incident on the inner surface,
   wherein the first interference fringe is recorded by two-light flux interference of object light and reference light, which are incident on the first surface, and
   wherein the projection optical system is absent from an optical path of a main beam of the reference light which is used for recording the first interference fringe.

2. The see-through display device according to claim 1, further comprising:
   a half-wavelength plate across an optical path toward the first or second surface.

3. The see-through display device according to claim 2, wherein
   the image light is incident on the half-wavelength plate as P-polarized light.

4. The see-through display device according to claim 1, further comprising:
   an antireflective coating or an antireflective structure which reduces light reflection toward the first surface.

5. The see-through display device according to claim 1, further comprising:
   a light diffuser situated on the optical path of the main beam of the reference light used for recording the first interference fringe.

6. A vehicle having the see-through display device according to claim 5 mounted thereon, wherein
   the light diffuser is a dashboard.

7. The see-through display device according to claim 1, wherein
   the reference and object lights are incident as S-polarized light or P-polarized light on the first surface of the hologram, which has the second surface provided with a quarter-wavelength plate, to record the first interference fringe.

8. The see-through display device according to claim 1, further comprising:
   an antireflective coating or an antireflective structure which reduces light reflection toward the first surface.

9. The see-through display device according to claim 1, wherein
   the hologram has diffraction efficiency no less than 50%.

10. The see-through display device according to claim 1, wherein
    the hologram is a volume hologram, and
    the volume hologram is provided with a second interference fringe to remove external light incident on the outer surface, the second interference fringe is formed together with the first interference fringe by means of multiple exposure.

11. The see-through display device according to claim 10, wherein
a first incidence angle on the volume hologram of first light for which diffraction efficiency by the first interference fringe is maximized is equal to a second incidence angle on the volume hologram of second light for which diffraction efficiency by the second interference fringe is maximized.

12. The see-through display device according to claim 10, wherein
a first light defined as the image light for which diffraction efficiency by the first interference fringe is maximized is incident on the volume hologram at a first incidence angle,
a second light defined as the external light for which diffraction efficiency by the second interference fringe is maximized is incident on the volume hologram at a second incidence angle,
if the first incidence angle increases in response to a change in a temperature of the volume hologram, the second incidence angle also increases,
if the first incidence angle decreases in response to a change in a temperature of the volume hologram, the second incidence angle also decreases.

13. The see-through display device according to claim 12, wherein
a change rate of the first incidence angle in response to a change in a temperature of the volume hologram is equal to a change rate of the second incidence angle in response to a change in a temperature of the volume hologram.

14. The see-through display device according to claim 13, wherein
an angle on a side of the observer with respect to a perpendicular plane to the first or second surface is defined as a positive angle, and an opposite angle to the positive angle is defined as a negative angle,
if the first incidence angle is a positive angle, a first emission angle of the first light from the volume hologram is a negative angle,
if the first incidence angle is a negative angle, the first emission angle of the first light from the volume hologram is a positive angle,
if the second incidence angle is a positive angle, a second emission angle of the second light from the volume hologram is also a positive angle, and
if the second incidence angle is a negative angle, the second emission angle of the second light from the volume hologram is also a negative angle.

15. The see-through display device according to claim 14, wherein
the first incidence angle is no more than 50 degrees,
the first emission angle is ranged from 50 degrees to 70 degrees, and
the second emission angle is no less than 70 degrees.

16. The see-through display device according to claim 10, wherein
the external light reflected by the second interference fringe is emitted from the second surface.

17. The see-through display device according to claim 10, wherein
the first interference fringe includes interference fringes configured to specifically diffract lights in red, green and blue, and
the second interference fringe includes interference fringes configured to specifically diffract lights in red, green and blue.

* * * * *